US008433676B2

(12) United States Patent
Matsumura

(10) Patent No.: US 8,433,676 B2
(45) Date of Patent: *Apr. 30, 2013

(54) SOLUTION METHOD OF IN-DOUBT STATE IN TWO-PHASE COMMIT PROTOCOL OF DISTRIBUTED TRANSACTION

(75) Inventor: Ryo Matsumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/466,558

(22) Filed: May 8, 2012

(65) Prior Publication Data
US 2012/0221537 A1 Aug. 30, 2012

Related U.S. Application Data

(63) Continuation of application No. 12/389,979, filed on Feb. 20, 2009, now Pat. No. 8,185,493.

(30) Foreign Application Priority Data

May 22, 2008 (JP) ................................. 2008-134840

(51) Int. Cl.
G06F 17/00 (2006.01)
(52) U.S. Cl.
USPC .......................................... 707/609; 707/672
(58) Field of Classification Search .................. None
See application file for complete search history.

(56) References Cited

U.S. PATENT DOCUMENTS 5,333,303 A  7/1994 Mohan
7,076,508 B2  7/2006 Bourbonnais et al.

FOREIGN PATENT DOCUMENTS

JP   63-8845    1/1988
JP   06-318165  11/1994
JP   6-337810   12/1994
JP   09-204341   8/1997

OTHER PUBLICATIONS

"Oracle Database Administrator's Guide," 29 Distributed Database Concepts, Part No. B14231-02; http://www.download.oracle.com/docs/cd/B19306_01/server.102/b14231/ds_concepts.htm.
Notice of Rejection Ground issued by the Japanese Patent Office in corresponding Japanese App. No. 2008-134840, dated Nov. 13, 2012.

Primary Examiner — Hung Q Pham
(74) Attorney, Agent, or Firm — Greer, Burns & Crain, Ltd.

(57) ABSTRACT

A distributed transaction system includes a plurality of log groups each having a unique identifier assigned thereto, a data storage device storing data and a log storage device storing a log of the data. A table is provided in each of the log groups and has registered therein information about a database management device having the management right of each of the log groups. Wherein in response to the management right of the global representative log group moving to another database management device during an in-doubt state period of the two-phase commit, the table is rewritten to reflect moving of the management right of the global representative log group.

15 Claims, 35 Drawing Sheets

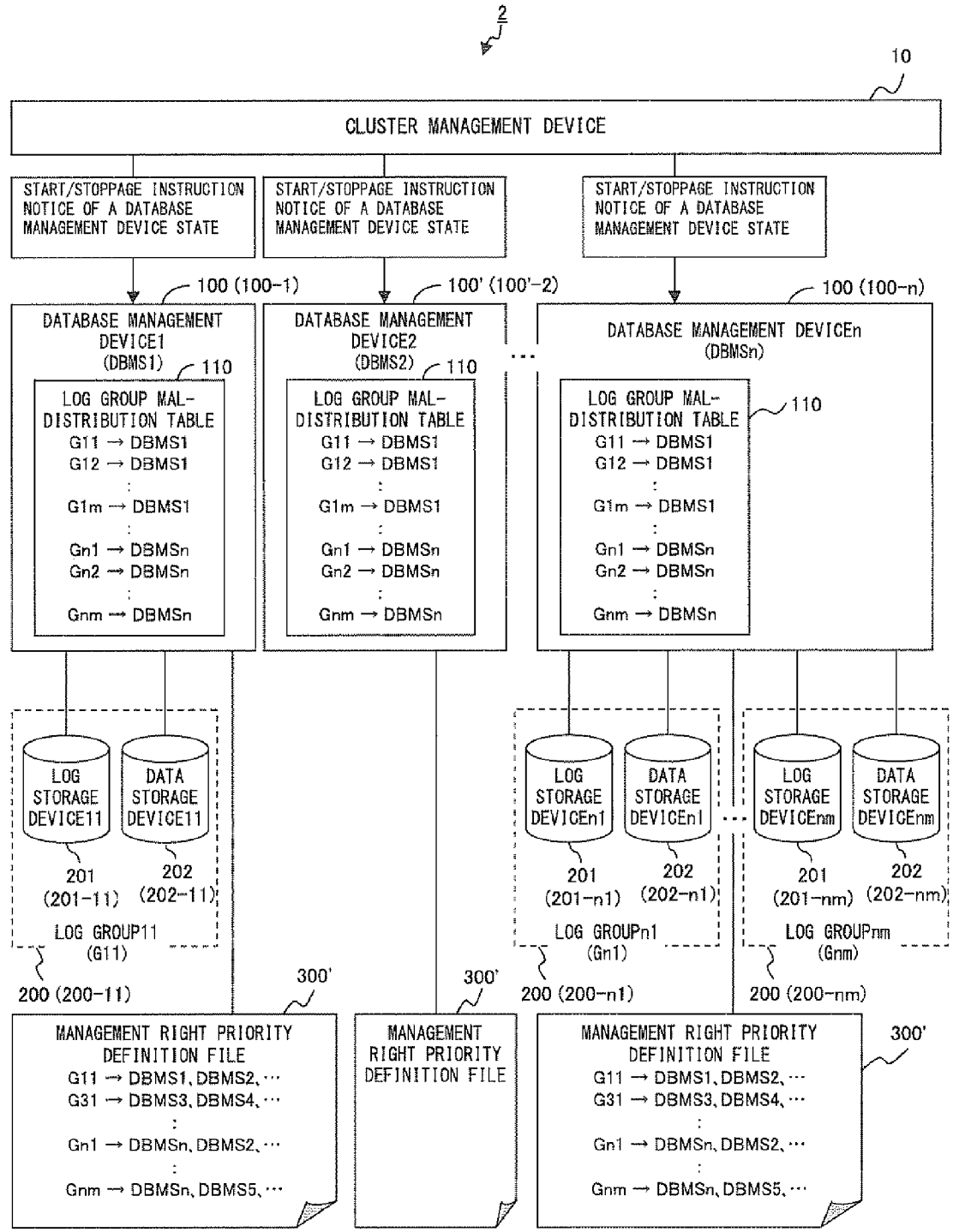
F I G. 2

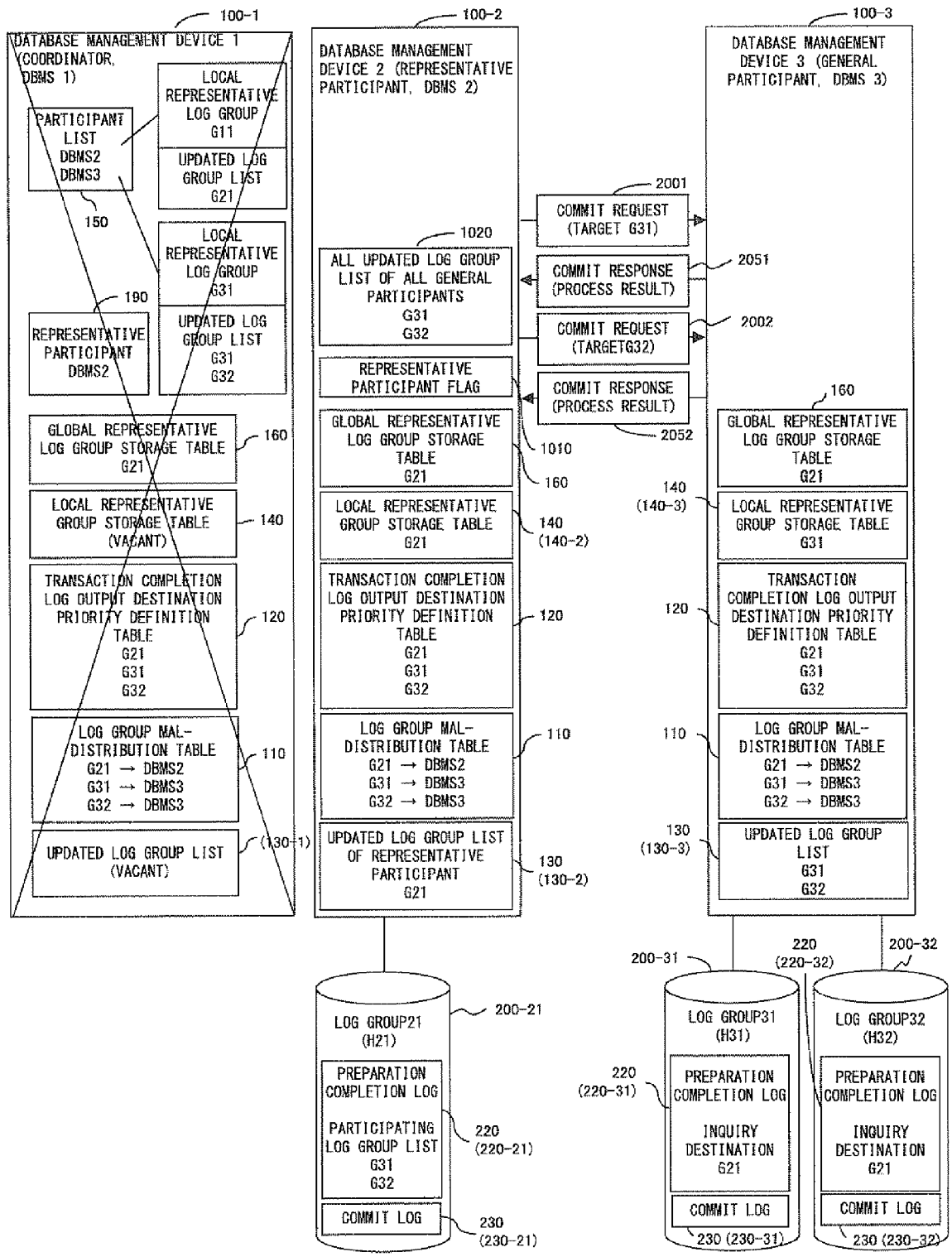
F I G. 30

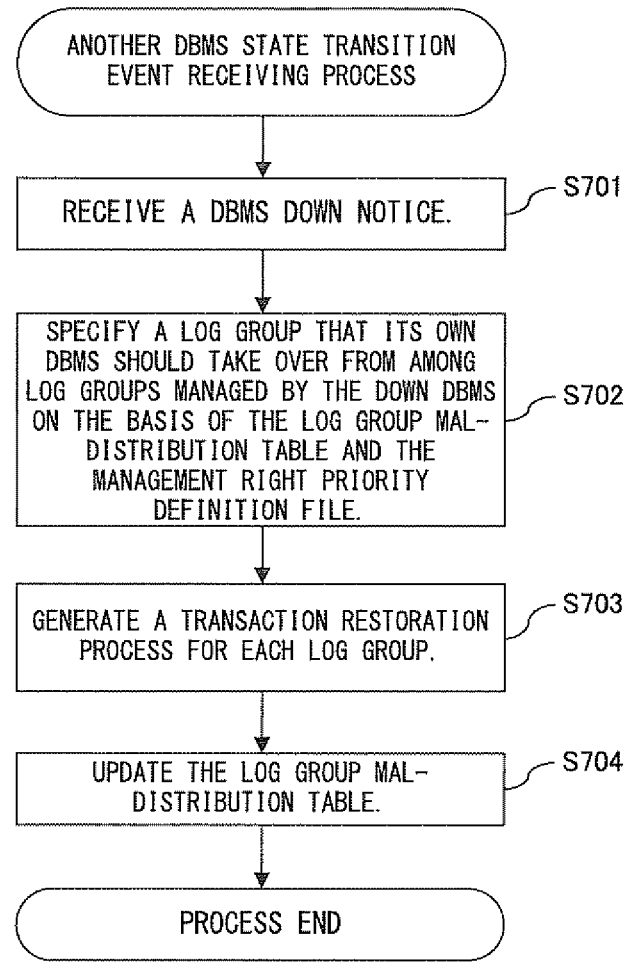
F I G. 3 1

SOLUTION METHOD OF IN-DOUBT STATE IN TWO-PHASE COMMIT PROTOCOL OF DISTRIBUTED TRANSACTION

CROSS-REFERENCE TO RELATED APPLICATIONS

This is a Continuation of application Ser. No. 12/389,979 filed Feb. 20, 2009.

This application is based upon and claims the benefit of priority of the prior Japanese Patent Application NO. 2008-134840, filed on May 22, 2008, the entire contents of which are incorporated herein by reference.

FIELD

The embodiments discussed herein are related to the distributed transaction of database.

BACKGROUND

In a computer system, a transaction is defined to be a series of process procedures consisting of a plurality of processes. As one form of a transaction, there is a distributed transaction. In the distributed transaction, a transaction is carried out on each node of a distributed computer system. For example, the update of a plurality of pieces of database is one form of the distributed transaction. In this case, each piece of database exists in each node of the distributed computer system (for example, a database server provided with a database management system, etc.) and in a transaction process, database managed by each node is updated.

In the distributed transaction too, atomicity must be ensured as in a transaction carried out in a single computer system. Atomicity is a nature that a transaction must be completely carried out or must not be carried out at all. The normal completion of a transaction is called commit and its failure is called abort.

In the distributed transaction, since each computer system fails independently, it is far more difficult to ensure atomicity compared with a transaction carried out in a single computer system. In order to solve this difficulty, in the distributed transaction, a two-phase commit protocol is used for the commit of a transaction.

In the distributed transaction, a computer system participating in a transaction must store the update of a transaction in a non-volatile storage medium permanently before a transaction is committed somewhere. By performing such a process in advance, even when a system downs before a transaction is committed, a transaction can be committed after the restoration of failure.

In the two-phase commit protocol, each computer system participating in a distributed transaction ensures atomicity by storing information and data about the update in a non-volatile storage medium before a transaction is committed thus.

Here, the two-phase commit protocol is described. In the following description, the two-phase commit protocol is sometimes called simply two-phase commit.

In the two-phase commit protocol, a plurality of components (for example, database management devices) is divided into one coordinator and the other participants. The two-phase commit protocol is carried out as follows.

[The First Phase]
1) The coordinator transmits "prepare request" to a participant.
2) The coordinator waits for its response from all the participants to which the prepare request is transmitted.
3) The participant that has received the prepare request from the coordinator writes "preparation completion log" in a storage device. Then, the participant returns to "preparation completion" or "refusal" to the coordinator. This response is generally called "voting".

[The Second Phase]
1) The coordinator determines "commit" or "abort" on the basis of the voting results from all the participants and writes "commit log" in the storage device. In this case, the coordinator determines "commit" only when receiving the voting of "preparation completion" from all the participants.
2) The coordinator transmits the determination result (commit or abort) to all the participants.
3) Upon receipt of the determination result, a participant returns "completion "to the coordinator and writes "transaction completion log" in the storage device.

In this case, the span between the first and second phases is a period of "in-doubt state" or "uncertain state". Although a participant can abort anytime before voting, it can neither commit nor abort until it receiving a determination result from the coordinator after transmitting "preparation completion". This is because if this is not observed, there is a possibility that atomicity may fail. Therefore, the period of the in-doubt state is the period each participant is uncertain which it should commit or abort. If the coordinator downs while each participant is in the in-doubt state, each participant is blocked. Specifically, each participant is put in the state where it can commit nor abort. In this way, the two-phase commit protocol has a problem that there is a possibility that each participant may be blocked in the in-doubt state.

However, this applicant has filed the application of the invention of a device comprising a log storage device for storing the log information of data for each data storage device for storing the data before (see Japan Laid-open Patent Publication No. 06-337810). In this specification, a group obtained by packaging the data storage device and the log storage device is called "log group".

The process before/after an in-doubt state period in the two-phase commit protocol in the case where a distributed transaction is carried out in such a distributed computer system provided with a plurality of database management devices is described. When receiving message of prepare request from the coordinator, each participant writes "preparation completion log" in the log storage device, and then transmits message of "preparation completion" to the coordinator. When receiving message of preparation completion from all the participants, the coordinator determines commit or abort and writes a "transaction completion log" in the log storage device. Then, the coordinator transmits the determination result to all the participants.

The transaction completion log and the preparation completion log store the following information (1) and (2), respectively, in order to solve the in-doubt state.
(1) Notification destination of the final result of a transaction (transaction completion log)
(2) Inquiry destination of the final result of a transaction (preparation completion log)

When a participant has restored from the failure after having downed during an in-doubt state period, the preparation completion log is written in the log storage device but the transaction completion log (log of commit or abort) is not written in the log storage device. Therefore, the participant is blocked. Therefore, the participant carries out "termination protocol" in order to solve the blocked transaction.

The termination protocol is the process which is carried out by a participant in order to solve the blocked transaction when the participant restores from a failure.

One example of the termination protocol, the participant transmits voting to the coordinator again. In order to transmit voting to the coordinator, the participant obtains the "notification destination of the final result of a transaction" from the preparation completion log. This is because the inquiry destination of the final result of a transaction is the communication address (for example, IP address) of the coordinator.

Upon receipt of the voting from the participant, when already receiving voting from the participant, the coordinator determines that the participant has not received the voting result yet and transmits the voting result to the participant. In this case, in order to transmit this voting result to the participant obtains the "notification destination of the final result of a transaction" from the transaction completion log. This is because this notification destination of the final result of a transaction is the communication addresses of the participants.

In this way, conventionally, the notification destination of the final result of a transaction and the inquiry destination of the final result of a transaction are the communication address(es) of participants and the coordinator, respectively.

However, in a database management system not provided with a two-phase commit function, as a technology related to a distributed transaction, an invention for realizing pseudo two-phase commit at an application program level is known (for example, Japan Laid-open Patent Publication No. 63-008845).

There are two types of shared nothing and shared disk in the distributed database having a cluster configuration. The shared nothing type distributed database is a system in which a database management device (database server) does not share resources. The shared disk type distributed database is a system in which a database management device (database server) shares resources.

As the database that supports a distributed transaction in the shared nothing type cluster system there are the HiRDB of Hitachi Corporation, the SQL server of Microsoft Corporation and the like. Oracle Corporation in U.S.A. proposes the solution method in the case where a database management device downs during two-phase commit in the distributed transaction of a shared disk type distributed database (see Home page URL of Oracle Corporation (http://download.oracle.com/docs/cd/B19306_01/server.102/b14231/ds_concepts.htm).

A distributed computer system provided with a plurality of database management devices for managing the conventional log groups has a disadvantage that when executing a distributed transaction, the following problems occur.

(1) When a certain database management device downs, the management right of the log groups managed by the database management device moves to another database management device while such a distributed transaction as to update a plurality of log groups is carried out, the distributed transaction cannot be restored. In this case, the management right is the right by which the log groups can refer to/update the data of a storage device.

For example, the down database management device is the coordinator and also the down has occurred while a participant is in the in-doubt state, the "inquiry destination of the final result of a transaction" stored in the log storage device of the participant becomes invalid. Because since the inquiry destination of a final result transaction is the communication address of the coordinator that has downed, the participant cannot receive the final result of the transaction even when the participant inquires about the final result of the transaction using the communication address. Therefore, the participant cannot solve the in-doubt state and restore the distributed transaction.

It is assumed that the down database management device is a participant and the participant downs after notifying the database management device being the coordinator of message of preparation completion. In this case, the "notification destination of the final result of a transaction" stored a transaction completion log recorded on the log storage device is the communication address of the down participant. However, this communication address is invalid. Because the communication address of the database management device to which the management right of the log groups managed by the down participant is moved is not the communication address stored in the notification destination of the final result of the transaction. Therefore, the database management device that has taken over the management right of the log group cannot know the final result of the transaction and solve the in-doubt state.

As described above, conventionally, if a database management device participating in the distributed transaction downs during the in-doubt state period of two-phase commit when in a distributed database system comprising a plurality of database management devices for managing log groups, such a distributed transaction as to update a plurality of log groups is carried out, the distributed transaction cannot be restored.

(2) Even if the problem of the above (1) is solved, the following problem remains.

When the management right of a log group moves, a database management device without any log storage device is generated. For example, the database management device from which the management right of the log group managed by its own device moves to another database management device has no log storage device. When update application for carrying out a distributed transaction (application for updating data) is connected to such a database management device having no log group and the update application is committed, the database management device having no log group (coordinator) cannot record the final result of the distributed transaction (commit or abort) on the log storage device. Therefore, in case where the database management device participating in the distributed transaction downs during carrying out two-phase commit, the database management system can not restore the distributed transaction. For example, this is because when the coordinator downs, the inquiry destination about which a participant inquires, of the final result of the distributed transaction is lost. Therefore, the participant cannot solve the in-doubt state and restore the distributed transaction.

SUMMARY

The present invention presumes the solution method of an in-doubt state in two-phase commit protocol of a distributed transaction system comprising a log group being the package of a data storage device for storing data and a log storage device for storing the log of the data, in which the management right of the log group can move between database management devices in the system.

The method of the present invention includes a step of attaching a unique identifier to each log group and registering information about a database management device having the management right of each log group in a first table, a step of storing the list of the identifiers of log groups by a database management device being the participants of the distributed transaction in a preparation completion log (first preparation completion log) outputted to the log storage device of a log group representing log groups (global representative log group) managed by a database management device being the coordinator in the two-phase commit of a distributed transaction in which a plurality of log groups participate, a step of storing the identifier of the global representative log group in a preparation completion log (second preparation completion log) outputted to the log storage device of a log group other than a representative log group in the two-phase commit, a step of rewriting the first table in such a way that another database management device may have the management right of the global representative log group when the management right of the global representative log group to the other database management device during the in-doubt state period of two-phase commit, a step of rewriting the first table in such a way that another database management device may have the management right of the global representative log group when the management right of a log group other than the global representative log group to another database management device during the in-doubt state period of two-phase commit, a step of a participant in an in-doubt state referring to the identifier of the global representative log group stored in the second preparation completion log and the first table and inquiring about a transaction result of a database management device having the management right of the global representative log group and a step of the coordinator referring to a list of the identifiers log groups stored in the first preparation completion log and the first table and returning the transaction result to the participant when receiving an inquiry about a transaction result from a participant in an in-doubt state.

The Object and advantage of the invention will be realized and attained by means of the elements and combinations particularly pointed out in the claims.

It is to be understood that both the foregoing general description are exemplary and explanatory and are not restrictive of the invention, as claimed.

BRIEF DESCRIPTION OF DRAWINGS

FIG. 2 illustrates another form of the distributed transaction system adopting the present invention.

FIG. 30 illustrates the system state in the case where the coordinator downs when there is no update in the coordinator.

FIG. 31 is a flowchart showing the operation of the other database management devices in the case where the cluster management device detects the down of a certain database management device in the system.

DESCRIPTION OF EMBODIMENTS

Figure 1:
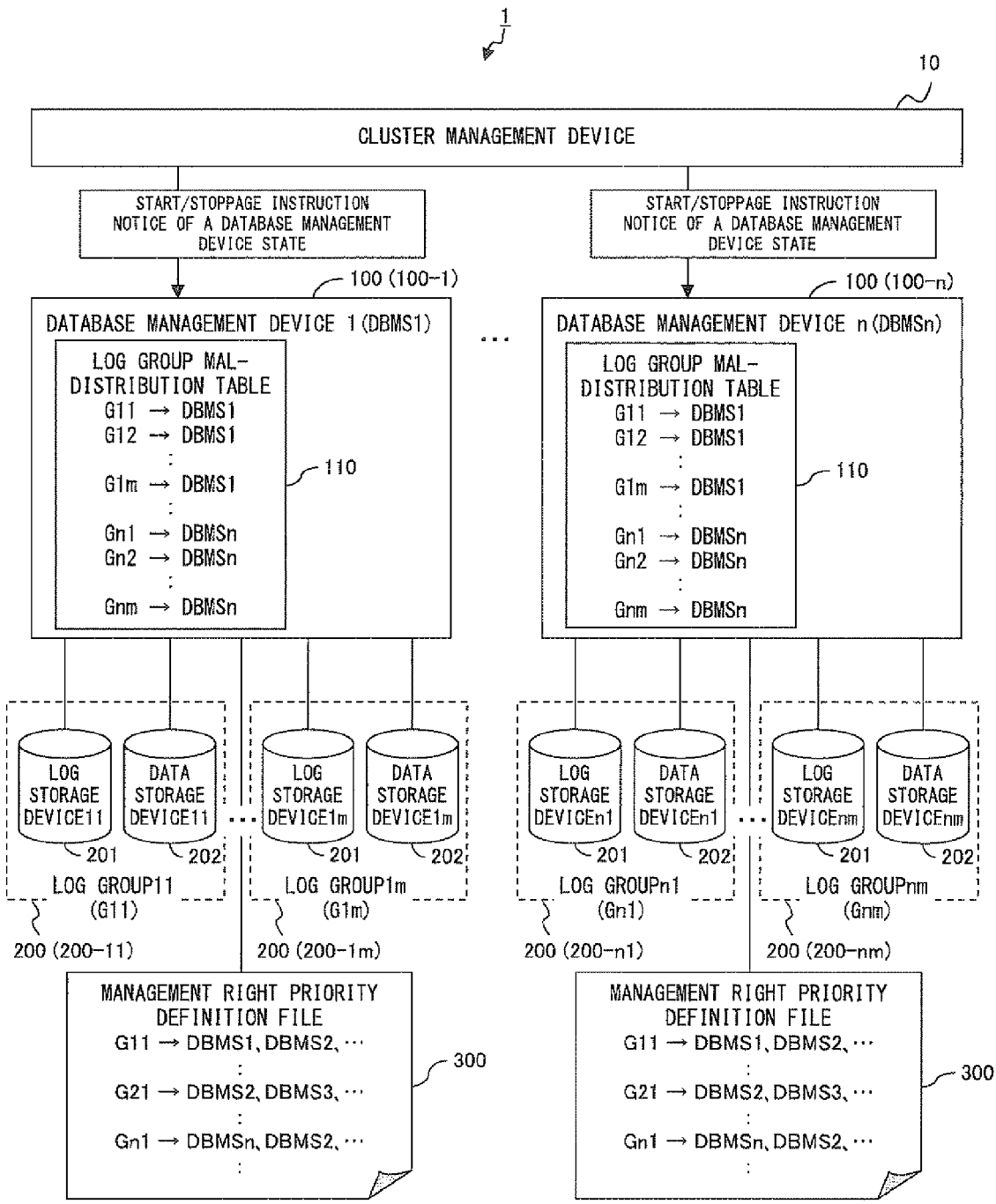
FIG. 1 illustrates one form of the distributed transaction system adopting the present invention.

The preferred embodiment of the present invention will be explained with reference to accompanying drawings.
[Configuration]
{System Configuration}
FIGS. 1 and 2 illustrate the configurations of the preferred embodiments adopting the present invention.

The First Preferred Embodiment of a Distributed Transaction System

FIG. 1 illustrates one form of the distributed transaction system adopting the present invention.

The distributed transaction system 1 depicted in FIG. 1 comprises a cluster management device 10 and a plurality of database management devices 100 (100-1 through 100-$n$). The cluster management device 10 manages each database management device 100 and is connected to each database management device 100 via a communication line. The cluster management device 10 is provided with a function to instruct each database management device 100 to start/stop and a function to monitor the working state of each database management device 100. When detecting a down database management device 100, the cluster management device 10 notifies the other database management devices 100 of the down database management device 100. The cluster management device 10 gives such an instruction/notice to each database management device 100 by means of message.

The plurality of database management devices 100 are connected to each other via a network, which is not depicted in FIG. 1 and constitute a cluster system. The database management 100 is, for example, a database server provided with a database management system. In the distributed transaction system 1, each database management devices 100 is provided with one or a plurality of log groups 200. Each database management devices 100 is also provided with a management right priority definition file 300.

The log group 200 is the package of a log storage device 201 and a data storage device 202. The data storage device 202 stores database whose data is updated by a distributed transaction. The log storage device 201 records the update log of database stored in data storage device 202. The database in the data storage device 202 of the log group 200 is restored on the basis of a log recorded in the log storage device 201 of the same log group. In this way, the log storage device 201 and data storage device 202 are paired in the log group 200. The log storage device 201 and the data storage device 202 can also be, for example, the same external storage device.

The database management device 100 stores a log group mal-distribution table 110. The log group mal-distribution table 110 illustrates database management devices 100 currently managing each log group 200. The database management device 100 can know by which database management device 100 each log group 200 in the system is currently managed. This log group mal-distribution table 110 is common to all the database management devices 100 in the system. This log group mal-distribution table 110 is determined on the basis of the contents of the management right priority definition file 300. The log group mal-distribution table 110 is updated every time the management right of a log group is moved to another data storage device 202. This update is made on the basis of the contents of the management right priority definition file 300.

The management right priority definition file 300 defines the priority of data storage devices 202 having the management right. Since each log group 200 is managed by any of the database management devices 100, the management right belongs to one of the database management devices 100. Therefore, the management right priority of a log group 200 is the same as the management right priority of the database management devices 100 to which the log group 200 belongs. The management right priority definition file 300 is stored in a non-volatile storage device, which is not depicted in FIG. 1, instead of that of the log group 200. This management right priority definition file 300 is common to all the database management devices 100 in the system.

The log group mal-distribution table 110 is set by disposing a copy of the management right priority definition file 300 in the external storage device of each database management device 100 and reading it in the main storage device by the database management system (DBMS) process of each database management device 100.

When being notified of a down database management device 100 by the cluster management device 10, each database management device 100 firstly refers to the log group mal-distribution table 110 and checks log groups 200 by managed the down database management device 100. Then, when learning the log groups 200 by managed the down database management device 100, each database management device 100 refers to the management right priority definition file 300 and checks whether the database management device 100 must manage the log groups 200 by managed the down database management device 100. In this case, if the database management device 100 must manage the log groups 200, it takes over the management of the log groups 200 by managed the down database management device 100.

In the following description, database management devices 100-1, 100-2, ..., 100-$n$ are sometimes described as database management devices 1, 2, ..., n. DBMS 1, 2, ..., n (device name) are assigned to the database management devices 1, 2, ..., n, respectively. These device names are used to obtain the communication address of the database management device i. A table for converting the device name DBMS i to the communication address of the database management device i is provided in the system and by referring to this conversion table, the communication address of the database management device i having the device name DBMS i can be obtained. In the following description, the database management device is sometimes called as DBMS.

It is assumed that a log group 200 managed by the database management device i (i=1 to n) is expressed as a log group ik (k=1 to m) at the time of booting the system. In this preferred embodiment, a unique identifier Gik is assigned to each log group ik. The log storage device 201 and data storage device 202 in the log group ik to which a peculiar identifier Gik is assigned are expressed as a log storage device ik and a data storage device ik, respectively. In the following description, the log group ik is also sometimes expressed as Gik. This is for example, because application specifies the log group ik updated by the identifier Gik in the data update request of a distributed transaction. It is also because in the packet communication between the database management devices, the log group ik is specified by the identifier Gik.

The data structure of the log group mal-distribution table 110 depicted in FIG. 1 is described.

The management right priority definition file 300 defines the management right priority of DBMS of each log group Gik. In this case, the management right is a right for managing the log group ik.

Next, the data structure of the management right priority definition file 300 depicted in FIG. 1 is described. The management right priority definition file 300 defines the management right priority of the database management device i of each log group ik using the identifier Gik assigned to each log group ik and the device name DBMS i assigned to each database management device i. The management right priority definition file 300 depicted in FIG. 1 defines the management right priority of the database management i of a log group 11 in order of DBMS 1. DBMS 2, ... using an identifier G11 assigned to the log group 11. The management right priority definition file 300 defines the management right priority of the database management i of a log group 21 in order of DBMS 1. DBMS 2, ... using an identifier G21 assigned to the log group 21. The management right priority definition file 300 defines the management right priority of the database management i of another log group ik by the same method.

Although in the distributed transaction system 1 depicted in FIG. 1, each log group Gik has the same number of log groups, the number of managed log groups can also differ. This also applies to the distributed transaction system.

The Second Preferred Embodiment of a Distributed Transaction System

FIG. 2 illustrates another preferred embodiment of the distributed transaction system adopting the present invention. In FIG. 2, the same reference numerals are attached to the same components as depicted in FIG. 1 and their detailed descriptions are omitted.

The distributed transaction system 2 depicted in FIG. 2 differs from the distributed transaction system 1 in that a database management device 100' (100'-2) is not provided with the log group 200. The present invention can also be applied to a distributed transaction system provided a database management device to which no log group is assigned.

The database management device 100' (database management device 2) stores the log group mal-distribution table 110 in its main storage device. This is because there is a possibility that the management right of the log groups 200 managed by the database management device 100 may move to the database management device 100' (DBMS 2) when another database management device 100 downs. The database management device 100' is also provided with a management right priority definition file 300'.

The contents of the management right priority definition file 300' somewhat differ from those of the management right priority definition file 300. This is because the database management device 100' corresponding to the database management device 2 depicted in FIG. 1 has no log group 200 to manage. Therefore, the management right priority definition file 300' does not define the management right priority of the database management device i of the log groups 21 and 22.

{Movement of the Management Right of a Log Group in the Case where a Database Management Device Downs}

Figure 3:
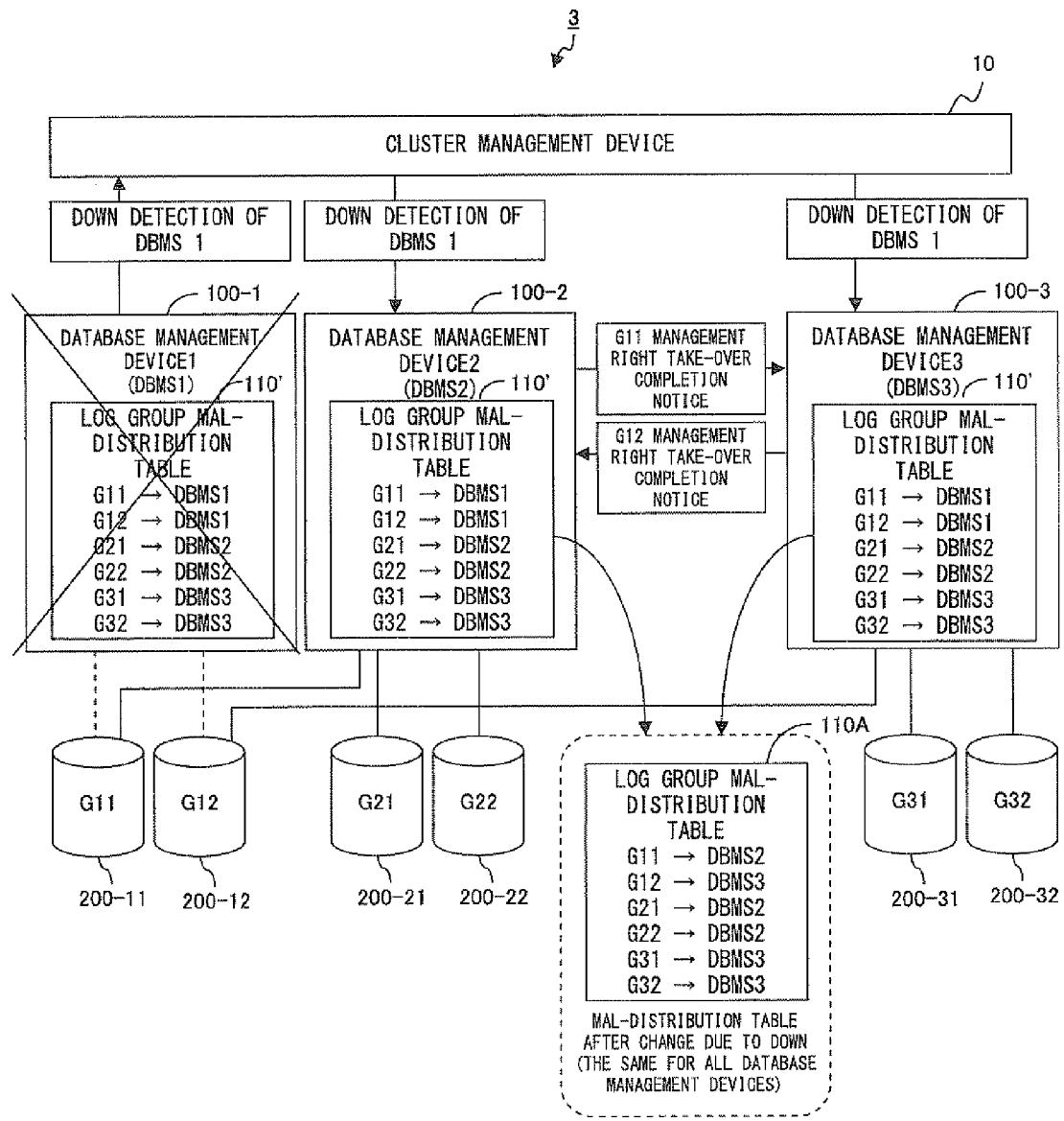
FIG. 3 illustrates the change of a system configuration due to the movement of the management right of a log group in the case where a database management device downs.

FIG. 3 illustrates the change of the system configuration due to the movement of the management right of a log group in the case where a database management device downs. In FIG. 3, the same reference numerals are attached to the same components as depicted in FIG. 1 and their log groups are simplified.

The distributed transaction system 3 depicted in FIG. 3 corresponds to the case where the distributed transaction system 1 depicted in FIG. 1 is provided with three database management devices 1, 2 and 3.

In the initial state of the distributed transaction system 3, the database management device 1 manages the log groups 11 (identifier G11) and 12 (identifier G12) and the database management device 2 manages the log groups 21 (identifier G21) and 22 (identifier G22). The database management device 3 manages the log groups 31 (identifier G31) and 32 (identifier G32). The management information of the database management devices 1, 2 and 3 of these log groups 11, 12, 21, 22, 31 and 32 is defined in the management right priority definition file 300, which is not depicted in FIG. 3. Specifically, in the initial state of the distributed transaction system 3, the log groups 11, 12, 21, 22, 31 and 32 are managed by the database management device i whose management right priority is the highest. This management state is maintained until one of the database management devices 1 through 3 downs.

When the database management device 1 downs due to a failure, the cluster device 10 detects the failure and notifies all the database management devices other than the database management device 1 of the down of the database management device 1 using the device name DBMS 1 of the database management device 1. In this case, upon the receipt of the notice from the cluster device 10, the database management device 2 (device name DBMS 2) refers to a management right priority definition file, which is not depicted in FIG. 3, and takes over the management right of the log group 11 (identifier G11) managed by the database management device 1. Similarly, the database management device 3 takes over the management right of the log group 12 (identifier G12) managed by the database management device 1. After the take-over of the management right of the log group 11 is completed, the database management device 2 transmits "G11 management right take-over completion notice" to the database management device 3 using the identifier G11 of the log group 11. After the take-over of the management right of the log group 12 is completed, the database management device 3 transmits "G12 management right take-over completion notice" to the database management device 2 using the identifier G12 of the log group 11.

Upon receipt of the notice, as depicted in FIG. 2, the database management devices 2 and 3 modify a log group mal-distribution table 110' to a log group mal-distribution table 110A. It is described in the log group mal-distribution table 110A that the database management devices 2 and 3 own the management rights of the log groups 11 and 12, respectively, using the identifier G11 of the log group 11 and the identifier G12 of the log group 12, respectively.

{Transaction Completion Log Output Destination Priority Definition Table}

Figure 4:
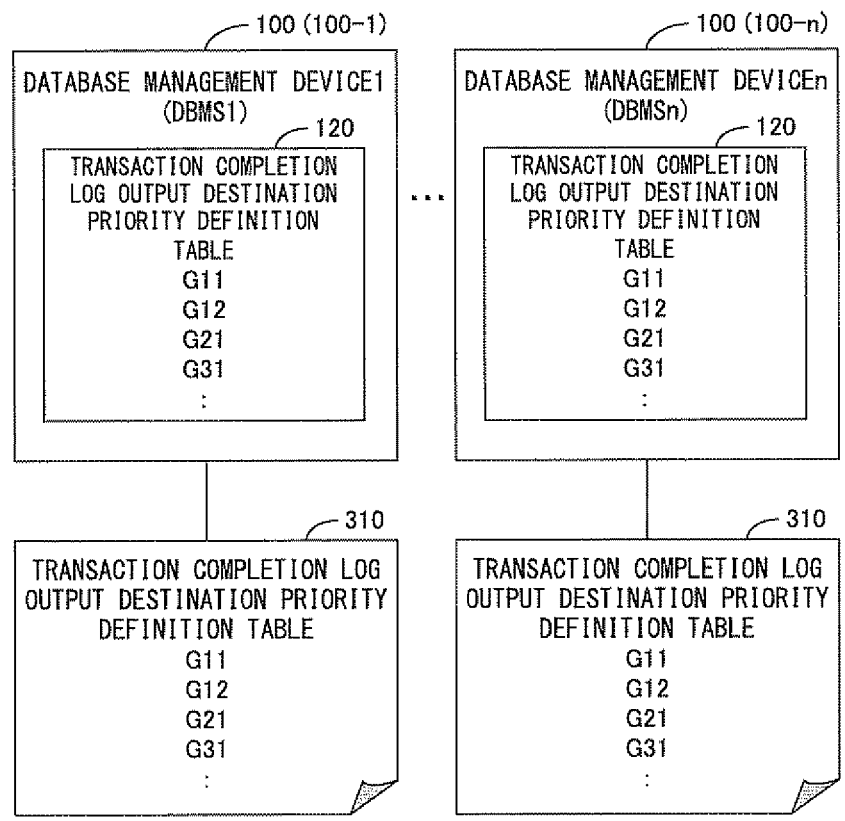
FIG. 4 illustrates the priority definition file of transaction completion log output destinations, stored in the main storage device of each database management device and the priority definition file of transaction completion log output destinations, stored in an external storage device.

In the distributed transaction systems 1 and 2 in this preferred embodiment, as depicted in FIG. 4, each database management device i (i=1-n) stores a transaction completion log output destination priority definition table 120 in the main storage device. This transaction completion log output destination priority definition table 120 defines the importance of each log group ik (i=1-n, k=1-m) in the system. In the transaction completion log output destination priority definition table 120 depicted in FIG. 4, their identifiers Gik are described in the descending order of importance of the log groups ik. This transaction completion log output destination priority definition table 120 is used for the database management device i being the coordinator or a participant to determine a "local representative log group" and the like.

A transaction completion log output destination priority definition table 310 is the same as the transaction completion log output destination priority definition table 120 and is a file stored in an external storage device, which is not depicted in FIG. 3. The database management device i reads the transaction completion log output destination priority definition table 310 from the external storage device and stores it in the main storage device as the transaction completion log output destination priority definition table 120. It is in order to increase its process speed to store the transaction completion log output destination priority definition table 120 in the main storage device.

[Operation]

Next, the operation of the distributed transaction system having the above-described configuration is described.

As publicly known, in two-phase commit (two-phase commit protocol) in a distributed transaction, the database management devices are divided into one coordinator and the other participant. From the viewpoint of software process, the connecting destination process of application is "coordinator" and the indirect connecting destination is called "participant". In other words, a database management device (process) that starts a distributed transaction is "coordinator" and a database management device (process) that receives a request from the coordinator and participates in the distributed transaction is "participant".

Figure 5:
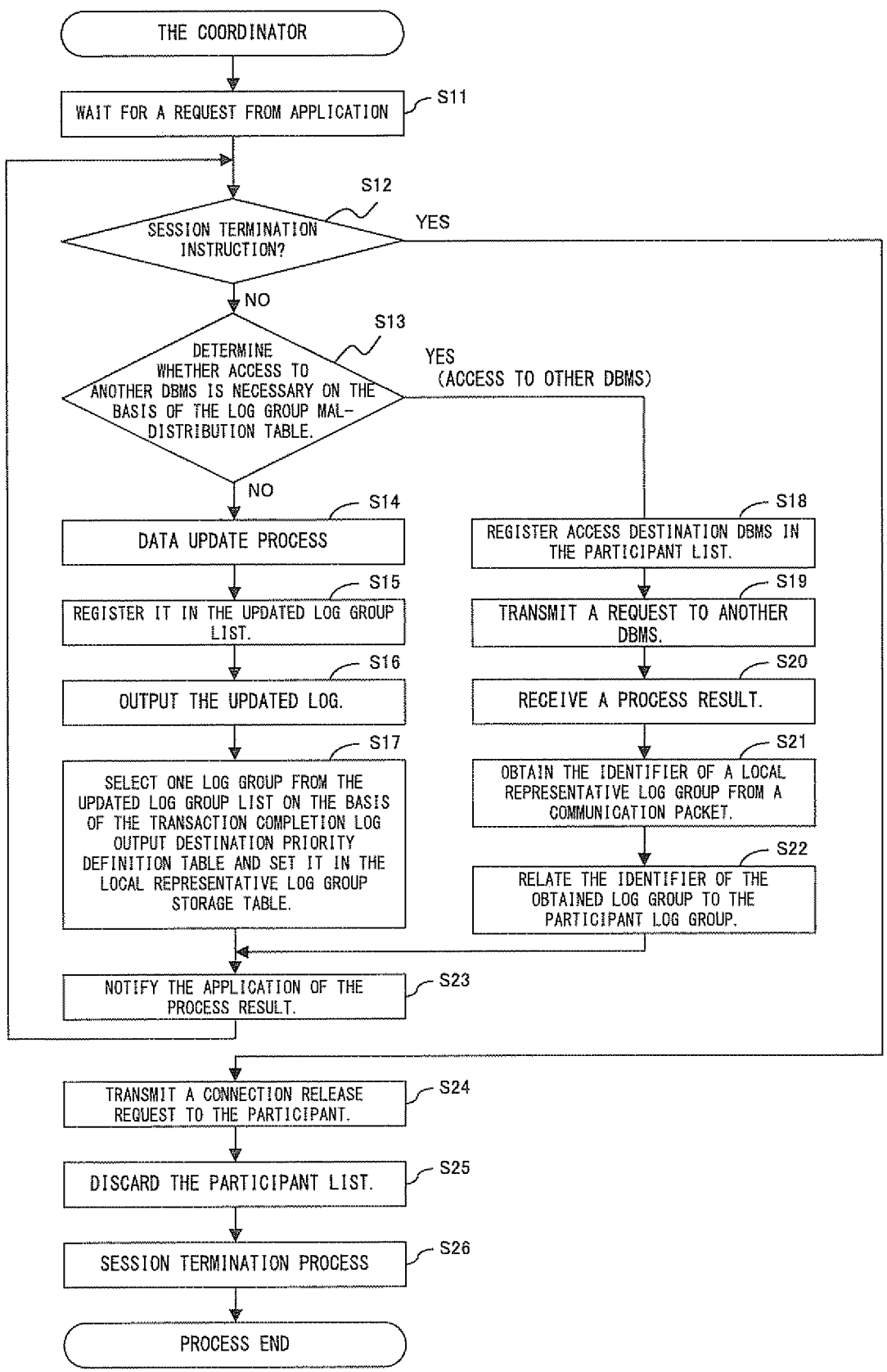
FIG. 5 is a flowchart showing the data update process of the coordinator in a distributed transaction.

FIG. 5 is a flowchart showing the data update process of the coordinator in a distributed transaction.

When the coordinator receives a request from application the coordinator while waiting for a request from application (step S11), it determines whether the request is the final instruction of a session (step S12). If in step S12 it is determined that it is not the final instruction of the session (it is a data update instruction) (NO in step S12), the process advances to step S13. If in step S12 it is determined that it is the final instruction of the session, the process advances to step S24.

In step S13, the coordinator refers to the log group maldistribution table 110 and determines whether access to another database management device (DBMS) is needed in order to update data. If it is determined that access to another DBMS is not needed (NO in step S13), data in the data storage device 202 of the log group of the coordinator is updated (step S14). Then, the coordinator registers the log group whose data is updated (updated log group) in an "updated log group list", which is described later (step S15) and outputs the updated log to the log storage device 201 of the log group (step S16). Then, the coordinator refers to the transaction completion log output destination priority definition table 120 and selects one log group from log groups (updated log group) registered in the updated log group list. Then, the coordinator sets the log group in a "local representative log group storage table", which is described later (step S17).

It is the most important log group of the log groups registered in the updated log group list that is selected as the "local representative log group" in the step S17 to be set in the local representative log group storage table". The local representative log group storage table is provided in the main storage device of the database management device i.

If in step S13 the coordinator determines that access to another DBMS is needed (YES in step S13), the coordinator registers the other DBMS in a "participant list", which is described later (step S18). Then, the coordinator transmits a request to update data to the other DBMS (step S19). Then, the coordinator waits for a packet to be transmitted from the DBMS which the coordinator requests to update data and receives the packet from the DBMS (step S20). This packet stores a "data update process result (normal or abnormal termination)" and a "log group identifier Gik".

Then, the coordinator obtains the identifier Gik of the log group from the received packet (step S21). The coordinator relates the obtained identifier Gik of the log group to the participant list (step S22), and then the process advances to S23.

In step S23, the coordinator notifies the application of its process result (normal or abnormal termination).

After the process in step S12 is completed, the process returns to step S12.

Thus, in step S12 the processes in steps S13 through S23 are repeated until it is determined that the application has instructed the termination of the session. By this repetition, data is updated in the distributed transaction and the process result of data update in each log group Gik is reported to the application.

If in step S13 it is determined that the application has instructed the termination of the session (YES in step S13), a "connection release request" is transmitted to all the participants (step S24). Then, after all the participants discard the participant list (step S25), the session is terminated (step S26) and the process of this flowchart is terminated.

Figure 6:
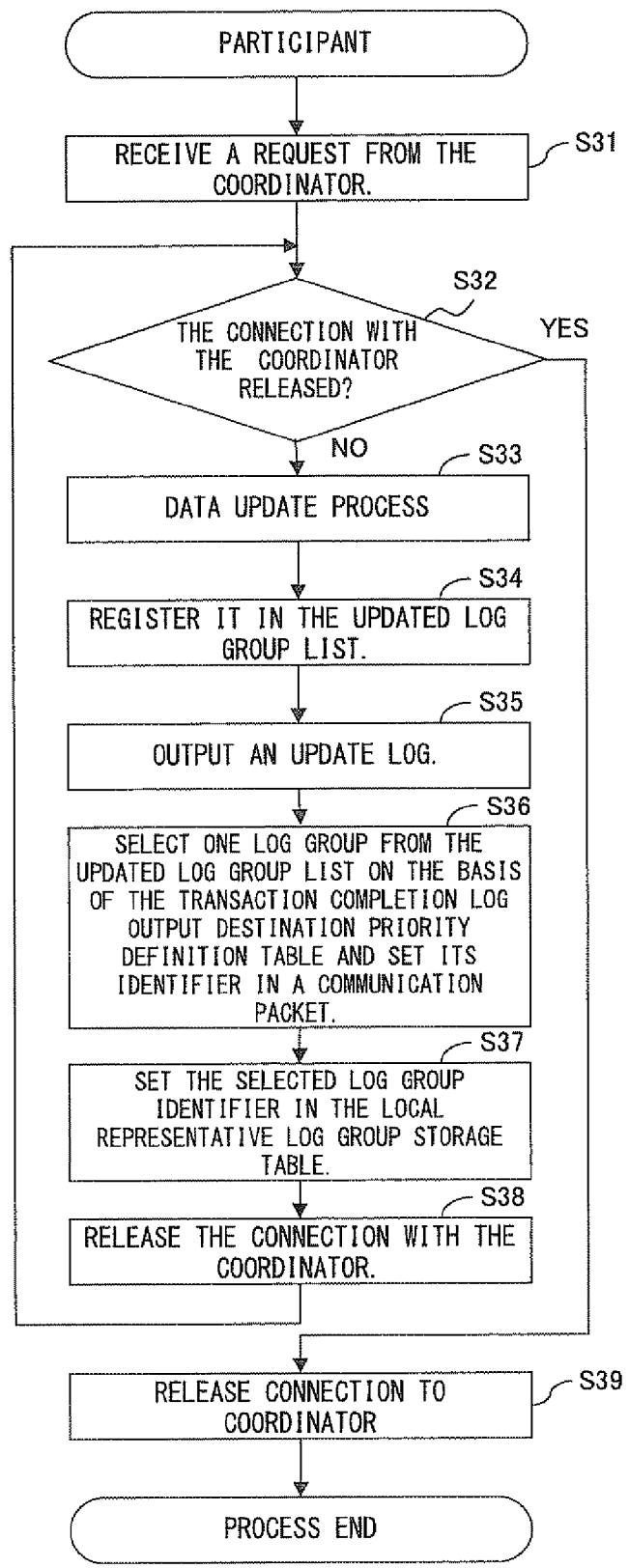
FIG. 6 is a flowchart showing the data update process of a participant in a distributed transaction.

FIG. 6 is a flowchart showing the data update process of a participant in a distributed transaction.

A participant receives the request from the coordinator (step S31). Then, the participant determines whether the request is the "connection release from the coordinator" (step S32). If it is not the connection release from the coordinator (it is data update) (NO in step S32), the process advances to step S33. If it is the connection release from the coordinator (YES in step S32), the process advances to step S39.

In step S33, the participant updates each the data of the data storage device 202 of the requested log group. Then, the participant outputs the updated log to the log storage device 201 of the log group (step S34). Then, as in the above-described process in step S17 of the flowchart depicted in FIG. 5, the participant refers to the transaction completion log output destination priority definition table 120, selects one log group from the updated log group list and sets the identifier Gik of the log group in a communication packet (step S37). Then, the participant sets the identifier Gik of the selected log group in the local representative log group storage table (step S37). Then, the participant notifies the coordinator of its process result (normal or abnormal termination) (step S38) and the process returns to step S32.

In this way, every time the participant receives a data update request from the coordinator, it repeats the processes in steps S33 through S38, and updates the data of the log group and records the updated data in the log. Data is updated in the data storage device 202 of the log group and the updated log is recorded in the log storage device 201 of the log group. The participant sets a log group being a "local representative log group", which is described later, in a communication packet addressed to the coordinator and transmits the communication packet to the coordinator.

If in step S32, the participant determines that the coordinator has requested for the connection release (YES step S32), the participant releases the connection to the coordinator (step S39) and the process of the flowchart is terminated.

Figure 7:
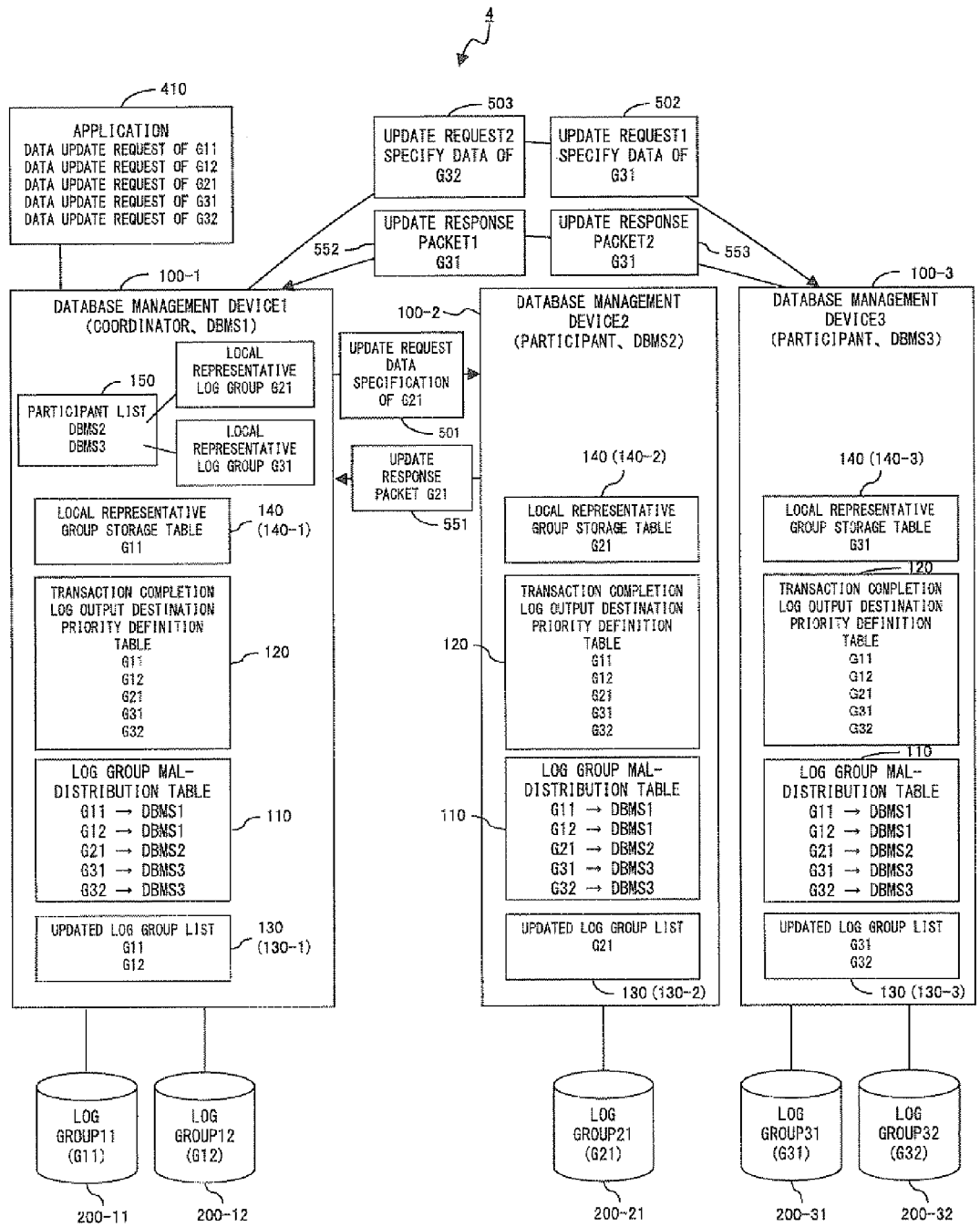
FIG. 7 is a system configuration diagram showing one example of the data update process in a distributed transaction by the process depicted in the flowcharts of FIGS. 5 and 6.

FIG. 7 is a system configuration diagram showing one example of the data update process in a distributed transaction by the process depicted in the flowcharts of FIGS. 5 and 6.

The distributed transaction system 4 depicted in FIG. 7 corresponds to one in which the cluster of the database management device is composed of three database management devices in the distributed transaction system 1 depicted in FIG. 1. The database management device 1 comprises two log groups 11 (identifier G11) and 12 (identifier G12), the database management device 2 comprises one log groups 21 (identifier G21). The database management device 3 comprises two log groups 31 (identifier G31) and 32 (identifier G32).

The database management device 1 comprises a log group mal-distribution table 110, a transaction completion log output destination priority definition table 120, an updated log group list 130 (130-1), a local representative log group storage table 140 (140-1) and a participant list 150.

The updated log group list 130 registers a list of log groups whose data the database management device i (DBMS i) has updated in a distributed transaction. The updated log group list 130 is generated in the main storage device of all the database management devices i participating in a distributed transaction.

The local representative log group storage table 140 stores a log group selected from the log groups registered in the updated log group list 130 according to a transaction completion log output destination priority definition table 120 (local representative log group). The local representative log group storage table 140 is also generated in the main storage device of all the database management devices i participating in a distributed transaction.

The participant list 150 registers a list of all the database management devices i participating in a distributed transaction. The participant list 150 is generated in the main storage device of all the database management device i being the coordinator. The local representative log groups determined by each DBMS i are related to each database management device i (DBMSi) being the coordinator registered in the participant list 150.

In the distributed transaction depicted in FIG. 7, application 410 requests the database management device 1 to update the data of G11 (log group 11), G12 (log group 12), G21 (log group 21), G31 (log group 31) and G32 (log group 32). Therefore, in this distributed transaction, the database management device 1 (DBMS 1) is the coordinator and the database management devices 2 (DBMS 2) and 3 (DBMS 3) is participants.

The state of the distributed transaction system 4 depicted in FIG. 7 is described with reference to the flowcharts in FIGS. 5 and 6.

Upon receipt of the request from the application 410, the database management device 1 updates the data of the log groups 11 and 12 (steps S12 through S14). Then, the database management device 1 registers the identifiers G11 and G12 of the log groups 11 and 12, respectively, in the updated log group list 130 (130-1) (step S15). Then, the database management device 1 outputs the updated log to the log storage devices 201, which are not depicted in FIG. 7, of the log groups 11 and 12 (step S16). Then, the database management device 1 refers to the transaction completion log output destination priority definition table 120, selects the log group 11 (G11) as a local representative log group and sets the identifier G11 of the log group 11 in the local representative log group storage table 140 (140-1) (step S17). The database management device 1 also registers the device names DBMS 2 and DBMS 3 of the database management devices 2 and 3, respectively, in the participant list 150 (step S18). Then, the database management device 1 transmits an update request packet 501 specifying the data (update target data) of the log group 21 (G21) to the database management device 2 (step S19). The database management device 1 transmits an update request packets 502 and 503 to the database management device 3 (step S19). The update request packets 502 and 503 specify the data of the log group 31 (G31) and the data of log group 32 (G32).

In response to receipt of the update request packet 501 from the database management device 1 (step S31), the database management device 2 updates the specified data of the log group 21 (step S33). Then, the database management device 2 registers the identifier G21 of the log group 21 in the updated log group list 130 (130-2) (step S34) and writes the updated log of the data in the log storage device 201, which is not depicted in FIG. 7, of the log group 21 (step S35). Then, the database management device 2 refers to the transaction completion log output destination priority definition table 120, selects the log group 21 (G21) as a local representative log group and sets the identifier G21 of the log group 21 in an update response packet 551 addressed to the database management device 1 and transmits the update response packet 551 to the database management device 1 (step S36). Then, the database management device 2 sets the identifier G21 of the log group 21 selected as the local representative log group in the local representative log group storage table 140 (140-2) (step S37).

Upon receipt of the update request packets 502 and 503, the database management device 3 performs the same process as in the database management device 2 as to each of the update request packets 502 and 503. Thus, the identifiers G31 and G32 of the log groups 31 and 32, respectively, are registered in the updated log group list 130 (130-3) (step S34). The identifier G31 of the log groups 31 is set in the local representative log group storage table 140 (140-3) on the basis of the transaction completion log output destination priority definition table 120 (step S37). The database management device 3 also transmits update response packets 552 and 553 to the database management device 1 (step S36). The identifier G31 of the log group 31 being a local representative log group is set in each of the update response packets 552 and 553.

Upon receipt of the update response packet 551 from the database management device 2 (step S20), the database management device 1 obtains the identifier G21 of the local representative log group from the update response packet 551 (step S21), relates the identifier G21 to the DBMS 2 of the participant list 150 (step S22). Upon receipt of the update response packets 552 and 553 from the database management device 2, the database management device 1 performs the same process as when receiving the update response packet 551. Thus, the identifier G31 of the log group 31 being a local representative log group is related to the DBMS 2 of the participant list 150.

Figure 8:
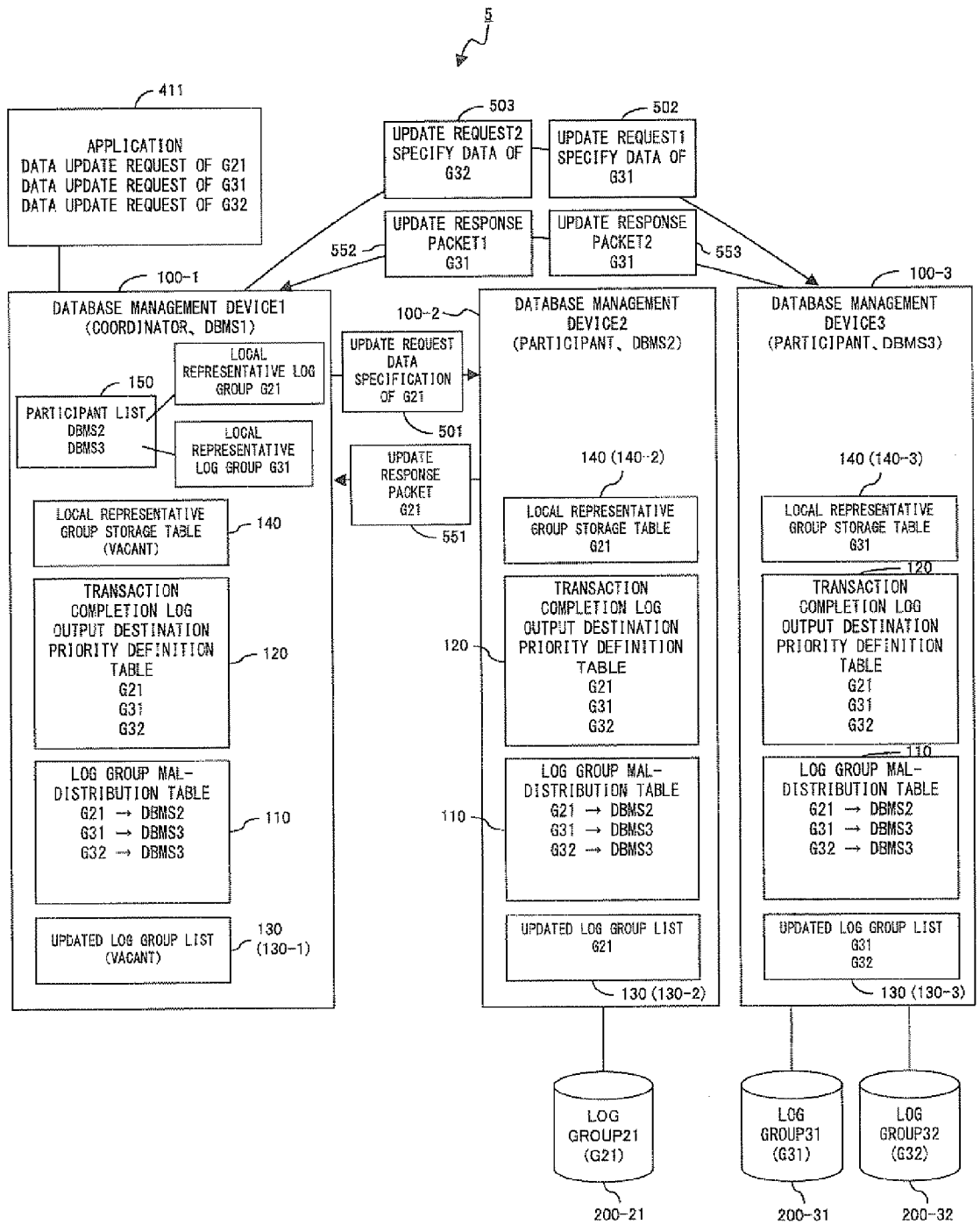
FIG. 8 is a system configuration diagram showing the process in a distributed transaction in the case where a database management device being the coordinator is provided with no log group.

FIG. 8 is a system configuration diagram showing the process in a distributed transaction in the case where a database management device being the coordinator is provided with no log group. In FIG. 8, the same reference numerals are attached to the same components as depicted in FIG. 7 and their descriptions are omitted.

In the case of the distributed transaction system 5 depicted in FIG. 8, since the database management device 1 is provided with no log group, application received by the database management device 1 requests only log groups provided for the database management devices 2 and 3 to update data. The application 411 depicted in FIG. 8 requests the log group 21 (G21) of the database management device 2 and the log groups 31 (G31) and 32 (G32) of the database management device 3 to update data. In this case, in step S31 of the flowchart depicted in FIG. 5 the database management device 1 (DBMS 1) being the coordinator determines that access to other DBMSs is needed, performs only the process in steps S18 through S22 and does not perform the process insteps S14 through S17. Thus, as depicted in FIG. 8, the updated log group list 130-1 and local representative log group storage table 140-1 provided in the main storage device of the database management device 1 become vacant. In other words, since the database management device 1 is provided with no log group, there is no log group whose data should be updated. Therefore, even when a distributed transaction is carried out, the database management device 1 has no log group that should be registered in the updated log group list 130-1. Therefore, the database management device 1 has no local representative log group. In other words, the updated log group list 130-1 and local representative log group storage table 140-1 are not needed in a two-phase commit process performed later. As to the database management devices 2 and 3, the same process as in the distributed transaction system 4 depicted in FIG. 7 is performed.

{Overall Flow of a Two-Phase Commit Process}

Figure 9:
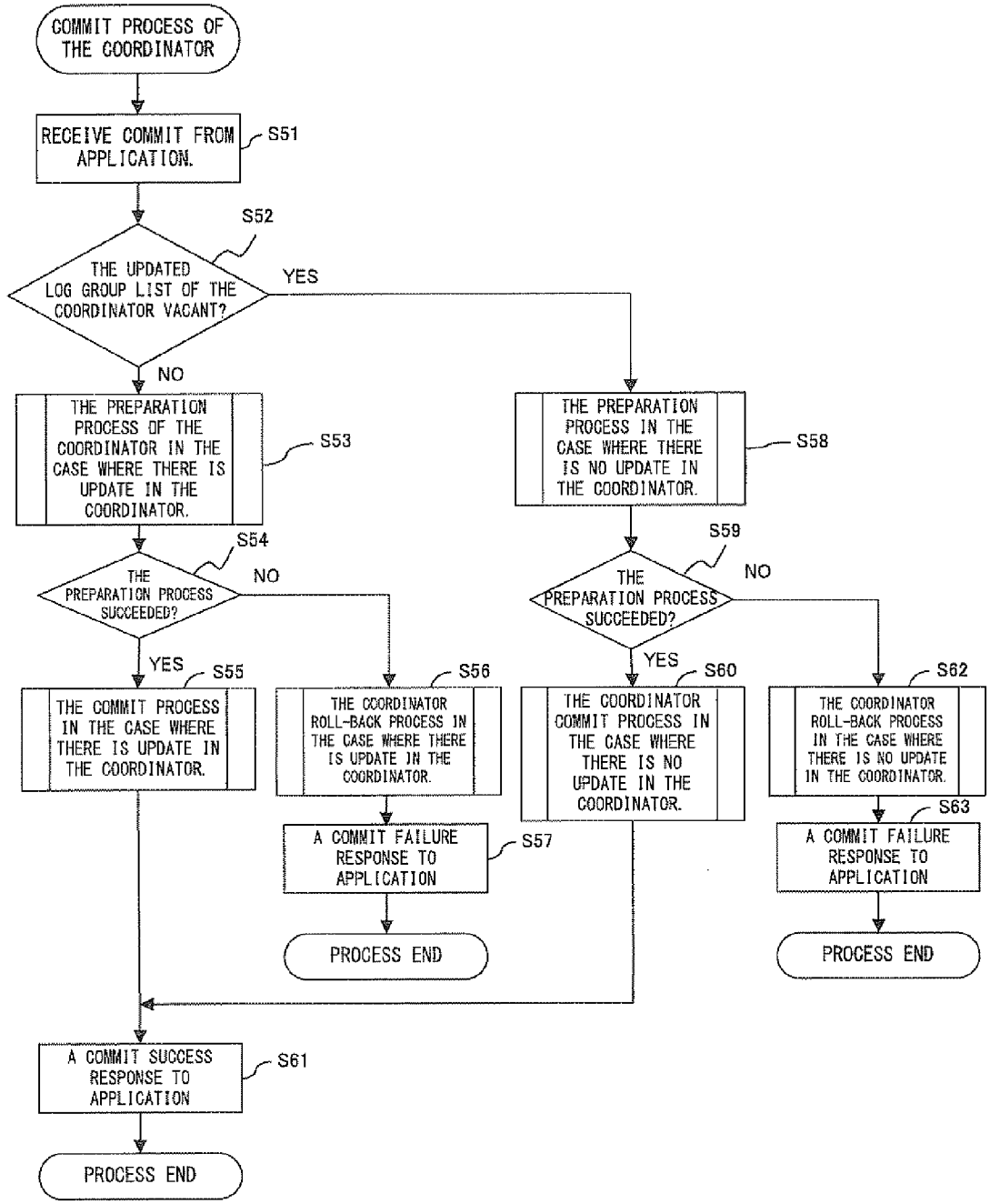
FIG. 9 is a flowchart showing the overall flow of a two-phase commit process in this preferred embodiment.

FIG. 9 is a flowchart showing the overall flow of a two-phase commit process in this preferred embodiment. The overall flow of this two-phase commit process is described.

Upon receipt of a commit instruction from application (step S51), the coordinator determines whether the updated log list in the main storage device of the coordinator is vacant (step S52). If the updated log list is vacant, a "preparation process in the case where there is the update (data update) of a log group in the coordinator" is performed (step S53). The detailed process in step S53 is described later.

After the preparation process in step S53 is completed, the coordinator determines whether the preparation process has succeeded (step S54). In this case, success means that all the participants have succeeded in their preparation processes and the message of "preparation process completion" is replied to the coordinator.

If the coordinator determines that the preparation process has succeeded (YES in step S54), the coordinator performs a "commit process in the case where there is the update of a log group in the coordinator" (step S55), returns "commit success" to the application (step S61) and terminates the process of this flowchart. The detailed process in step S55 is described later.

If in step S54 the coordinator determines that the preparation process has failed (NO in step S54), the coordinator performs a "roll-back process in the case where there is no update of a log group in the coordinator" (step S56), returns "commit failure" to the application (step S57) and terminates the process of this flowchart. The detailed process in step S56 is described later.

If in step S51 the coordinator determines that the updated log group list of the coordinator is vacant (YES in step S52), the coordinator performs a "preparation process in the case where there is no update of a log group in the coordinator" (step S58). The detailed process in step S58 is described later.

After the preparation process in step S58 is completed, the coordinator determines that the preparation process has succeeded (YES in step S59), the coordinator performs the "preparation process in the case where there is no update of a log group in the coordinator" (step S60) and the process proceed to step S61. The detailed process in step S60 is described later.

If the coordinator determines that the preparation process has failed (NO in step S59), the coordinator performs the "roll-back process in the case where there is no update of a log group in the coordinator" (step S62), returns "commit failure" to the application (step S63) and terminates the process of this flowchart. The detailed process in step S62 is described later.

<Process in the Case where there is Update in the Coordinator>

{Preparation Process of the Coordinator in the Case where there is Update in the Coordinator}

Figure 10:
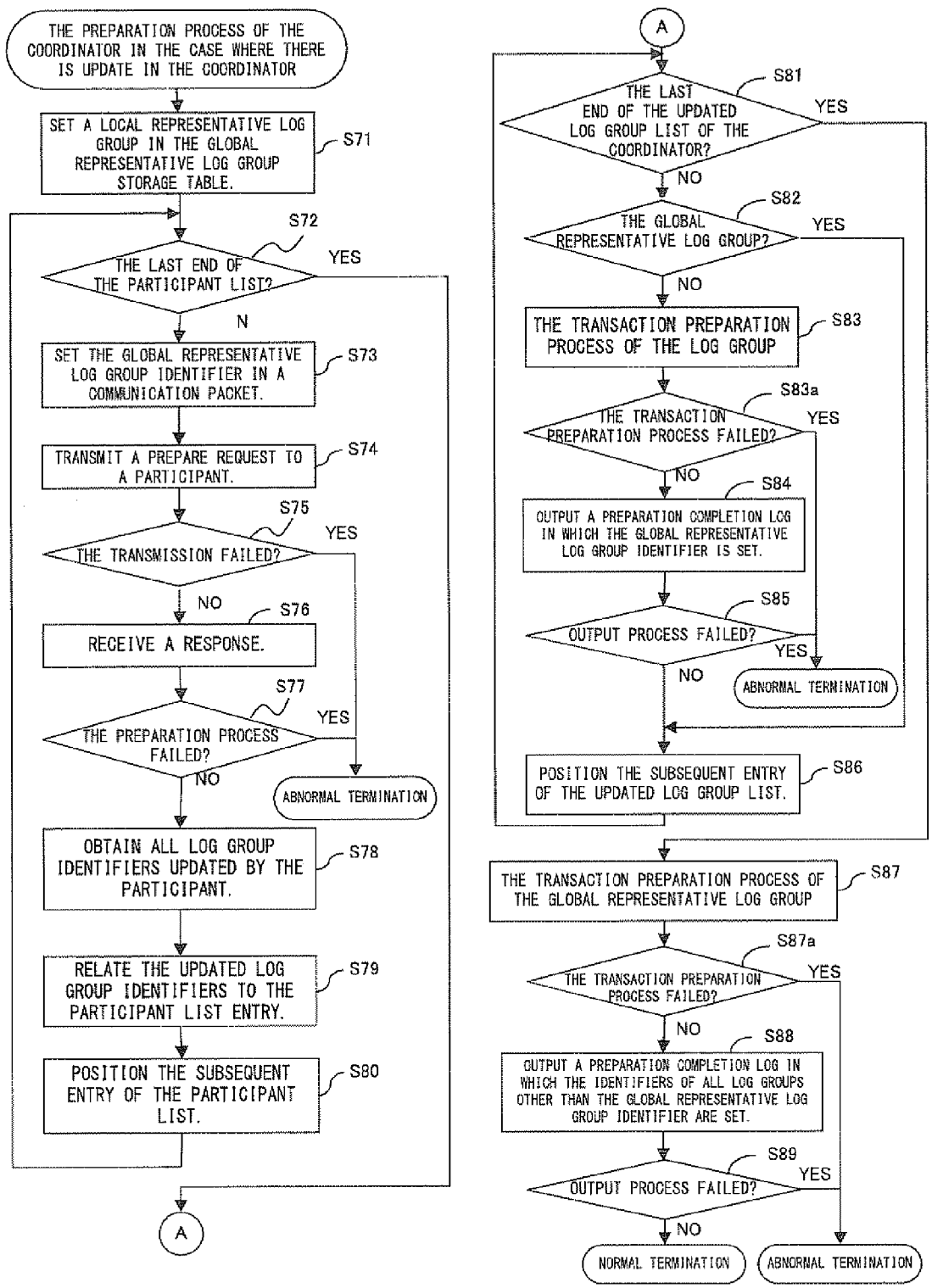
FIG. 10 is a flowchart showing the preparation process of the coordinator in the case where there is update in the coordinator.

FIG. 10 is a flowchart showing the preparation process of the coordinator in the case where there is update in the coordinator. The process depicted in this flowchart corresponds to the process of the coordinator in step S53 depicted in FIG. 9.

The coordinator sets the local representative log group (identifier Gik of the local representative log group) set in the local representative log group storage table in a global representative log group storage table, which is described later (step S71). Then, the coordinator refers to the current entry of the participant list and determines whether it is the last end of the participant list (step S72). If the coordinator determines that it is not the last end of the participant list (NO in step S72), the coordinator extracts "DBMS I" from the current entry of the participant list, stores it in the main storage device and sets the identifier Gik of the global representative log group set in the global representative log group definition table in a communication packet (step S73). Then, the coordinator transmits "prepare request" message to the database management device i being a participant by transmitting the communication packet to the database management device i having the name of "DBMS i" extracted from the participant list in step S73 (step S74).

Then, the coordinator determines whether the transmission of the prepare request message has failed (step S57). This has failed, for example, due to a communication failure or the like. The coordinator determines that it has failed, for example, if there is no response from the participant even in a prescribed time later after transmitting the prepare request message.

If in step S75 the coordinator determines that it has not failed (NO in step S57), the coordinator receives a response communication packet from the participant (step S76). Then, the coordinator determines whether the preparation process of the participant has failed on the basis of the response contents (step S77).

If the coordinator determines that it is a "transmission failure" in step S75 (YES in step S75) or a "preparation process failure" in step S77 (YES in step S77), the process of this flow chart is abnormally terminated. This abnormal termination is determined that "the preparation process has failed" in step S54 of the flowchart depicted in FIG. 9.

If in step S77 the coordinator determines that the preparation process has succeeded (NO in step S77), the coordinator obtains the identifiers of all the log groups updated by the participant from the communication packet received in step S76 (step S78). Then, the coordinator relates the obtained identifiers of all the log groups to the DBMS i of the participant list (step S79). Then, the coordinator positions the entry of the participant list in a subsequent entry (step S80) and the process returns to step S72.

In this way, until in step S72 it is determined that the current entry of the participant list is the last end of the participant list (YES in step S72), in other words until the processes of all DBMS i registered in the participant list are completed, the processes in steps S73 through S80 are repeated. Thus, the coordinator transmits the message of "prepare request" to all the participants participated in the distributed transaction and handles responses to it from the participants.

If in step S72 it is determined that it is the last end of the participant list (YES in step S72), the flow advances to step S81. Specifically, the response message of "preparation process success" is received from all the participants, the flow advances to step S81.

In step S81 and after, the same processes as in steps S72 through S80 are performed on the updated log group list.

Firstly, the coordinator determines whether the current entry of the updated log group list is the last end (step S81). If it is determined that it is not the last end (NO in step S81), the process advances to step S82. If it is determined that it is the last end (YES in step S81), the process advances to step S87.

In step S82, the coordinator extracts the identifier of the log group from the current entry and determines whether the identifier is that of the global representative log group. Then, it is not the identifier of the global representative log group (NO in step S82), the process advances to step S83. If it is the identifier of the global representative log group (Yes in step S82), the process advances to step S86.

In step S83, the coordinator performs the "transaction preparation process" of a log group having the identifier extracted in step S82. Then, the coordinator determines whether the transaction preparation process has failed (step S83a). If it is determined that it has succeeded (NO in step S83a), the process advances to step S84. If it is determined that it has failed (YES in step S83a), the process of this flowchart is abnormally terminated. This abnormal termination is determined to be "preparation process failure" in step S54 shown in FIG. 9.

In step S84, the coordinator reads the "global representative log group" from the global representative log group table and outputs the "preparation completion log" in which it is set to the log storage device of the log group.

Then, the coordinator determines whether the output process of the preparation completion log has failed (step S85). If it is determined that the output process has failed (YES in step S85), the process of this flowchart is abnormally terminated. This abnormal termination is determined to be "preparation process failure" in step S54 depicted in FIG. 9.

If in step S85 the coordinator determines that the preparation process of the log group has succeeded (NO in step S85), the coordinator positions the current entry of the update log group list in a subsequent entry (step S86) and the process returns to step S81.

Then, the coordinator determines whether the output process of the preparation completion log has failed (step S85). The coordinator positions the entry of the updated log group list in a subsequent entry (step S86) and the process returns to step S81.

Thus, in step S81 until the current entry of the updated log group list in a subsequent entry is the last end of the updated log group list (YES in step S81), the processes in steps S81 through S86 are repeated. Thus, the transaction preparation processes of log groups other than the global representative log group registered in the updated log group list are performed.

In step S87, the coordinator performs the "transaction preparation process" of the global representative log group. Then, the coordinator determines whether the transaction preparation process has failed (step S87a). If it has succeeded (NO in step S87a), the process advances to step S88. If it has failed (YES in step S87a), the process of this flowchart is abnormally terminated.

In step S88, the coordinator outputs a preparation completion log in which a list (participating log group list) of the identifiers of log groups other than the global representative log group to which the preparation process is applied in the two-phase commit of a distributed transaction to the log storage device of the global representative log group.

Then, the coordinator determines whether the output process of the preparation completion log has failed (step S89). If it is determined that the output process of the preparation completion log has succeeded (NO in step S89), the process of this flowchart is normally terminated. If it is determined that it has failed (YES in step S89), the process of this flowchart is abnormally terminated. In step S54 depicted in FIG. 9, the normal termination and the abnormal termination are determined as the "preparation process success" and "preparation process failure", respectively.

{Preparation Process of a Participant in the Case where there is Update in the Coordinator}

Figure 11:
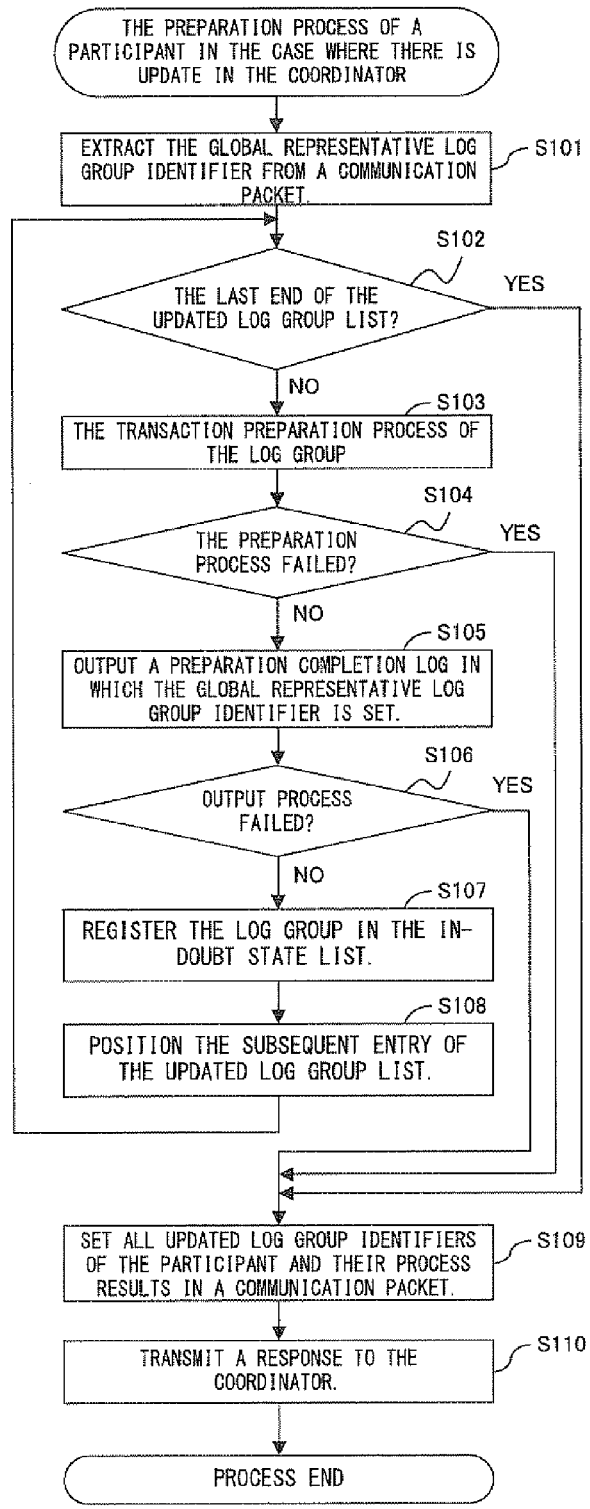
FIG. 11 is a flowchart showing the preparation process of a participant in the case where there is update in the coordinator.

FIG. 11 is a flowchart showing the preparation process of a participant in the case where there is update in the coordinator.

Upon receipt of the communication packet from the coordinator, a participant extracts a "global representative log group identifier" from the communication packet (prepare request packet) and sets it in a global representative log group table, which is described later, generated in the main storage device (step S101). Then, the participant determines whether the current entry of the updated log group list is its last end (step S102). If it is not the last end (NO in step S102), the process advances to step S103. If it is the last end (YES in step S102), the process advances to step S109. In step S102 it is determined whether as to all the log groups registered in the updated log group list, processes in step S103 and after are completed.

In step S103, the participant extracts a log group from the current entry of the updated log group list and prepares for the transaction of the log group. Then, the participant determines whether the transaction preparation process has failed (step S104). If it has succeeded (YES in step S104), the process advances to step S105. If it has failed (NO in step S104), the process advances to step S109.

Step S105, the participant outputs the "preparation completion log in which the global representative log group identifier set in the global representative log group table" to the log storage device of the log group extracted in step S103 (step S105). Then, the participant determines whether the output process of the preparation completion log has failed (step S106). If it is determined that the output process has succeeded (NO in step S106), the process advances to step S107. If it is determined that the output process has failed (YES in step S106), the process advances to step S109.

In step S107, the participant registers the log group in the in-doubt state list, which is described later. Then, the participant positions the current entry of the updated log group list in a subsequent entry (step S108) and the process returns to step S102.

In this way, as long as the "transaction preparation process" or the "output process of the preparation completion log" has not failed, the processes in steps S102 through S108 are repeated until in step S102 it is determined that the current entry of the updated log group list is its last end.

Thus, after as to all the log groups registered in the updated log group list, both the "transaction preparation process" and the "output process of the preparation completion log" are completed, the transaction preparation process of the participant has succeeded. In this case, the identifiers of all the log groups registered in the updated log group list are registered in the in-doubt state list. If as one of the log groups registered in the updated log group list, either the "transaction preparation process" or the "output process of the preparation completion log" has failed, the transaction preparation process of the participant has failed.

If in either of steps S102, S104 or S106 YES is determined, the process advances to step S109.

In step S109, the participant sets the "identifiers of all the log groups to which the transaction preparation process is applied" and the "process result of the transaction preparation process" in a communication packet (preparation response packet", transmits the preparation response packet to the coordinator (step S110) and terminates the process of this flowchart. The preparation response packet is received by the coordinator in step S76 depicted in FIG. 10.

Thus, the participant applies the transaction preparation process to all the log groups registered in the updated log group list. Then, if as to all the log groups, the transaction preparation process has succeeded (the participants have succeeded in the transaction preparation process), the identifiers of all the log groups are registered in the in-doubt state list. As a result, the identifiers of all the log groups in the in-doubt state are registered in the in-doubt state list of the participants.
{System Configuration in the Case where the Transaction Preparation Process of Two-Phase Commit is Performed}

Figure 12:
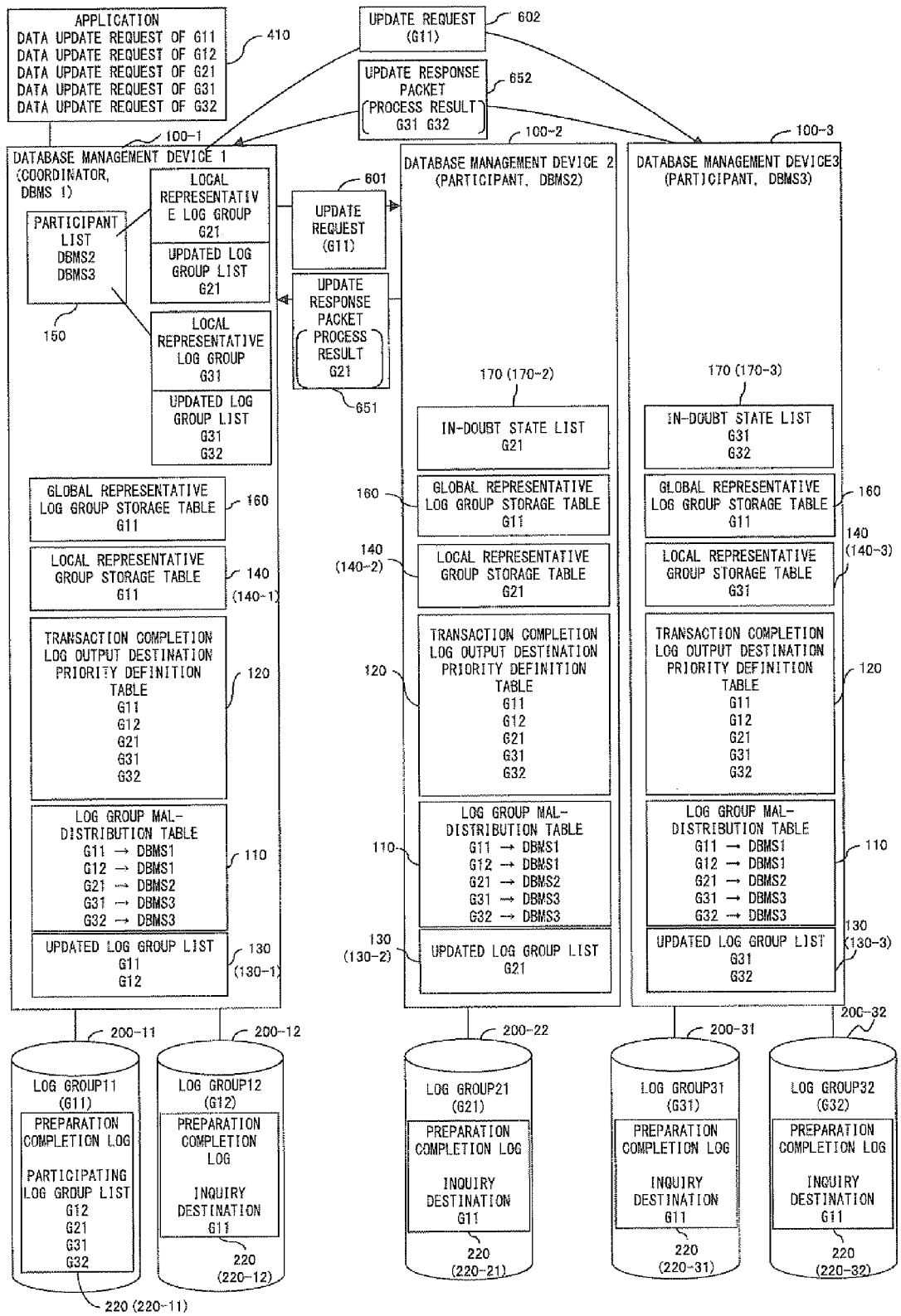
FIG. 12 illustrates the system configuration state in the case where the transaction preparation process of two-phase commit is performed in the distributed transaction system depicted in FIG. 7.

FIG. 12 illustrates the system configuration state in the case where the transaction preparation process of two-phase commit is performed in the distributed transaction system depicted in FIG. 7. In FIG. 12, the same reference numerals are attached to the same components depicted in FIG. 7.

The database management device 1 being the coordinator sets the identifier G11 of the local representative log group set in the local representative log group storage table 140-1 in the global representative log group table 160 generated in the main storage device as the "identifier of the global representative log group" (step S71). Then, the database management device 1 sets the identifier G11 of the global representative log group in communication packets (prepare request packets) 601 and 602 transmitted to the participants (database management devices 2 and 3) (step S73) and transmits the prepare request packets 601 and 602 to the database management devices 2 and 3, respectively (step S74).

Upon receipt of the prepare request packet 601, the database management device 2 being the first participant extracts the global representative log group from the packet 601 and sets it in the global representative log group table 160 (step S101). Then, the database management device 2 performs the transaction preparation process of the log group 21 whose identifier G21 is set in the updated log group list 130-2 (step S103). If the database management device 2 has succeeded in the transaction preparation process, the database management device 2 outputs a preparation completion log 220-21 in which the identifier G11 of the global representative log group is set to the log group 21 (step S105). If the database management device 2 has succeeded in outputting the transaction preparation completion log 220-21, the database management device 2 registers the identifier G21 of the log group 21 in the in-doubt state list 170 (170-2) (step S107). In the database management device 2, since the log group registered in the updated log group list 130-2 is only the log group 21, the database management device 2 sets the identifier G21 of the log group 21 and its process result in a communication packet (preparation response packet) 651 and transmits it to the coordinator (database management device 1) (step S110).

The coordinator (database management device 1) receives the preparation response packet 651 (step S76), extracts the "process result" from the preparation response packet 651.

The coordinator determines that the transaction preparation process of the database management device 2 has succeeded (NO in step S77), the coordinator obtains the identifier G21 of the log group 21 from the preparation response packet 651 (step S78). Then, the coordinator relates the identifier G21 to the DBMS 2 of the participant list 150.

The same process as described above is performed between the coordinator (database management device 1) and the second participant (database management device 3). Thus, the prepare request packet 602 is transmitted from the database management device 1 to the database management device 2. The database management device 2 extracts the identifier G11 of the global representative log group from the prepare request packet 602 and sets it in its main storage device. Then, the database management device 2 applies the transaction preparation process to the log groups 31 and 32 whose identifiers G31 and G32 are registered in the updated log group list 130-3 and outputs the identifiers G31 and G32 to the log storage devices of the log groups 31 and 32, respectively. Then, if the database management device 2 has succeeded in the transaction preparation process and the output of the preparation completion log, the database management device 2 registers the identifiers G31 and G32 of the log groups 31 and 32 in the in-doubt state list 170 (170-3). Then, the database management device 2 transmits a preparation response packet 652 in which the "identifiers G31 and G32 of the log groups 31 and 32" and the "process result of the transaction preparation process" are set to the database management device 1. The database management device 1 receives the preparation response packet 652 and if the database management device 1 determines that the database management device 3 has succeeded in the transaction preparation process, the database management device 1 relates the identifiers G31 and G32 of the log groups 31 and 32 to the DBMS 3 of the participant list 150.

The coordinator (database management device 1) firstly reads out the identifier G11 of the log group 11 and determines that the log group 11 is the global representative log group (YES in step S82). Then, the coordinator (database management device 1) reads out the identifier G12 of the log group 12 from the updated log group list 130-1 and when determining that the log group 12 is not the global representative log group (NO in step S82), the coordinator (database management device 1) performs the transaction preparation process of the log group 11 (step S83). Then, the coordinator (database management device 1) outputs the preparation completion log 220-12 in which the identifier G11 of the global representative log group 11 to the log storage device of the log group 12 (step S84). Then, the coordinator (database management device 1) performs the transaction preparation process of the log group 11 being the global representative log group (step S88) and outputs the preparation completion log 220-11 in which the identifiers G12, G21, G31 and G32 of the log groups (log groups 12, 21, 31 and 32) other than the global representative log group to which the transaction preparation process is applied to the log storage device of the log group 11 (step S88). In the process of extracting the identifiers of the log groups set in the preparation completion log 220-11 in step S88, the updated log group list 130-1 and the participant list 150 are referenced.

In this case, the identifiers of the log groups (excluding the identifier of the global representative log group) that has participated in the transaction preparation process of two-phase commit are set in the preparation completion log 220 of the transaction preparation process of the global representative log group (log group 11 in this example) as a "participating log group list" (step S88). The identifier of the global representative log group is set in the preparation completion log 220 of the transaction preparation process of log groups other than the global representative log group as an "inquiry destination".

As described above, in this preferred embodiment, the identifier of the global representative log group is set in the prepare request packet transmitted from the coordinator to participants. The identifier of log group whose data the participants have updated (applied a transaction preparation process) in a preparation response packet being a response (voting) from the participants to the coordinator. The identifiers of log groups in the in-doubt state that are managed by the participants are set in the in-doubt state list 170 of the participants. This in-doubt state list 170 is used to release log groups in the in-doubt state from the in-doubt state as described later. The global representative log group is selected from log groups updated (to which a transaction preparation process is applied) in a distributed transaction. For the global representative log group, the local representative log group of a database management device i for playing a role of the coordinator is selected. In this preferred embodiment, a log group having top priority in the transaction completion log out put destination definition table 120 is selected for the global representative log group. This global representative log group is set in a global representative log group table 160 provided in the main storage device of each database management device participating in the distributed transaction. In other words, global representative log groups are set in the global representative log group table 160.

{Commit Process of Two-Phase Commit}

Figure 13:
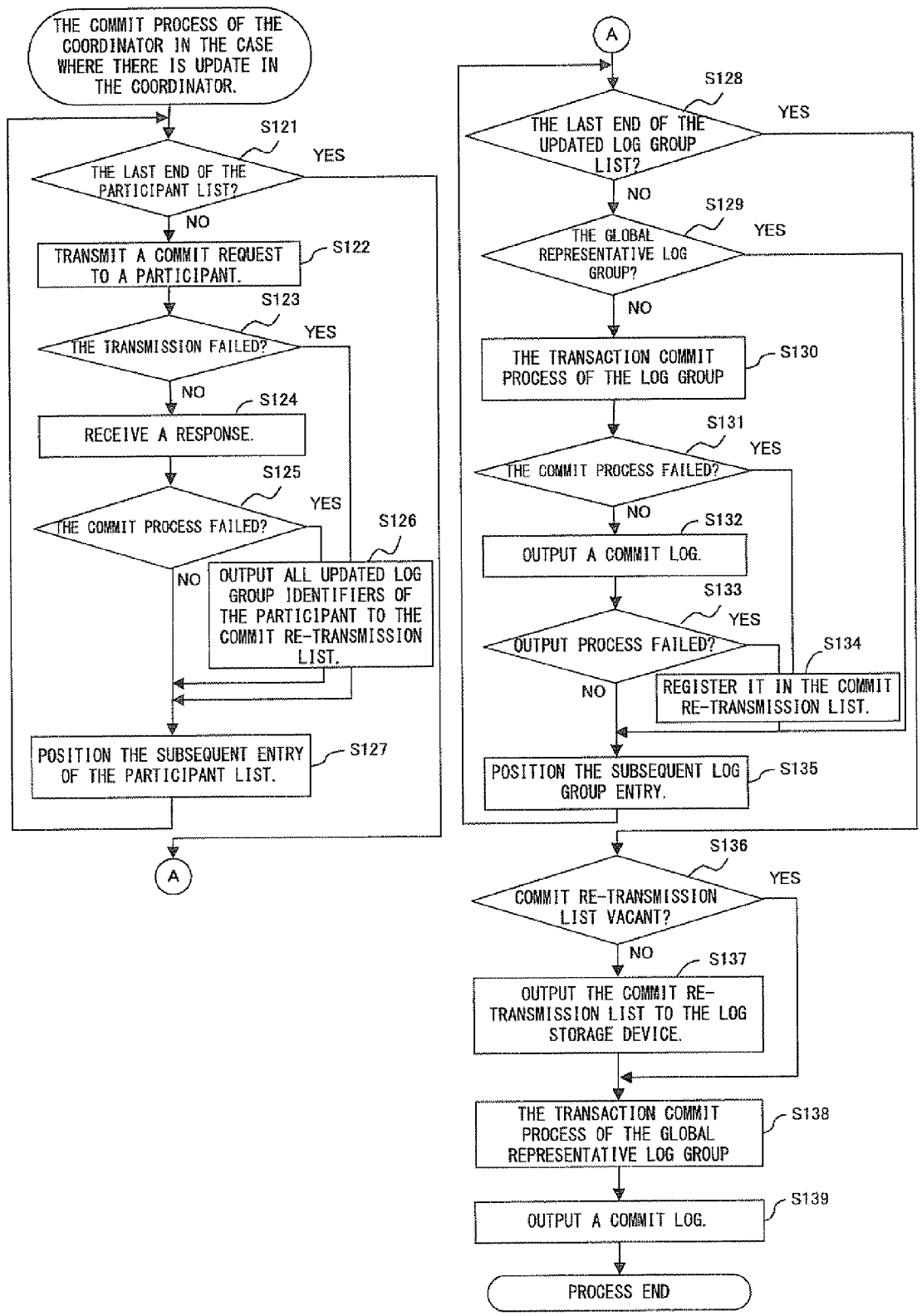
FIG. 13 is a flowchart showing the commit process of the coordinator in the case where there is update in the coordinator.

FIG. 13 is a flowchart showing the commit process of the coordinator in the case where there is update in the coordinator.

As being clear from FIG. 12, after the completion of the preparation process of two-phase commit, a list of the participants of the distributed transaction and a list of updated log groups in a participant are registered in the participant list of the coordinator. Therefore, when requesting participants to commit in the commit process of two-phase commit, the coordinator refers to the participant list 150. Of the log groups managed by the coordinator, log groups updated in the distributed transaction are registered in the updated log group list 130.

After the above-described assumption is understood, the flowchart depicted in FIG. 13 is described.

The coordinator determines whether the current entry of the participant list is its last end (step S121). If it is not the last end of the participant list (NO in step S121), the process advances to step S122. If it is the last end of the participant list (YES in step S121), the process advances to step S128. The fact that the current entry of the participant list is its last end means that the transmission of a commit request is completed as to all the participants registered in the participant list.

In step S122, the coordinator extracts the names of participants (DBMS i) from the current entry of the participant list and transmits a commit request (commit request packet) to participants having their names. Then, the coordinator determines whether the transmission of the commit request has failed (step S123). If it is determined that the transmission has succeeded (NO in step S123), the process advances to step S124. If it is determined that the transmission has failed (YES in step S123), the process advances to step S126.

In step S124, the coordinator receives responses (commit response packet) from the participants to which the commit request is transmitted. Then, the coordinator refers to a process result stored in the commit response packet and determines whether a participant has failed in its commit process (step S125). If the participant has failed in its commit process (YES in step S125), the process advances to step S126. If the participant has succeeded in its commit process (NO in step S125), the process advances to step S127.

In step S126, the coordinator obtains all the updated log groups of a participant that has failed in the commit process from the participant list and outputs the obtained updated log groups to the commit re-transmission list, which is described later, of its main storage device. Then, the process advances to step S127.

In step S127, the coordinator positions the current entry of the participant list in a subsequent entry. Then, the process returns to step S121.

In this way, in step S121, the coordinator repeats the processes in steps S121 through S127 until it determines that the current entry of the participant list is its last end (YES in step S121). Thus, the coordinator transmits a commit request packet to all the participants registered in the participant list. In this case, the coordinator registers all the updated log groups of a participant to which the coordinator has failed to transmit a commit request packet or which has failed in its commit process in the commit re-transmission list in its log storage device.

Then, the coordinator moves to the commit process of updated log groups managed by it.

In step S128, the coordinator determines whether the current entry of the updated log group list is its last end. If it is the last end of the updated log group list (YES in step S128), the process advances to step S136. If it is not the last end of the updated log group list (NO in step S128), the process advances to step S129.

In step S129, the coordinator determines whether the current entry of the updated log group is a global representative log group (identifier of a global representative log group). If it is not a global representative log group (NO in step S129), the process advances to step S130. If it is a global representative log group (YES in step S129), the process advances to step S135.

In step S130, the coordinator performs the transaction commit process of a log group in the current entry of the updated log group list (log group other than a global representative log group). Then, the coordinator determines whether the transaction commit process has failed (step S131). If it has failed (YES in step S131), the process advances to step S134. If it has succeeded (NO in step S131), the process advances to step S132.

In step S132, the coordinator outputs the commit log of a log group that has succeeded in the transaction commit process to the log storage device. Then, the coordinator determines whether the output of the commit log has failed (step S133). If it has failed (YES in step S133), the process advances to step S134. If it has succeeded (NO in step S133), the process advances to step S135.

In step S134, the coordinator registers a log group that has failed in the transaction commit process in the commit re-transmission list in the main storage device. Then, the process advances to step S135. In step S135, the coordinator positions the current entry of the updated log group list in a subsequent entry. Then, the process returns to step S128.

In this way, in step S128, the coordinator repeats the processes in steps S128 through S135 until it determines that the current entry of the participant list is its last end. Thus, the transaction commit process of a log group other than a global representative log group, registered in the updated log group list of the coordinator is performed. In this case, as to a log group that has failed in a commit process or has failed in the output of a commit log although they have succeeded in the commit process, its identifier is registered in the commit re-transmission list in the main storage device. Specifically, the commit process of such a log group has not completed, it is recorded on the commit re-transmission list in the main storage device in order to perform a commit process again.

In step S136, the coordinator determines whether the commit re-transmission list is "vacant". If the commit re-transmission list is not vacant (NO in step S136), outputs the commit re-transmission list to the log storage device of a global representative log group (step S137) and the process advances to step S138. If in step S136 it is determined that the commit re-transmission list is vacant (YES in step S136), the process advances to step S138.

In this way, while applying a commit process to all the updated log groups other than a global representative log group, the coordinator continues to register the identifiers of all the updated log groups that have failed to commit in the commit re-transmission list in the main storage device. After the execution of the commit process of those updated log groups are completed, the coordinator stores the commit re-transmission list in the log storage device. Therefore, the identifiers of all the updated log groups other than the global representative log group, to which a commit request must be re-transmitted are registered in the commit re-transmission list stored in the log storage device of the global representative log group.

In step S138, the coordinator performs the transaction commit process of a global representative log group. In this case, the global representative log group is obtained, for example, from a global representative log group table. Then, the coordinator outputs the commit log of the global representative log group to the log storage device (step S139) and terminates the process of this flowchart.

After the transaction commit process of the global representative log group in step S138 and the commit log of the global representative log group in step S139, a process of determining whether those processes have failed is not performed. In this way, in the case of a global representative log group, even when the output of a commit log has failed, it is ignored. This is because at this time point it is ensured that all the updated log groups of all the participants of the distributed transaction are in the commit state and the participating log group list stores in the preparation completion log can be used as a commit re-transmission list as described later even when the coordinator downs.

Figure 14:
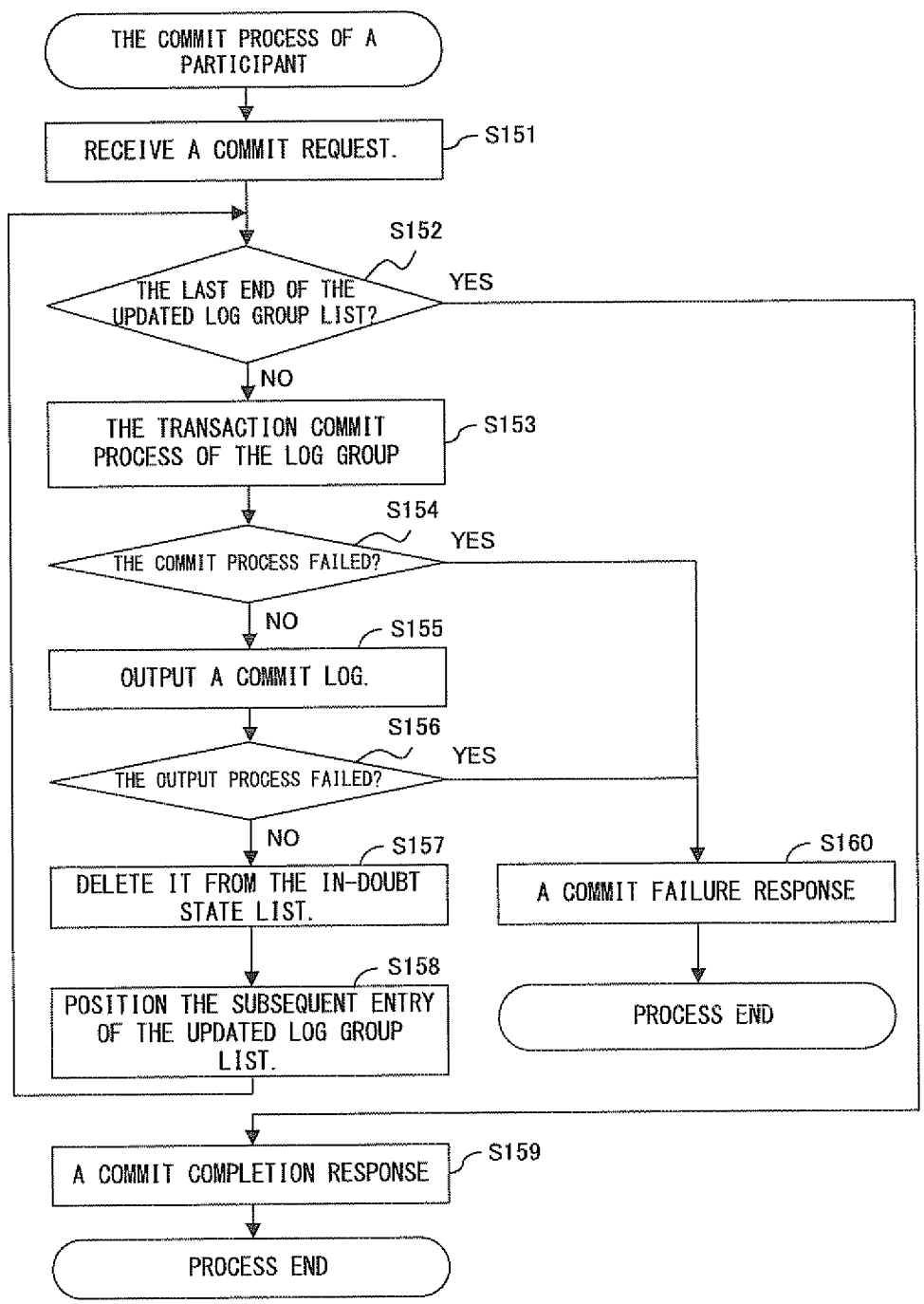
FIG. 14 is a flowchart showing the commit process of a participant in the case where there is update in the coordinator.

FIG. 14 is a flowchart showing the commit process of a participant in the case where there is update in the coordinator. The commit process of a participant in the case where there is no update in the coordinator is the same as the flowchart depicted in FIG. 14.

Upon receipt of a "commit request packet" transmitted by the coordinator (step S151), a participant determines whether the current entry of the updated log group list is its last end (step S152). If it is not the last end of the updated log group list (NO in step S152), the process advances to step S153. If it is the last end of the updated log group list (YES in step S152), the process advances to step S159.

In step S153, a participant performs the transaction commit process of a log group having the identifier registered in the current entry of the updated log group list. Then, the participant determines whether the transaction commit process has failed (step S154). If the participant determines that the transaction commit process has succeeded (NO in step S154), the process advances to step S155. If the participant determines that the transaction commit process has failed (YES in step S154), the process advances to step S160.

In step S155, the participant outputs the commit log of a log group that has succeeded in the transaction commit process to its log storage device. Then, the participant determines whether the output of the commit log has failed (step S156). If it is determined that the output of the commit log has succeeded, the process advances to step S157. If it is determined that the output of the commit log has failed, the process advances to step S160.

In step S157, the participant deletes the identifier of a log group that has succeeded in outputting the commit log from the in-doubt state list. Then, the participant positions the current entry of the updated log group list in a subsequent entry (step S158) and the process returns to step S152.

In this way, in step S152, the processes in step S152 through S158 are repeated until the participant determines that the current entry of the updated log group list is its last end (YES in step S152). Then, in step S152 when it is determined that the current entry of the updated log group list is its last end (YES in step S152), the participant transmits a "commit completion response" (commit response packet indicating that the process result is "success") to the coordinator (step S159) and the process of this flowchart is terminated.

In step S160, the participant transmits a "commit failure packet" (commit response packet indicating that the process result is "failure") to the coordinator and the process of this flowchart is terminated.

Thus, when the "transaction commit process" and the "output of a commit log" has succeeded as to all the log groups registered in the updated log group list of the participant, the commit completion response is returned to the coordinator. Otherwise, the commit failure response is returned to the coordinator. Of the log groups registered in the updated log group list, a log group that has succeeded in the "transaction commit process" and the "output of a commit log" is deleted from the in-doubt state list.

{System Configuration Diagram Showing a Commit Process in the Case where there is Update in the Coordinator}

Figure 15:
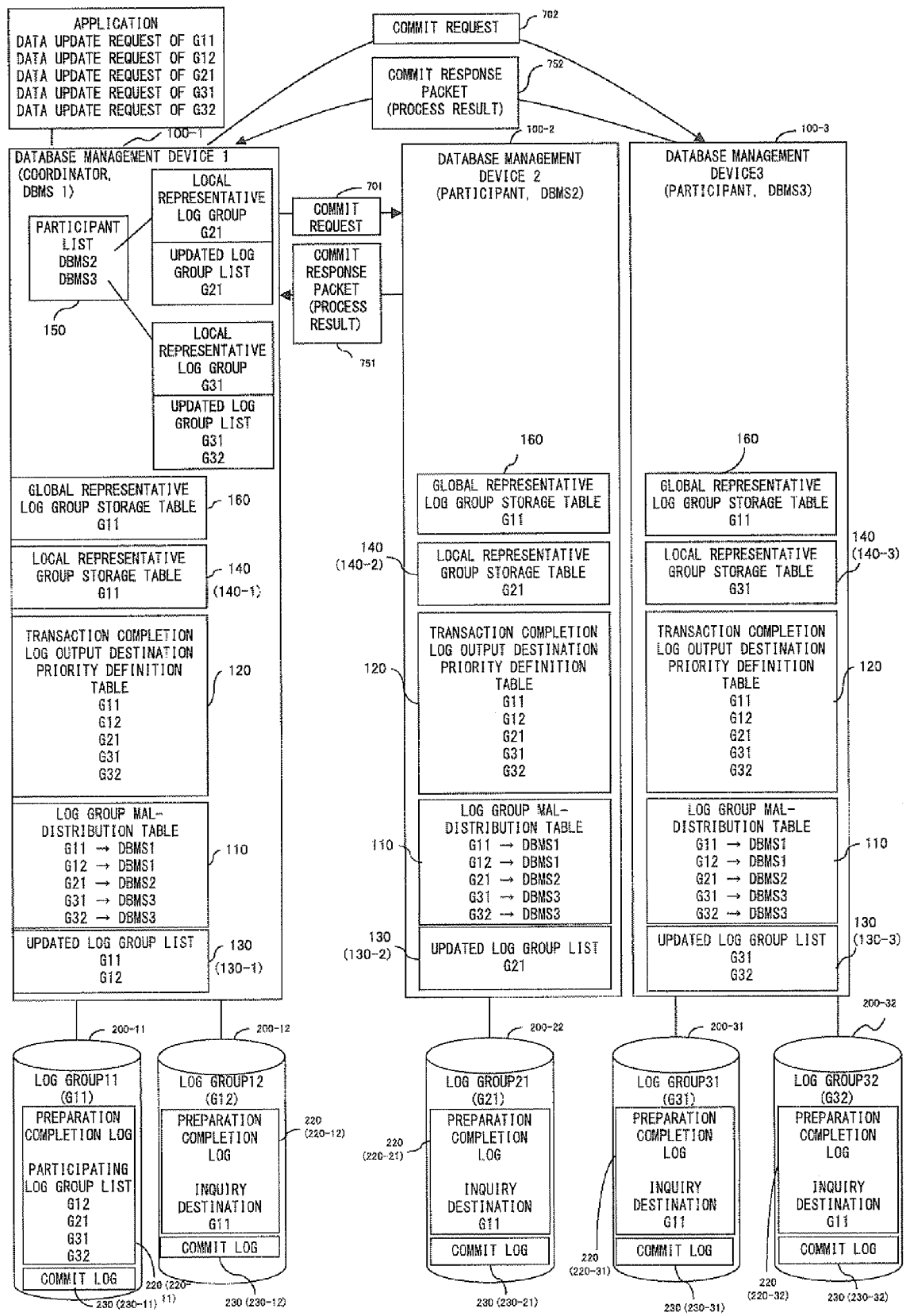
FIG. 15 is a system configuration diagram showing the state transition of a distributed transaction system in the case where the commit process depicted in the flowcharts depicted in FIGS. 13 and 14 in the distributed transaction system in the in-doubt state depicted in FIG. 12 (No. 1).

FIG. 15 is a system configuration diagram showing the state transition of a distributed transaction system in the case where the commit process depicted in the flowcharts depicted in FIGS. 13 and 14 in the distributed transaction system in the in-doubt state depicted in FIG. 12 (No. 1). FIG. 15 exemplifies the case where all the participants of a distributed transaction (including the coordinator in this case) have succeeded in the commit process. In FIG. 15, the same reference numerals are attached to the same components as depicted in FIG. 12.

The coordinator (database management device 1) refers to the participant list 150 and firstly transmits a commit request packet 701 to the first participant (database management device 2) having a device name DBMS 2 stored in the first entry. Upon receipt of the commit request packet 701, the first participant refers to an updated log group list 130-2 and applies a commit process to the log group 21 whose identifier (G21) is registered in the updated log group list 130-2. If the commit process has succeeded, the first participant stores a commit log 230 (230-21) in its log storage device 201-21. The first participant also deletes the identifier G21 of the log group 21 from an in-doubt state list 170-2. FIG. 15 illustrates the state where this identifier G21 is deleted from the in-doubt state list 170-2. Then, the first participant transmits a commit response packet 751 storing its "process result (success)" to the coordinator. Upon receipt of this commit response packet 751, the coordinator refers to the "process result" stored in it and determines that the first participant has succeeded in the commit process.

Then, the coordinator transmits a commit request packet 702 to the second participant (database management device 3) having a device name DBMS 3 stored in the second entry of the participant list. Upon receipt of the commit request packet 702, the second participant refers to an updated log group list 130-3 and performs the commit processes of the log groups 31 and 32 whose identifiers (G31 and G32) are registered in it and outputs a commit log. In this case, firstly a commit process is applied to the log group 31 and a commit log is outputted. Then, a commit process is applied to the log group 32 and a commit log is outputted. The commit log 230 (230-31) of the log group 31 is outputted to its log storage device 201-31 and the commit log 230 (230-32) of the log group 32 is outputted to its log storage device 201-32. If both the commit processes of the log groups 31 and 32 and the output of their commit logs have succeeded, the second participant deletes those identifiers G31 and 32 from an in-doubt state list 170-3. FIG. 15 illustrates the state where these identifiers G31 and G32 are deleted from the in-doubt state list 170-3. Then, the second participant transmits a commit response packet 752 storing its "process result (success)" to the coordinator. Upon receipt of this commit response packet 752, the coordinator refers to the "process result" stored in the packet 752 and determines that the second participant has succeeded in the commit process.

Then, the coordinator refers to its own updated log group list 130-1 and performs the commit processes of the log groups registered the updated log group list 130-1. As depicted in FIG. 15, the identifier G11 of the log group (global representative log group) 11 and the identifier G12 of the log group 12 are registered in the first and second entries of the updated log group list 130-1. The coordinator firstly performs the commit process of the log group being not a global representative log group. Then, if the commit process has succeeded, the coordinator outputs a commit log 230 (230-12) to the log storage device 201-12 of the log group 12. Then, if the output has succeeded, then the coordinator outputs the commit log 230 (230-12) to the log storage device 201-11 of the log group 11. Then, if the output has succeeded, the commit process is terminated.

Figure 16:
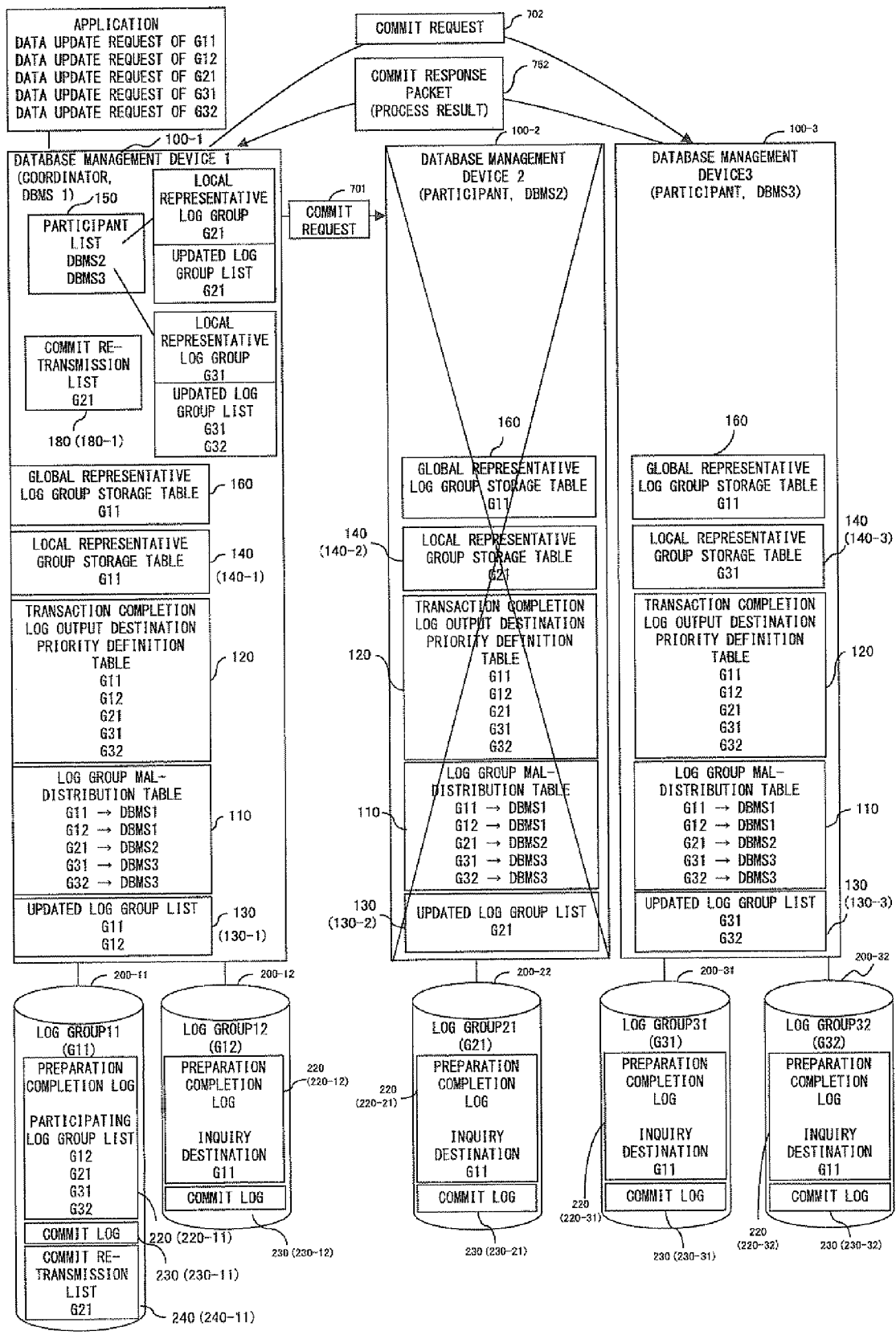
FIG. 16 is a system configuration diagram showing the state transition of a distributed transaction system in the case where the commit process depicted in the flowcharts depicted in FIGS. 13 and 14 in the distributed transaction system in the in-doubt state depicted in FIG. 12 (No 2).

FIG. 16 is a system configuration diagram showing the state transition of a distributed transaction system in the case where the commit process depicted in the flowcharts depicted in FIGS. 13 and 14 in the distributed transaction system in the in-doubt state depicted in FIG. 12 (No 2).

FIG. 16 illustrates the system state in the case where the first participant (database management device 2) downs before transmitting a commit process response (commit response packet) to the coordinator (database management device 1) after outputting/storing a commit log 230 (230-21) to the log storage device of the log group. In this case, since the coordinator receives no response to the commit request 701 from the database management device 2, the coordinator determines that the database management device 2 has failed (YES in step S125) and registers all the updated log group (G21) of the database management device 2 in the commit re-transmission list 170 in the main storage device (step S126). This commit re-transmission list 170 stores the log groups of participants whose commit process has not been completed. When the database management device i is restored from the down (failure), the fact that the distributed transaction has been terminated in "commit" (the voting result of two-phase commit) must be reported to such a participant. The commit re-transmission list 170 is used to store all the updated log groups of such a participant whose commit process has failed. Finally, the coordinator writes the commit re-transmission list 170 in the main storage device into the log storage device 201 of the log group 11 being the global representative log group (G11) (step S137). Therefore, after the commit process of the coordinator is terminated, information about all the updated log groups of a participant that has failed in its commit process is stored in the log storage device 201 of a log group being a global representative log group as a commit re-transmission list 240. Although FIG. 16 illustrates the case where a database management device being a participant has failed in a commit process, there is a possibility that the updated log group of the coordinator has failed in a commit process. In this case, the identifier of an updated log group that has failed in its commit process is recorded in the commit re-transmission list of a log group being a global representative log group.

{Process of a Participant in the Case where the Coordinator Downs}

Figure 17:
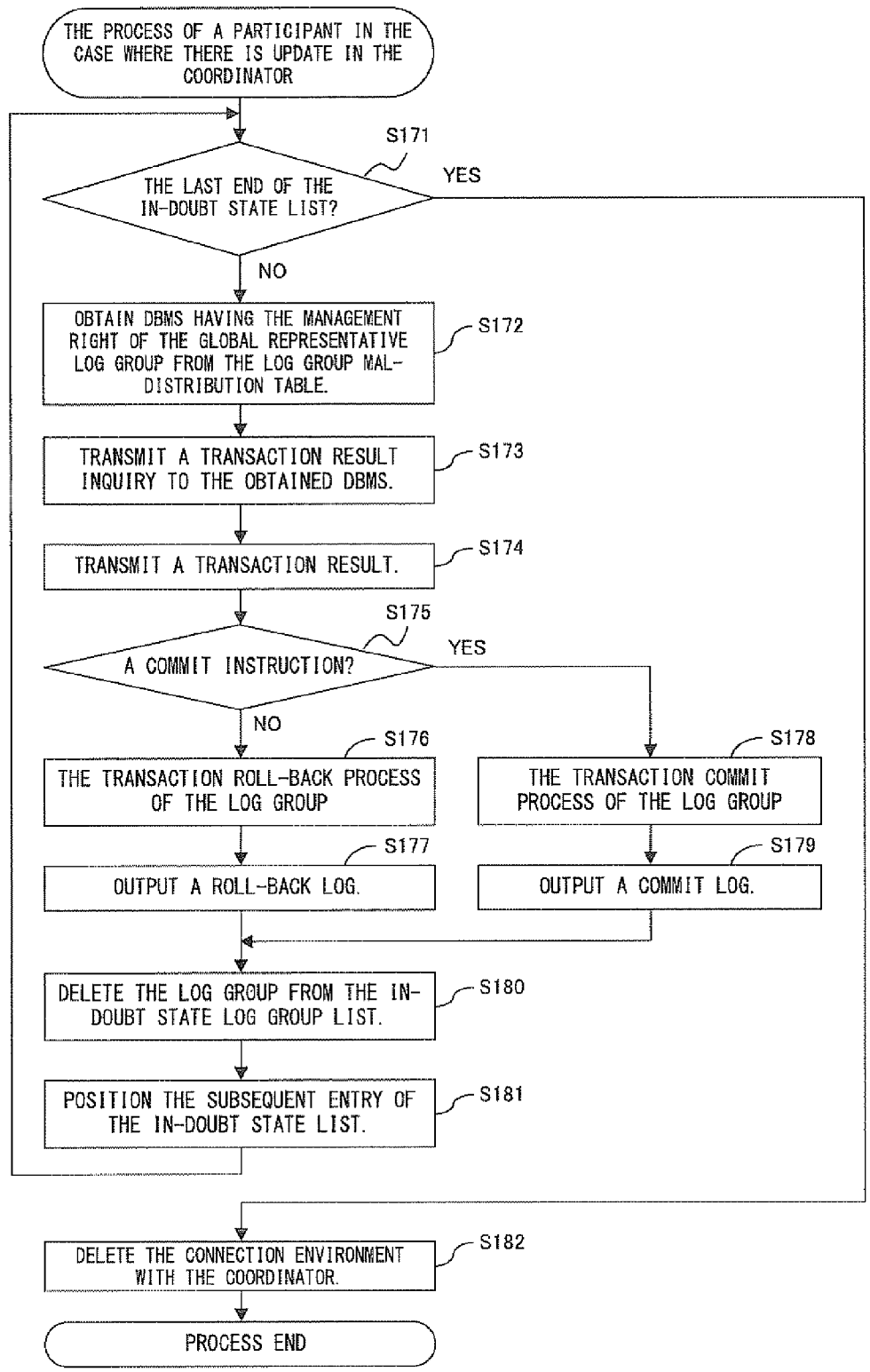
FIG. 17 is a flowchart showing the process of a participant in the case where the coordinator downs due to a failure when the participant is in the in-doubt state as depicted in FIG. 12.

FIG. 17 is a flowchart showing the process of a participant in the case where the coordinator downs due to a failure when a participant is in the in-doubt state as depicted in FIG. 12. A participant starts the process of the flowchart depicted in FIG. 17 by the cluster management device 10 notifying the participant of the fact that "the database management device i being the coordinator has downed".

A participant determines whether the current entry of the in-doubt state list is its last end (step S171). If it is its last end (YES in step S171), the process advances to step S182. If it is not its last end (NO in step S171), the process advances to step S172.

In step S172, the participant obtains the "DBMS (of a database management device) having the management right of a global representative log group" from the log group mal-distribution table. In this case, of the DBMS i registered in the log group mal-distribution table, DBMS i of a database management device i having the highest priority of normally operating database management devices is obtained.

Then, the participant transmits an "inquiry about transaction state (voting result of two-phase commit)" to a database management device having the obtained DBMS (step S173). Then, the participant receives the "result of the inquiry" from the database management device (step S174). The participant determines whether the result of the inquiry is a "commit instruction" (step S175). If it is not a commit instruction (NO in step S175), the process advances to step S176. If it is a commit instruction (YES in step S175), the process advances to step S178.

In step S176, the participant applies the "roll-back process of a transaction" to a log group registered in the current entry of the updated log group list. Then, the participant outputs the "roll-back log" of the log group that has performed the roll-back process to the log storage device of the log group (step S177) and the process advances to step S180.

However, in step S178, the participant applies the "commit process of a transaction" to a log group registered in the current entry of the updated log group list. Then, the participant outputs the "commit log" of the log group that has performed the commit process to the log storage device of the log group (step S179) and the process advances to step S180.

In step S180, the participant deletes the log group that has performed the roll-back process or the commit process from its in-doubt state list. Then, the participant positions the current entry of the in-doubt state list in a subsequent entry (step S181) and the process returns to step S171.

In this way, the processes in steps S171 through S181 are repeated until the participant determines that the current entry of the in-doubt state is its last end. Thus, a process (commit processor roll-back process) is applied to all the log groups registered in the in-doubt state list of the participant according to the voting result of two-phase commit and the in-doubt states of those log groups are solved. The in-doubt state list of the participant becomes vacant.

Lastly, the participant deletes the connection environment with the coordinator (step S182) and the process of this flowchart is terminated. In the process of step S182, the participant disconnects a communication path with the coordinator, deletes connection destination information and so on.

<Process in the Case where a Database Management Device Related to Two-Phase Commit Downs>

When during two-phase commit, a related to the two-phase commit downs, the management of log groups managed by the database management device is delegated to another normally operating database management device. In this case, if the down database management device is the coordinator, the management right of a global representative log group moves to another database management device. If the coordinator also manages log groups other than the global representative log group, the management rights of the log groups also moves to another database management device. If the down database management device is a participant, the management rights of log groups managed by the database management device also moves to another database management device. However, in this case, the management right of the global representative log group does not move.

{Transaction Solution Process in the Database Management Device that has Obtained the Management Right of a Log Group Other than the Global Representative Log Group}

Figure 18:
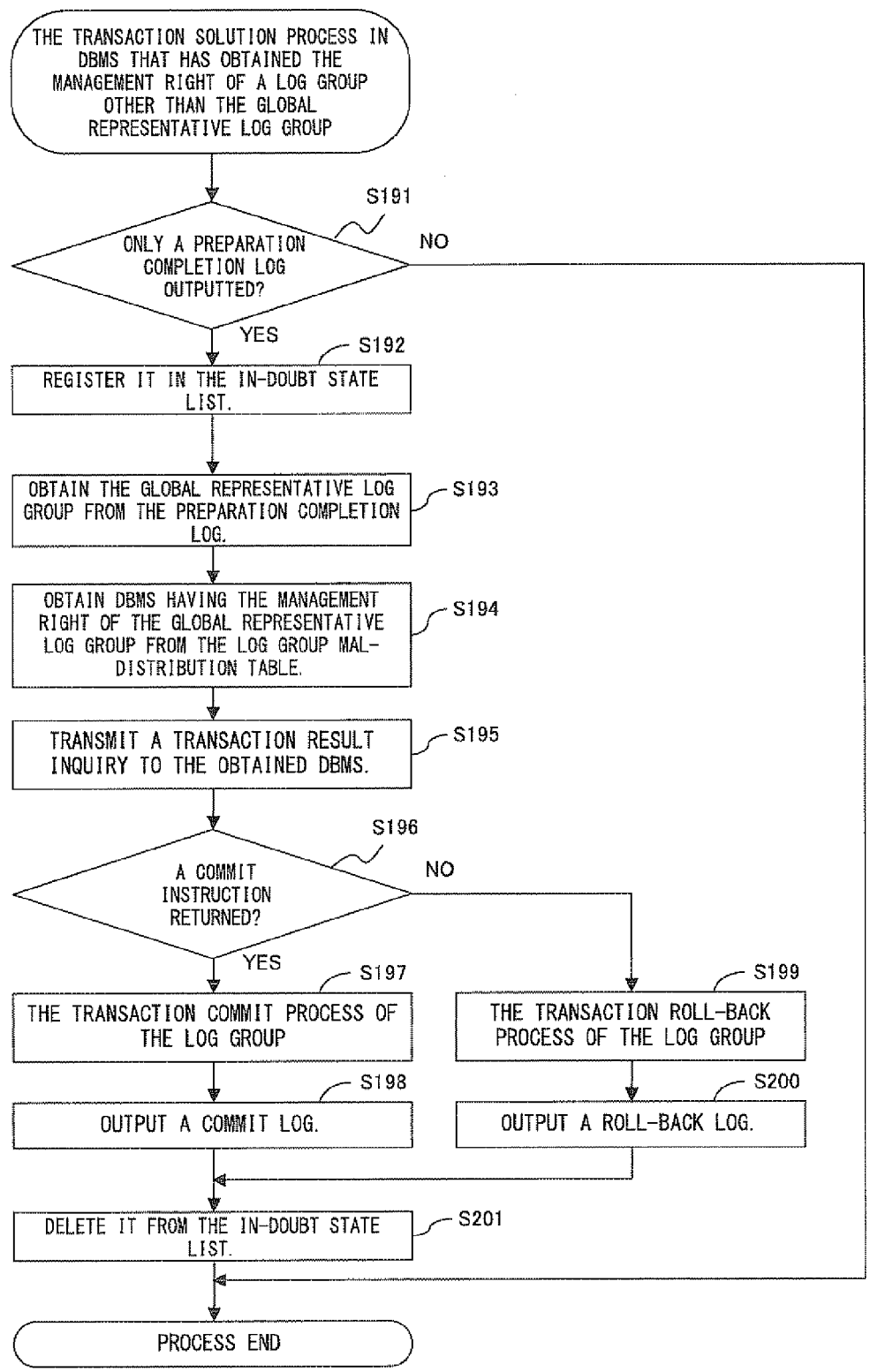
FIG. 18 is a flowchart showing the transaction solution process of the database management device (DBMS) that has obtained the management right of a log group other than the global representative log group.

FIG. 18 is a flowchart showing the transaction solution process of the database management device (DBMS) that has obtained the management right of a log group other than the global representative log group.

The database management device determines whether a "preparation completion log" is stored in the log storage device of the log group that has obtained a management right (step S191). If only a preparation completion log is stored, specifically only a preparation completion log is outputted to the log group that has obtained a management right (YES in step S191), the database management device registers the identifier of the log group in its in-doubt state list (step S192). And the process advances to step S193. If in step S191, not only a preparation completion log but also a log about the voting result of two-phase commit (commit log or roll-back log) are stored in the log storage device (NO in step S191), the process of this flowchart is terminated.

In this way, the database management device checks a log about two-phase commit stored in the log storage device that has outputted a management right and registers the identifiers of log groups in the in-doubt state in the in-doubt state list.

In step S193, the database management device obtains the "(identifier of a) global representative log group from the preparation completion log. Then, the database management device obtains "DBMS having the management right of a global representative log group" from the log group maldistribution table (step S194). Since when the process in step S194 is performed, the log group mal-distribution table is updated to the latest state, the DBMS of a down database management device is not registered in the log group maldistribution table.

Then, the database management device transmits an "inquiry about a transaction result" to a database management device having the obtained DBMS (step S195). Then, upon receipt of a response from the database management device that has transmitted the inquiry (database management device having the management right of a global representative log group), the database management device determines whether the response is a "commit instruction" (step S196).

If in step S196, it is determined that a commit instruction is returned (YES in step S196), the database management device performs the commit process (transaction commit process) of the log group registered in the in-doubt state list (step S197) and outputs a commit log to the log storage device of the log group (step S198) and the process advances to step S201.

However, if in step S196 it is determined that a roll-back instruction is returned (NO in step S196), the database management device performs the roll-back process of the log group registered in the in-doubt state list (step S199), outputs its roll-back log to the log storage device of the log group (step S200) and the process advances to step S201.

In step S201, the database management device deletes the log group to which the commit process or roll-back process is applied from the in-doubt state list. Then, the process of this flowchart is terminated.

Thus, even when the database management device that manages the log group (log group other than the global representative log group) in the in-doubt state downs, the in-doubt state of the log group can be solved by the database management device that has obtained the management right of the log group.

{Transaction Solution Process in the Database Management Device that has Obtained the Management Right of the Global Representative Log Group}

Figure 19:
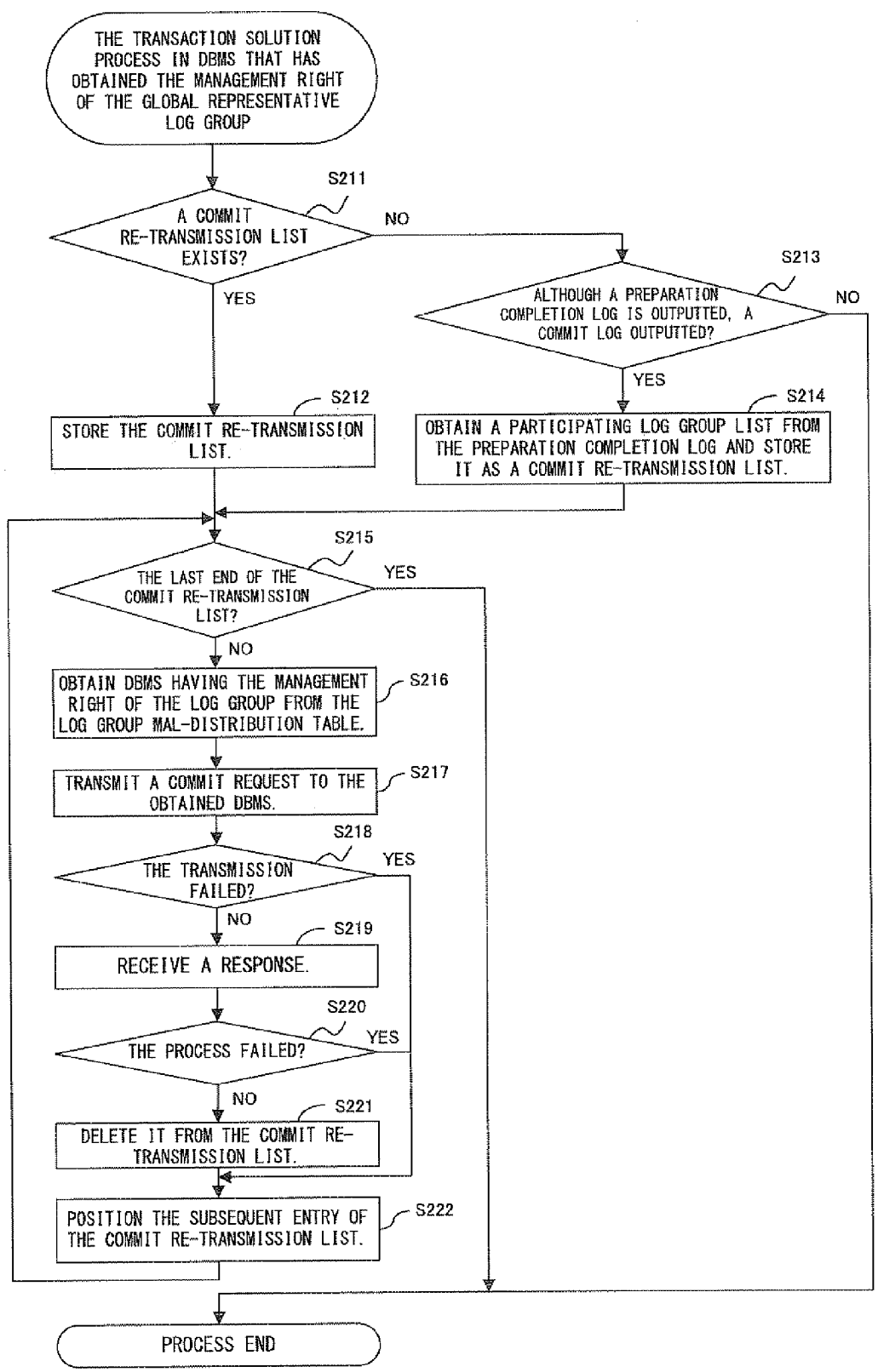
FIG. 19 is a flowchart showing the transaction solution process of the database management device (DBMS) that has obtained the management right of the global representative log group.

FIG. 19 is a flowchart showing the transaction solution process of the database management device (DBMS) that has obtained the management right of the global representative log group. This database management device that has obtained the management right of the global representative log group must play a role of the coordinator instead of the coordinator being the original acquisitor of the management right of the global representative log group. As described with reference to the flowchart depicted in FIG. 13, the coordinator records information about the log group to which a commit request should be re-transmitted in the log storage device of the global representative log group as a commit re-transmission list. This commit re-transmission list also includes a log group whose commit is not completed (log group whose commit process and output of commit log neither is not completed). On the above assumption, the flowchart depicted in FIG. 19 is described.

The database management device checks the log storage device of a log group being the global representative log group that has obtained a management right and determines whether there is a commit re-transmission list in the log storage device (step S211). Then, if there is a commit re-transmission list (YES in step S211), the database management device stores the commit re-transmission list in its main storage device (step S212) and the process advances to step S215.

However, if in step S211 it is determined that there is no commit re-transmission list (NO in step S211), the database management device checks the log storage device of the global representative log group and determines whether only a preparation completion log is outputted to (stored in) the log storage device and a commit log is not outputted (stored) (step S213). Then, if only a preparation completion log is outputted (YES in step S213), the database management device obtains a participating log group list from the preparation completion log, stores it in the main storage device as a commit re-transmission list (step S214) and the process advances to step S215.

Thus, the log groups whose in-doubt states must be solved are registered in the commit re-transmission list of the main storage device of the database management device. Specifically if a commit re-transmission list is recorded on the log storage device of the global representative log group, information recorded on the commit re-transmission list can be used for its commit re-transmission list without applying any process. If only a preparation completion is recorded on the log storage device of the global representative log group, a commit re-transmission list in which all the participants other than the coordinator, participating the distributed transaction can be generated by using the participating log group list in the preparation completion log for a commit re-transmission list. If both preparation completion log and a commit log are recorded on the log storage device of the global representative log group and there is no commit re-transmission list, there is no participant in the in-doubt state. Therefore, there is no need to generate a commit re-transmission list. This is because the coordinator has already instructed all the participants (participants other than the coordinator) of the distribute transaction to commit.

In step S215, the database management device determines whether the current entry of the commit re-transmission list in the main storage device (hereinafter simply described as a commit re-transmission list) is its last end. Then, if it is determined that it is not the last end of the commit re-transmission list (NO in step S125), the process advances to step S216. If it is determined that it is the last end of the commit re-transmission list (YES in step S125), the process of this flowchart is terminated.

In step S216, the database management device refers to the log group mal-distribution table and obtains DBMS having the management right of the log group registered in the current entry of the commit re-transmission list. Then, the database management device transmits a "commit request for the log group (commit request packet)" to the database management device having the obtained DBMS (step S217). Then, the database management device determines whether the transmission of the commit request has failed (step S218). If the transmission has failed (YES in step S218), the process advances to step S222. However, if in step S218 it is determined that the transmission of a commit request has succeeded (No in step S218), the database management device receives a response from the database management device to which the commit request has been transmitted later (step S219). Then, the database management device determines whether the response result is "failure in a commit process" (step S220). If it is "success in a commit process" (YES in step S220), the database management device deletes a "log group that has succeeded in the commit process" from the current entry of the commit re-transmission list (step S221) and the process advances to step S222.

In step S222, the database management device positions the current entry of the commit re-transmission list in a subsequent entry and the process returns to step S215.

As described above, the database management device repeats the processes in steps S215 through S222 until in step S215 it determines that the current entry of the commit re-transmission list is its last end (yes in step S215).

Thus, when the management right of the global representative log group is obtained, a commit request is transmitted to all the log groups in the in-doubt state and the in-doubt states of the log groups are solved. However, a log group that has failed to receive a commit request or a log group that has succeeded in receiving a commit request, but has failed in a commit process is left in the in-doubt state and is still registered in the commit re-transmission list.

{System State in the Case where the Coordinator Downs when there is Update in the Coordinator}

Figure 20:
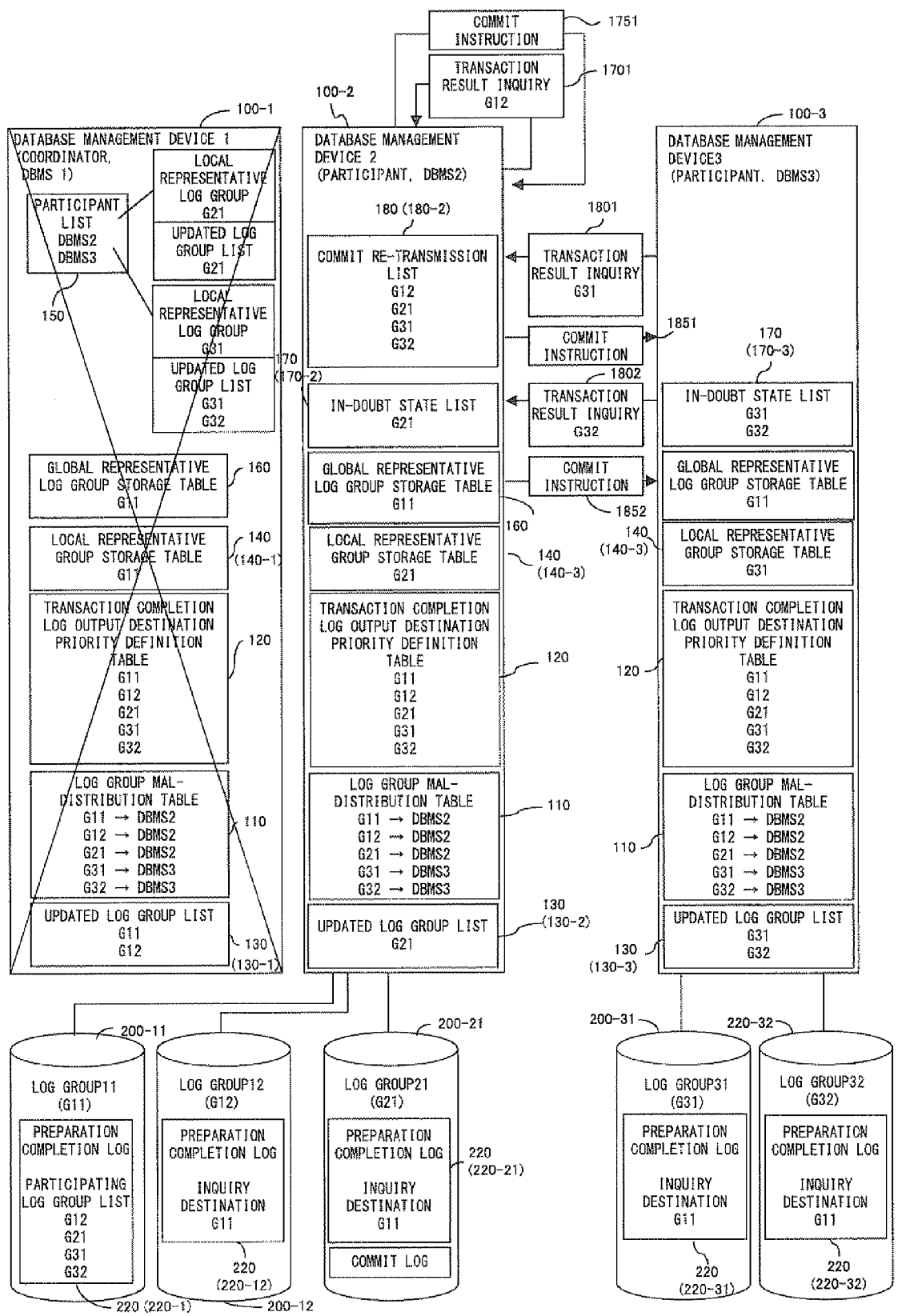
FIG. 20 illustrates one example of the system state in the case where the coordinator downs when there is update in the coordinator.

FIG. 20 illustrates one example of the system state in the case where the coordinator downs when there is update in the coordinator. In FIG. 20, the same reference numerals are attached to the same components as depicted in FIG. 15.

In the system depicted in FIG. 20, although the updated log group 21 of the first participant (database management device 2) stores a "commit log", but the updated log groups 31 and 32 of the second participant (database management device 3) stores no "commit log". This indicates that the coordinator (database management device 1) has downed after transmitting commit request to the first participant (database management device 2) (see the flowchart depicted in FIG. 13). The database management device 2 has received the commit request from the database management device 1, performed the commit process of the log group 21 and succeeded in the commit process and the output of a commit log. Before the coordinator downs, its in-doubt state list 170 (170-2) and commit re-transmission list 180 (180-2) are not stored in the main storage device of the database management device 2.

In case where the coordinator downs, the management rights of the global representative log group and the log group 12 which are managed by the coordinator moves to the database management device 2. Following this, information about the log groups 11 and 12 in the log group mal-distribution tables 110-2 and 110-3 of the database management devices 2 and 3, respectively, are rewritten. The details of this rewriting process are described later. More particularly, both the identifiers G11 and G12 of the log groups 11 and 12, respectively, are related to the device name DBMS 2 of the database management device 2.

After obtaining the management rights of the global representative log group 11 and the log group 12, the database management device 2 applies the transaction solution processes depicted in FIGS. 19 and 18 to the global representative log group 11 and the log group 12, respectively.

By applying the transaction solution process depicted in FIG. 19 to the global representative log group 11, the participating log group list of the preparation completion log 220-1 stored in the log storage device of the global representative log group 11 is stored in the main storage device of the database management device 2 as a commit re-transmission list 180-2 (see FIG. 20). Then, the database management device 2 refers to the log group mal-distribution table 110 and transmits a commit request (commit instruction) to the log group whose identifier Gik is registered in the commit re-transmission list 180-2. In this example, the identifiers G12, G21, G31 and G32 of the log groups are registered in the commit re-transmission list 170-2. Therefore, the "commit instruction" is transmitted to the database management device 2 having the management rights of the log groups 12 and 21. The "commit instruction" is also transmitted to the database management device 3 having the management rights of the log groups 31 and 32.

Thus, the database management device 2 that has taken over the management rights of the log groups 11 and 12 managed by it from the coordinator (database management device 1) that downs after transmitting a commit request to the first participant (database management device 2) performs the remaining process of the coordinator, that is, transmits a commit request to the second participant (database management device 3) instead of the coordinator, on the basis of the preparation completion log 220-1 and log group mal-distribution table 110 that has been stored in the log storage device of the global representative log group (log group 11). Thus, even when after the completion of the preparation process of two-phase commit, the coordinator downs and the management rights of the log groups managed by the coordinator has moved to another participant of the distributed transaction, a commit can be instructed to participants in the in-doubt state on the basis of the preparation completion log recorded on the log storage device of the global representative log group of the coordinator.

As depicted in FIG. 16, when the coordinator in the log storage device of the global representative log group of which a commit re-transmission list has been recorded downs, the participant that has taken over the management right of the global representative log group can instruct log groups in the in-doubt state to commit. Specifically, the coordinator can instruct a participant having the management right of a log group whose identifier Gik is registered in the commit re-transmission list to commit.

By applying the transaction solution process depicted in FIG. 18 to the log group 12, the identifier G12 of the log group 12 is registered in the in-doubt state list 170-2 in the main storage device of the database management device 2 (see FIG. 20). By the execution of the transaction solution process depicted in FIG. 18, the database management device 2 obtains the identifier G11 of the global representative log group from the preparation completion log 220-12 recorded in the log storage device of the log group 12 and obtains (the DBMA of) a database management device having the management right of the obtained identifier G11 of the global representative log group by referring to the log group mal-distribution table 110. In this case, DBMS 2 is obtained. Therefore, an "inquire request for a transaction result" 1701 in which the identifier G21 of the log group 21 is set is transmitted to the database management device 2. In this case, a "commit instruction" 1751 is returned from the database management device 2 in response to the inquiry. Therefore, the database management device 2 applies a commit process to the log group 21.

The participant (database management device 3) performs the process depicted in the flowchart of FIG. 17.

Firstly, the second participant refers to the in-doubt state list 170-3 and the log group mal-distribution table 110 and transmits inquire requests about a transaction result 1801 and 1802 to the participant (database management device 2). The identifier G31 of the log group 31 and the identifier G32 of the log group 32 are set in the inquire requests about a transaction result (inquire request packets about a transaction result) 1801 and 1802, respectively.

The participant (database management device 2) returns a "commit instruction" response 1851 in response to the inquire request about a transaction result 1801. The participant (database management device 2) also returns a "commit instruction" response 1852 in response to the inquire request about a transaction result 1802.

Upon receipt of the responses 1851 and 1852, the participant (database management device 2) applies a transaction commit process to the log groups 31 and 32 and outputs/records a commit log, which is no depicted in FIG. 20, to/on the log storage device of the log groups 31 and 32. The participant (database management device 3) deletes the identifiers G31 and G32 of the log group that has completed the commit from the in-doubt state list 170-3 in the main storage device. Thus, the in-doubt state list 170-3 becomes vacant.

<Process in the Case where there is no Update in the Coordinator>

When there is no update in the coordinator, specifically, when the coordinator manages no log group (updated log group) to update in a distributed transaction, one "representative participant" is selected from participants in the distributed transaction. In this case, participants other than the representative participant are called "general participants". The representative participant carries out part of the function of the coordinator in a normal two-phase commit instead of the coordinator. Since the general process of taking an obligation of recording the final result of a distributed transaction on a log outputs a log in the end of each phase of two-phase commit, the representative participant performs a preparation process and a commit process in the end of the fist and second phases, respectively.

{Preparation Process of the Coordinator}

Figure 21:
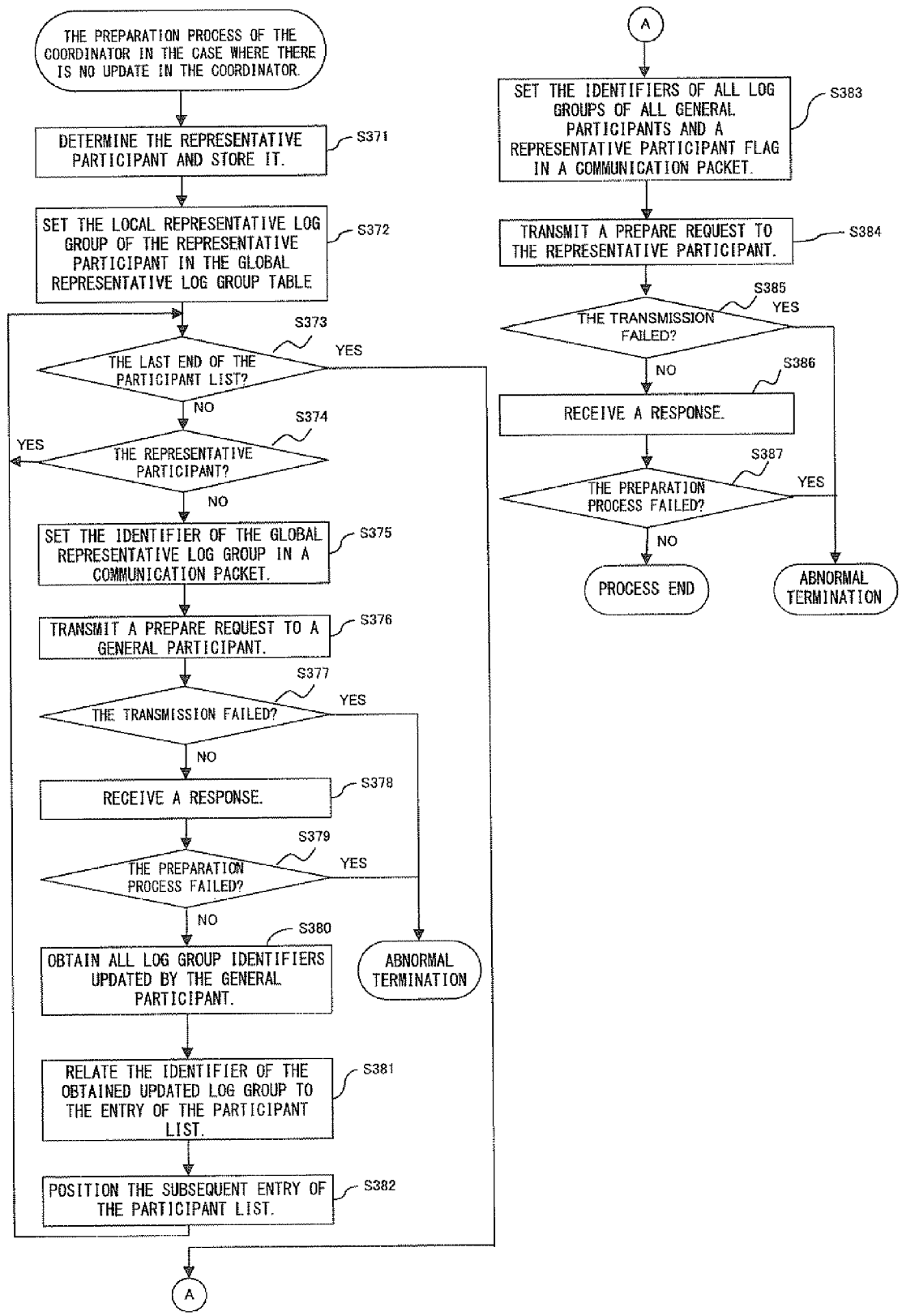
FIG. 21 is a flowchart showing the preparation process of the coordinator in the case where there is no update in the coordinator.

FIG. 21 is a flowchart showing the preparation process of the coordinator in the case where there is no update in the coordinator.

In this preparation process, the coordinator firstly determines a representative participant and stores the representative participant in its main storage device (step S371). This is determined by referring to a "transaction completion log output destination priority definition table" and a "log group mal-distribution table". The coordinator firstly refers to the transaction completion log output destination priority definition table and obtains (the identifier Gik of) one having the highest priority of the log groups. Then, the coordinator refers to the log group mal-distribution table, obtains a database management device i (DBMS i) having the management right of the obtained log group and determines the database management device i as a representative participant. The contents of the "transaction completion log output destination priority definition table" and "log group mal-distribution table" of the distributed transaction system in the case where there is no update in the coordinator differ from the contents of the "transaction completion log output destination priority definition table" and "log group mal-distribution table" in the case where there is update in the coordinator. This is because in the case of the former, the coordinator comprises no log group to be updated (updated log group).

Then, the coordinator sets the local representative log group of the determined representative participant in its global representative log group list (step S372). Then, the coordinator determines whether the current entry of its participant list is it last end (step S373). If it is not its last end (NO in step S373), the process advances to step S374. If it is its last end (YES in step S373), the process advances to step S383.

In step S374, the coordinator determines whether a participant registered in the current entry of the participant list is a representative participant. If it is a general participant (NO in step S374), the process advances to step S375. If it is a representative participant (YES in step S374), the process advances to step S383.

In step S375, the coordinator sets the identifier Gik of the representative log group in a communication packet. Then, the coordinator transmits this communication packet to general participants as a "prepare request packet" (step S376). Then, the coordinator determines whether the transmission of the prepare request packet has failed (step S377). If it is determined that the transmission has failed (YES in step S377), the process of this flowchart is abnormally terminated. If it is determined that the transmission has succeeded (NO in step S377), the process advances to step S378.

In step S378, the coordinator receives a response (preparation response packet) to the prepare request packet from the general participant. Then, the coordinator refers to a process result set in the preparation response packet and determines whether the general participant has failed (step S379). If it is determined that the general participant has failed (YES in step S379), the process of this flowchart is abnormally terminated. If it is determined that the general participant has succeeded (NO in step S379), the coordinator obtains the identifier Gik of a log group (updated log group) updated by the general participant from the preparation response packet (step S380) and relates the identifier Gik to the current entry of the participant list (step S381). Then, the coordinator positions the current entry of the participant list in a subsequent entry (step S382) and the process returns to step S373.

In step S373, the processes in steps S373 through S383 are repeated until it is determined that the current entry of the participant list is its last end. Thus, the coordinator transmits a "prepare request packet" to all the general participants registered in the participant list and receives their responses (preparation response packet) to it. In this case, if both the transmission of a prepare request packet and reception of a preparation response packet have succeeded, the coordinator obtains a "log group (updated log group) updated by a general participant" from the preparation response packet and relates the updated log group to an entry in which the DBMS i of the general participant of the participant list. Thus, the updated log group of the general participant that has succeeded in its preparation process is registered in the participant list.

In step S383, the coordinator sets both the "identifiers Gik of all the log groups of all the participants" and a "representative participant flag" in a communication packet (prepare request packet). Then, the coordinator transmits the prepare request packet to the representative participant (step S384). Then, the coordinator determines whether the transmission of the preparation response packet has failed (step S385). If it is determined that it has failed (YES in step S385), the process of this flowchart is abnormally terminated. If it is determined that the transmission of the preparation response packet has succeeded (NO in step S385), the coordinator receives a response (preparation response packet) to the preparation response packet from the representative participant (step S386). Then, the coordinator determines whether the representative participant has failed in its preparation process on the basis of a process result set the preparation response packet (step S387). If it is determined that it has succeeded (NO in step S387), the process of this flowchart is terminated. If it is determined that it has failed (YES in step S387), the process of this flowchart is abnormally terminated.

Thus, the coordinator transmits prepare request packet in which a "representative participant flag" and the "all the updated log group list of all the general participants" are set, to the representative participant and receives a response (preparation response packet) to the prepare request packet. Then, the coordinator determines whether the representative participant has succeeded in its preparation process on the basis of a process result set in the preparation response packet.

{Preparation Process of a Representative Participant}

Figure 22:
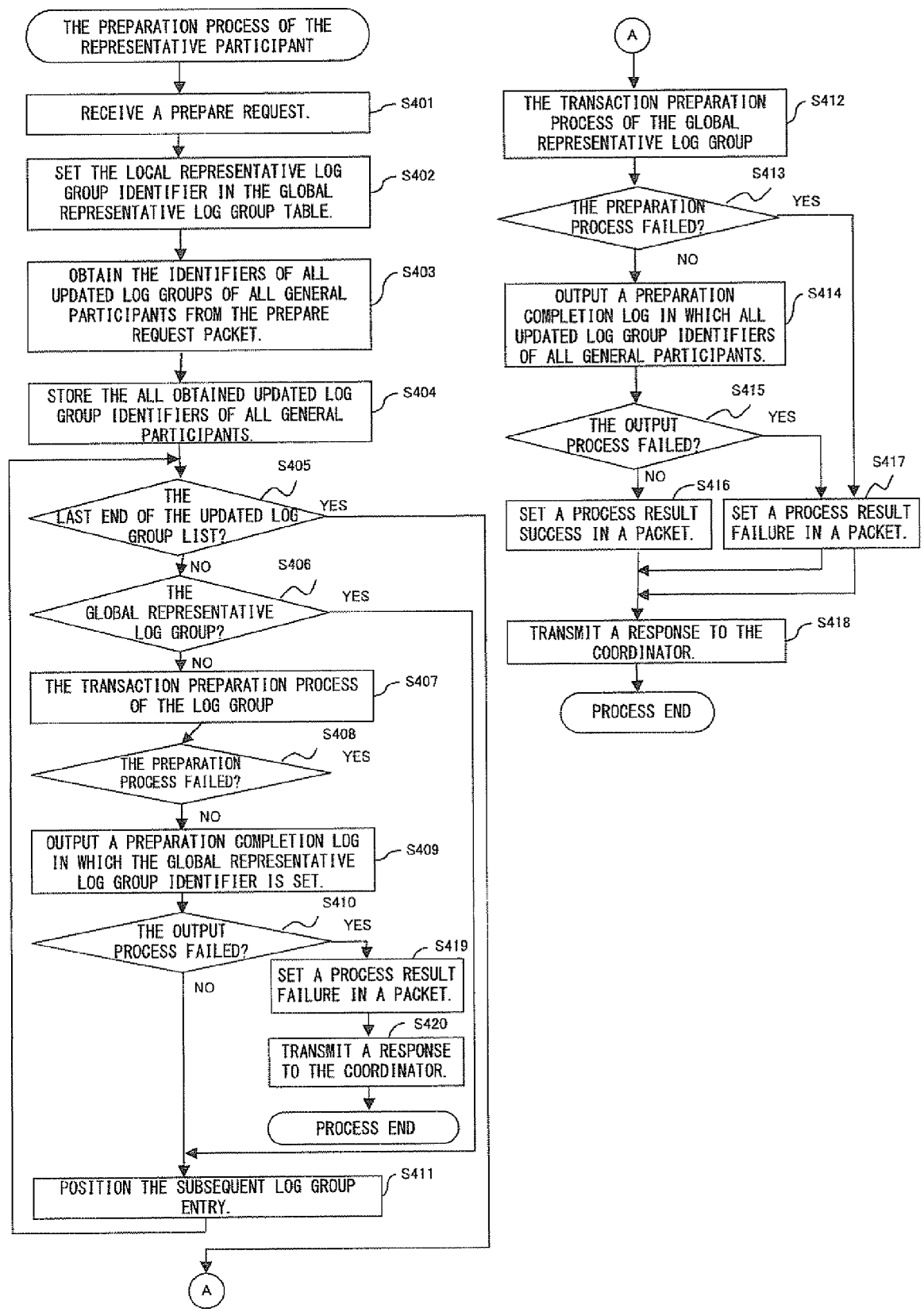
FIG. 22 is a flowchart showing the preparation process of a representative participant in the case where there is no update in the coordinator.

FIG. 22 is a flowchart showing the preparation process of a representative participant in the case where there is no update in the coordinator.

In this preparation process, the representative participant firstly receives a prepare request transmitted by the coordinator (step S401). Then, the representative participant sets local representative log groups in its global representative log group list and stores the assignment of a representative participant (representative participant flag) set in the prepare request packet in its main storage device (step S402).

The representative participant obtains the identifiers of all the updated log groups of all the general participants of the distributed transaction from the prepare request packet (step S403) and stores the obtained identifiers of all the updated log groups of all the general participants in (all the updated log group list of the all the general participants of) the main storage device (step S404).

The representative participant determines whether the current entry of the updated log group is its last end (step S405). If it is determined that it is its last end (YES in step S405), the process advances to step S412. If it is determined that it is not its last end (NO in step S405), the process advances to step S406.

In step S406, the representative participant determines whether a log group registered in the current entry of the updated log group list is the global representative log group. If it is determined that it is the global representative log group (YES in step S404), the process advances to step S411. If it is determined that it is not the global representative log group (NO in step S404), the process advances to step S407.

In step S407, the representative participant performs the transaction preparation process of a log group registered in the current entry of the updated log group list. Then, the representative participant determines whether the transaction preparation process has failed (step S408). If it is determined that it has failed (YES in step S408), the representative participant sets its process result (failure) in a communication packet (preparation response packet) (step S419). Then, the representative participant transmits the preparation response packet to the coordinator (step S420) and the process of this flowchart is terminated.

However, in step S408, if it is determined that the transaction preparation process has succeeded (NO in step S408), the representative participant outputs a "preparation completion log" in which the identifier of the global representative log group is set to the log storage device of a log group (log group whose identifier is registered in the current entry of the updated log group list) (step S409).

The representative participant determines whether the output process of the preparation completion log has failed (step S410). If it is determined that it has failed (YES in step S410), the representative participant performs the processes in steps S419 and S420 and the process of this flowchart is terminated. However, if it is determined that the output process of the preparation completion log has succeeded (NO in step S410), the representative participant positions the current entry of the updated log group list in a subsequent entry and the process returns to step S405.

Thus, the processes in steps S405 through S411 are repeated until in step S405 it is determined that the current entry of the updated log group list is its last end or in step S410 it is determined that the output process of the preparation completion log has failed.

Thus, the representative participant applies both a transaction preparation process and the output process of a preparation completion log to a log group (updated log group) registered in its own updated log group list.

In step S412, the representative participant performs the transaction preparation process of the global representative log group. Then, the representative participant determines whether the transaction preparation process has failed (step S413). If it has succeeded (NO in step S413), the process advances to step S414. If it has failed (YES in step S413), the process advances to step S417.

In step S414, the representative participant outputs a "preparation completion log" in which the identifiers of all the updated log groups of all the general participants of the distributed transaction are set to the log storage device of the global representative log group. Then, the representative participant determines whether the output process of the preparation completion log has failed (step S415). If the output process has succeeded (NO in step S415), the representative participant sets its process result (success) in a communication packet (preparation response packet) (step S416). Then, the representative participant transmits the preparation response packet to the coordinator (step S417) and the process of this flowchart is terminated.

However, if in step S415 it is determined that the output process of the preparation completion log has failed (YES in step S415), the representative participant sets its process result (failure) in a communication packet (preparation response packet) (step S417), transmits the preparation response packet to the coordinator (step S418) and the process of this flowchart is terminated.

Thus, the representative participant applies a transaction preparation process and the output process of a preparation completion log to the global representative log group and transmits a preparation response packet in which their process results are set to the coordinator.

Upon receipt of a "prepare request packet", the general participant performs the process of the flowchart depicted in FIG. 11. In this case, a log group (updated log group) that has succeeded in the transaction preparation process and the output process of a preparation completion log is registered in the "in-doubt state list".

{System State in the Preparation Process of Two-Phase Commit}

Figure 23:
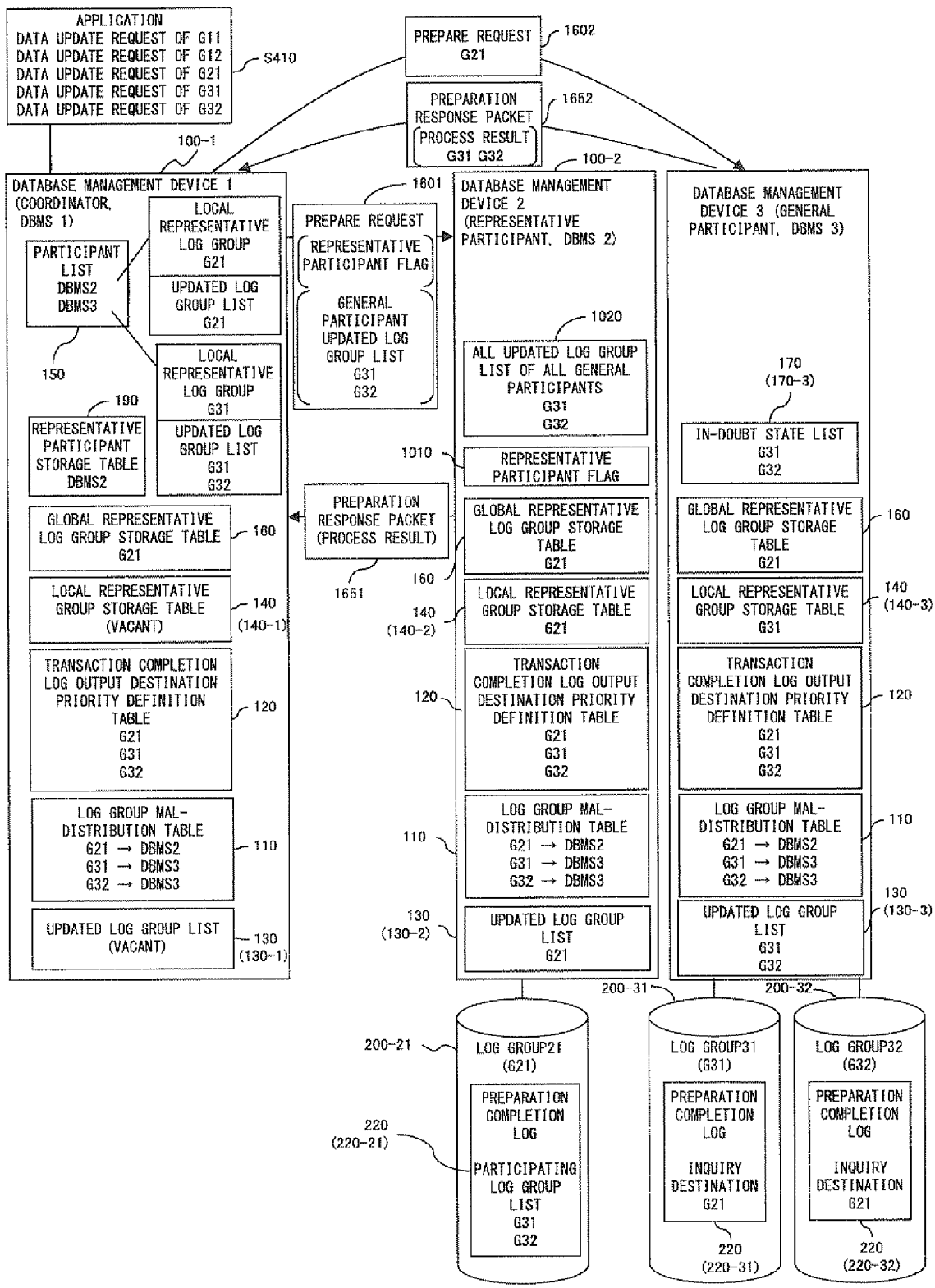
FIG. 23 illustrates one example of the distributed transaction system state in the case where the processes depicted in the flowcharts of FIGS. 21 and 22 are performed.

FIG. 23 illustrates one example of the distributed transaction system state in the case where the processes depicted in the flowcharts of FIGS. 21 and 22 are performed. In FIG. 23, the same reference numerals are attached to the same components provided for the distributed transaction system 5 depicted in FIG. 8.

In FIG. 23, the components that are not depicted in FIG. 8 are described.

The coordinator (database management device 1) comprises a representative participant storage table 190 being an area where the DBMS i of the representative participant, in its main storage device. The coordinator further comprises a global representative log group table 160 in the main storage device.

The representative participant (database management device 2) comprises a representative participant flag 1010 being a flag for storing the fact that its own device is assigned to a "representative participant", in its main storage device. The representative participant also comprises the all the updated log group list of all the general participants 1020. All the updated log groups of all the general participants notified by the coordinator are registered in this all the updated log group list of all the general participants 1020. The representative participant further comprises a global representative log group table 160 in its main storage device. A preparation completion log 220-21 is recorded on the log group 21 managed by the representative participant. The log group 21 is a global representative log group and its identifier G21 is set in the global representative log group table 160.

The general participant (database management device 3) comprises an in-doubt state list 170-3 and a global representative log group table 160 in its main storage device.

The summary of the process depicted in FIGS. 21 and 22 is described with reference to FIG. 23.

The coordinator transmits a prepare request packet 1602 in which the identifier G21 of a global representative log group is set to a general participant (database management device 3).

Upon receipt of the prepare request packet 1602, the general participant (database management device 3) stores the identifier G21 of the global representative log group set in the packet 1602 in the global representative log group table 160-3 of its main storage device. Then, the general participant applies a transaction preparation process to the log groups 31 and 32 whose identifiers are registered in an updated log group list 130-3. Then, if the transaction preparation process has succeeded, the general participant outputs/records the preparation completion log 220-31 of the log group 31 to/on the log storage device of the log group 31. The general participant also outputs/records the preparation completion log 220-32 of the log group 32 to/on the log storage device of the log group 32. The identifier G21 of the global representative log group is set in the preparation completion logs 220-31 and 220-32 as inquiry destination information about the voting result of two-phase commit. If the output processes of the preparation completion logs 220-31 and 220-32 have succeeded, the general participant transmits a preparation response packet 1652 in which the process result of the transaction preparation process and the identifiers G31 and G32 of the updated log groups 31 and 32, respectively, to the coordinator.

Then, the coordinator (database management device 1) transmits a prepare request packet 1601 to the representative participant (database management device 2). A "representative participant flag" and the all the updated log group list of all the general participants are set in this prepare request packet 1601.

Upon receipt of the prepare request packet 1601, the representative participant (database management device 2) stores the representative participant flag set in the packet 1601 in the representative participant flag 1010 of the main storage device. The representative participant also sets the all the updated log group list of all the general participants set in the packet 1601 in the all the updated log group list of all the general participants 1020 of the main storage device. The representative participant also applies a transaction preparation process to the log group 21 whose identifier is set in the up dated log group list 130-2. If the transaction preparation process has succeeded, the representative participant output/records the preparation completion log 220-21 to/on the log storage device of the log group 21.

{Commit Process of the Coordinator}

Figure 24:
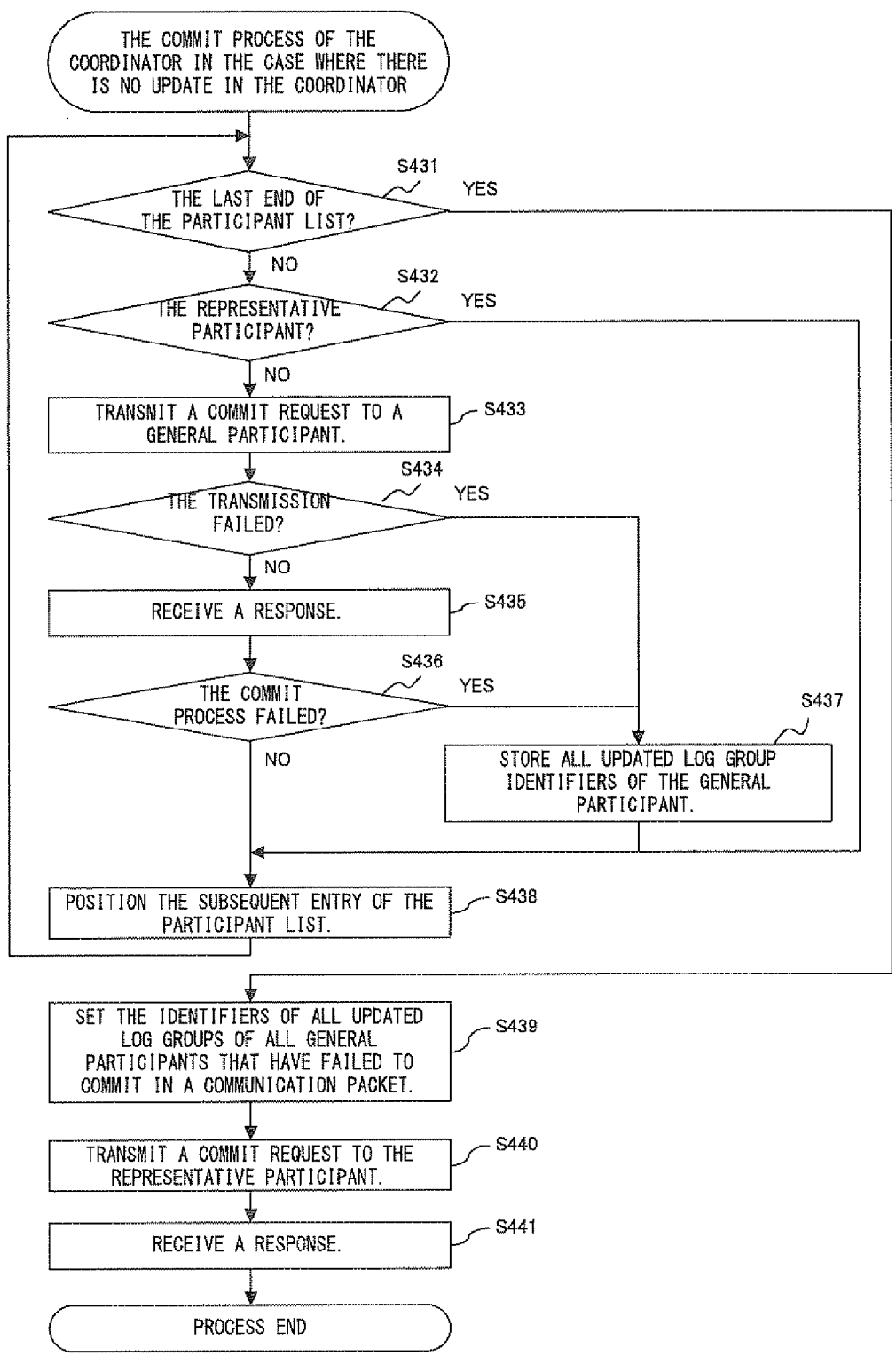
FIG. 24 is a flowchart showing the commit process of the coordinator in the case where there is no update in the coordinator.

FIG. 24 is a flowchart showing the commit process of the coordinator in the case where there is no update in the coordinator.

The coordinator determines whether the current entry of the participant list is its last end (step S431). If it is determined that it is its last end (YES in step S431), the process advances to step S439. If it is determined that it is not its last end (NO in step S431), the process advances to step S432.

In step S432, the coordinator determines whether a participant (DBMS i) registered in the current entry of the participant list is a representative participant (DBMS i). If it is determined that it is a representative participant (YES in step S432), the process advances to step S438. If it is determined that it is not a representative participant (NO in step S432), the process advances to step S433.

In step S433, the coordinator transmits a commit request (commit request packet) to a general participant. Then, the coordinator determines whether the transmission of the commit request has failed (step S434). If it is determined that the transmission has failed (YES in step S434), the process advances to step S437. If it is determined that the transmission has succeeded (NO in step S434), the process advances to step S435.

In step S435, the coordinator receives a response (commit response packet) from the general participant to which the commit request is transmitted. Then, the coordinator determines whether the general participant has failed in its commit process (step S436). If it is determined that it has failed (YES in step S436), the process advances to step S437. If it is determined that it has succeeded (NO in step S436), the process advances to step S438.

In step S437, the coordinator temporarily stores all the updated log group list of all the currently processed general participants (general participants registered in the current entry of the participant list) in its main storage device. Then, the process advances to step S438. In step S437, the coordinator obtains the all the updated log group list of all the general participants by obtaining log groups related to the DBMS of general participants registered in the current entry of the participant list.

In step S438, the coordinator positions the current entry of the participant list in a subsequent entry and the process returns to step S431.

Thus, in step S431, the processes in steps S431 through S438 are repeated until it is determined that the current entry of the participant list is its last end. Thus, the coordinator transmits a commit request (commit request packet) to a general participant. Then, if the coordinator has failed to transmit the commit request to a general participant or determines that the general participant has failed in its commit process on the basis of a process result set in a response (commit response packet) to the commit request from the general participant, the coordinator stores all the updated log group list of the general participant in the main storage device.

In step S439, the coordinator sets the identifiers of all the updated log groups of all the general participants that are stored in the main storage device and have failed to commit in a communication packet (commit request packet). Then, the coordinator transmits the commit request packet to the representative participant (step S440) and receives a response to the transmitted commit request packet from the representative participant later (step S441). Then, the process of this flowchart is terminated.

If in step S439 it is determined that the coordinator has succeeded in transmitting a commit request to all the general participants registered in the participant list and also the all the general participants have succeeded in their commit processes, the updated log groups are not set in the commit request packet transmitted to the representative participant.

Thus, the coordinator transmits a commit request (commit request packet) in which information about the updated log groups of a general participant that has failed to commit.

{Commit Process of a Representative Participant}

Figure 25:
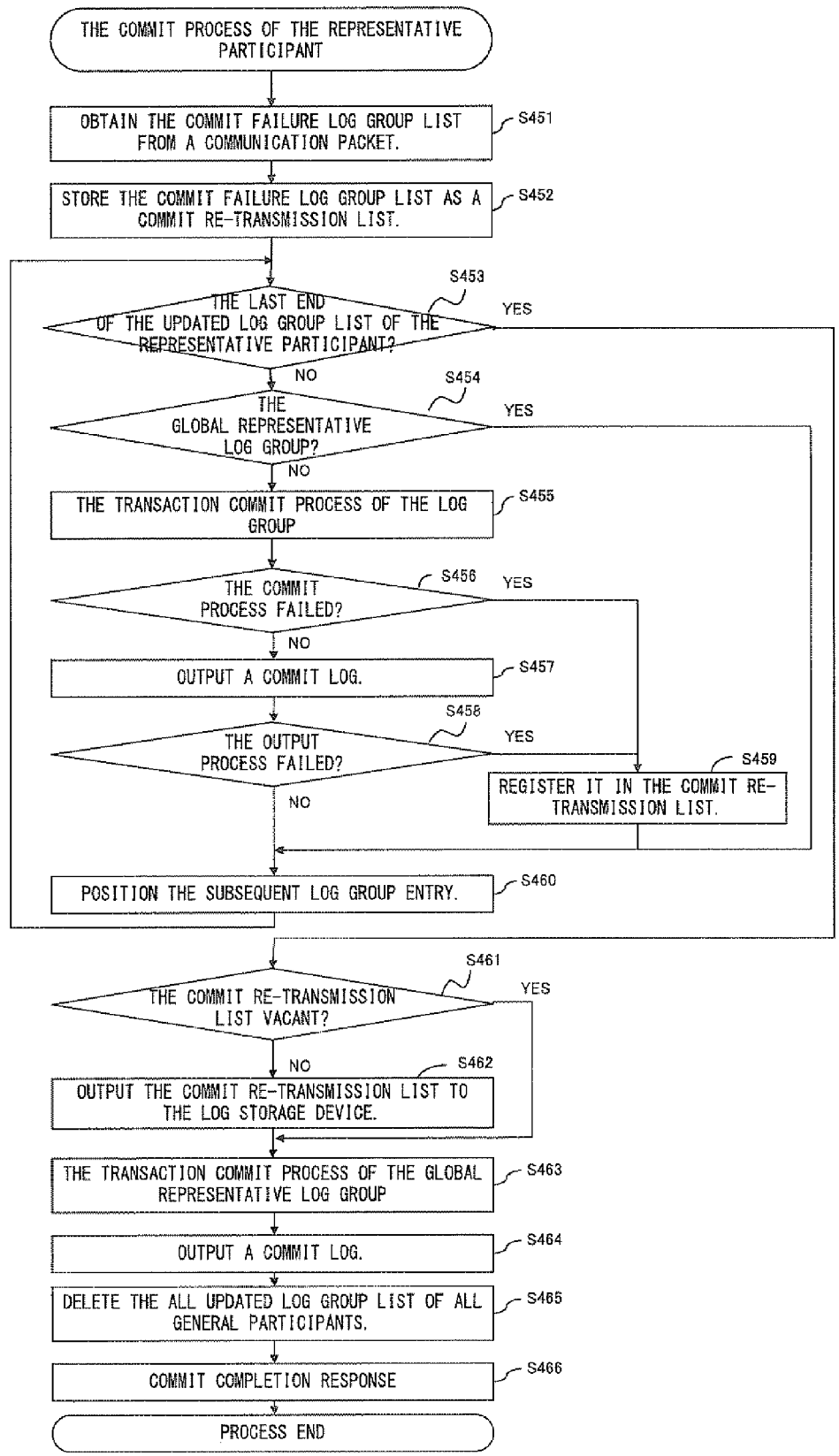
FIG. 25 is a flowchart showing the commit process of a representative participant in the case where there is no update in the coordinator.

FIG. 25 is a flowchart showing the commit process of a representative participant in the case where there is no update in the coordinator.

Upon receipt of a communication packet (commit request packet) from the coordinator, a representative participant obtains a list of log groups (updated log groups) that have failed to commit set in the commit request packet (step S451). Then, the representative participant stores the obtained list of log groups in its main storage device as a commit re-transmission list (step S452). In this case, if no log group is set in the commit request packet, the commit re-transmission list becomes "vacant".

The representative participant determines whether the current entry of the updated log group list of the representative participant (hereinafter simply called updated log group list) is its last end (step S453). If it is determined that it is its last end (YES in step S453), the process advances to step S461. If it is determined that it is not its last end (NO in step S453), the process advances to step S454.

In step S454, the representative participant determines whether a log group registered in the current entry of the updated log group list is a global representative log group. If it is determined that it is a global representative log group (YES in step S454), the process advances to step S460. If it is determined that it is not a global representative log group (NO in step S454), the process advances to step S455. In this case, since the identifier of the global representative log group is set in its main storage device, the determination in step S454 is made on the basis of this identifier.

In step S455, the representative participant performs the transaction commit process of a log group (updated log group other than the global representative log group). Then, the representative participant determines whether the commit process has failed (step S456). If it is determined that it has failed (YES in step S456), the process advances to step S459. If it is determined that it has succeeded (NO in step S456), the process advances to step S457.

In step S457, the representative participant outputs a commit log to the log storage device of a currently processed log group. Then, the representative participant determines whether the output process of the commit log has failed (step S458). If it is determined that it has failed (YES in step S458), the representative participant registers the currently processed log group in the commit re-transmission list of the main storage device (step S459) and the process advances to step S460. However, if it is determined that the output process of the commit log has succeeded (NO in step S458), the process advances to step S460.

In step S460, the representative participant positions the current entry of the updated log group in a subsequent entry and the process returns to step S453.

Thus, the processes in steps S453 through S460 are repeated until in step S453 it is determined that the current entry of the updated log group is its last end.

Thus, the representative participant applies a transaction commit process and the output process of a commit log to log groups other than the global representative log group that are registered in the updated log group list (updated log group list of the representative participant). In this case, the representative participant registers a log group that has failed in both of the processes, that is, has failed to commit in the commit re-transmission list of the main storage device.

In step S461, the representative participant determines whether the commit re-transmission list is "vacant". In case where the commit re-transmission list is not vacant (NO in step S461), the representative participant stores the commit re-transmission list in the main storage device of the global representative log group (step S462) and the process advances to step S463.

In step S463, the representative participant performs the transaction commit process of the global representative log group. Then, the representative participant outputs the commit log of the commit process to the main storage device of the global representative log group (step S464) and deletes the all the updated log group list of all the general participants in the main storage device (step S465). Then, the representative participant transmits a commit completion packet (commit response packet) to the coordinator (step S466) and the process of this flowchart is terminated.

{System State in the Case where a Representative Participant and a General Participant have Succeeded in a Commit}

Figure 26:
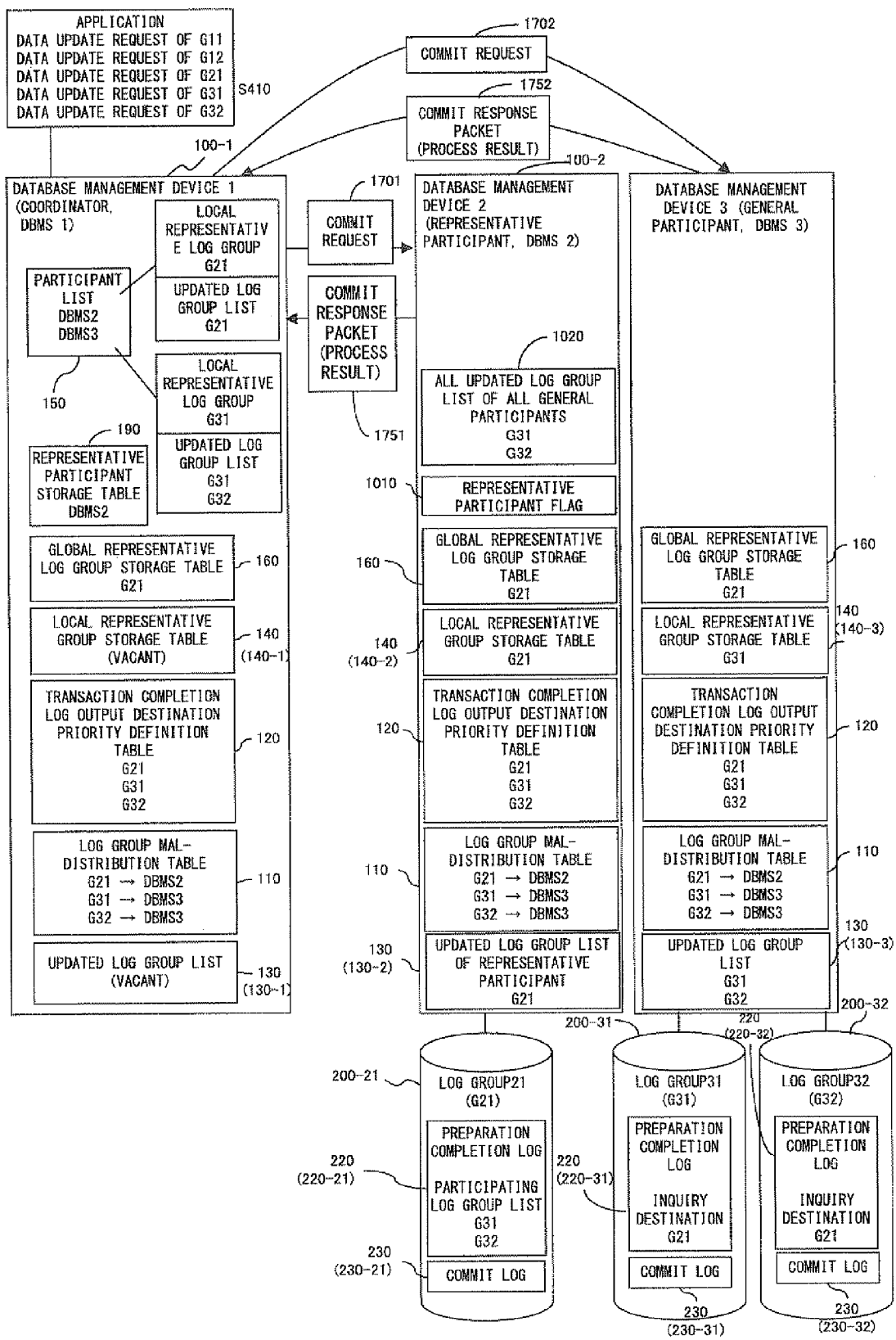
FIG. 26 illustrates the system state in the case where the commit process is performed in the distributed transaction system where there is no update in the coordinator (No. 1).

FIG. 26 illustrates the system state in the case where the commit process is performed in the distributed transaction system where there is no update in the coordinator (No. 1). In FIG. 26, the same reference numerals are attached to the same components provided for the distributed transaction system depicted in FIG. 23.

The coordinator (database management device 1) refers to the participant list 150 and transmits a commit request (commit request packet) 1702 to the database management device being a general participant. The general participant (database management device 3) refers to the updated log group list 130-3 and applies a transaction commit process and a commit log output process to the log groups 31 and 32 in that order. When those processes have succeeded, the general participant commit logs 230-31 and 230-32 records on the log groups 31 and 32, respectively. Then, the general participant transmits a commit response packet 1752 in which their process results ("success") are set to the coordinator.

Then, the coordinator transmits commit request packet 1701 in which no identifier Gik of an updated log group is set to a representative participant (database management device 2). In this case, since there is no general participant that has failed to commit, no log group is set in the commit request packet 1701.

The representative participant receives the commit request packet 1701 transmitted by the coordinator. Since no "list of log groups that have failed to commit" is not set in the packet 1701, the representative participant generates no commit re-transmission list in its main storage device. Then, the representative participant refers to the updated log group list 130-2 of the representative participant. However, since only the identifier G21 of the global representative log group in the list 130-2 and also the commit re-transmission list is vacant (there is no commit re-transmission list), the representative participant performs the transaction commit process of the global representative log group. When it has succeeded, the representative participant outputs a commit log 230-21 to the log storage device of the global representative log group 21. Then, the representative participant deletes the all the updated log group list of all the general participants 1020 and transmits a commit response packet 1751 being a "commit completion response to the coordinator. The coordinator receives the commit response packet 1751.

{System State in the Case where a General Participant has Failed to Commit}

Figure 27:
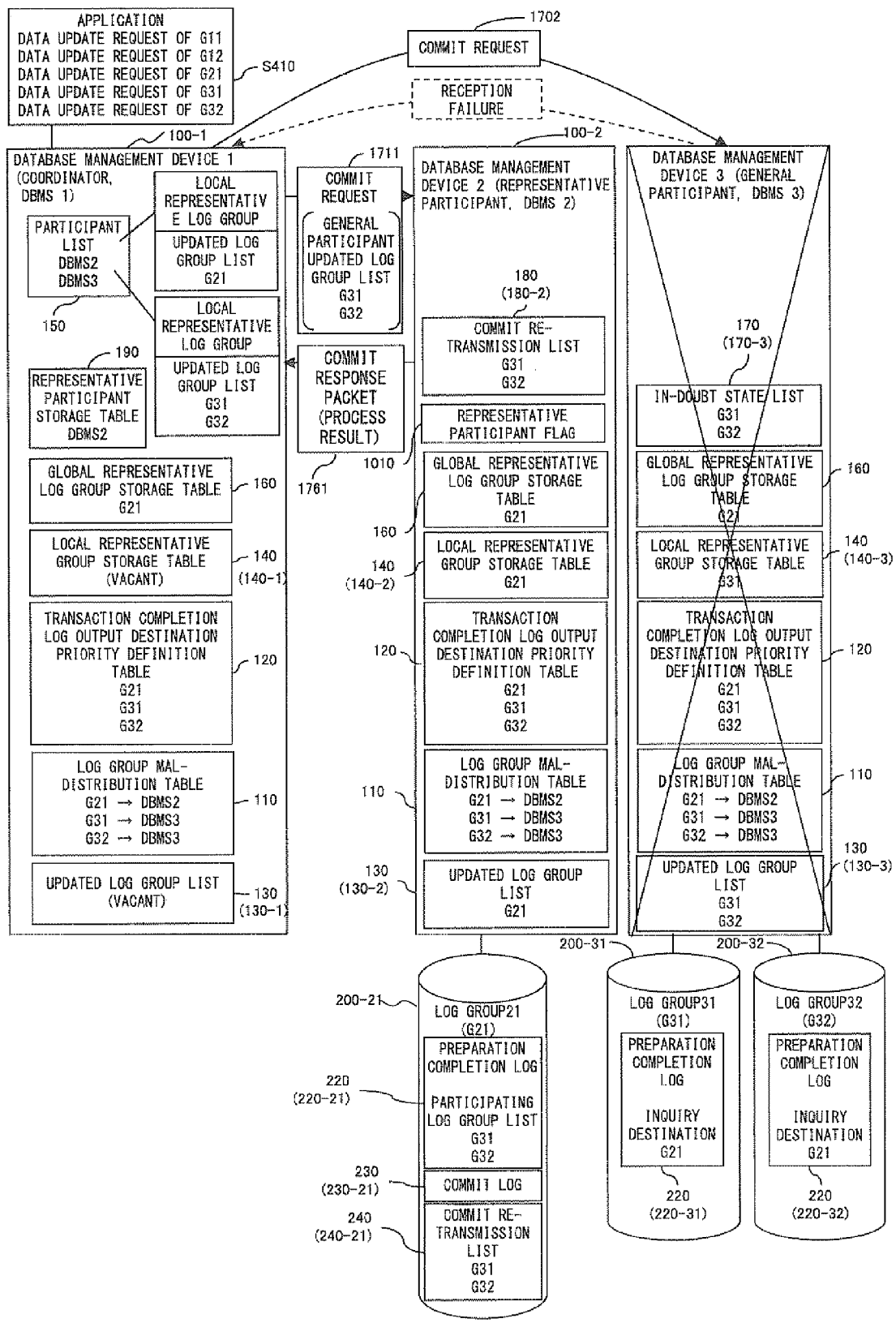
FIG. 27 illustrates the system state in the case where the commit process is performed in the distributed transaction system where there is no update in the coordinator (No 2).

FIG. 27 illustrates the system state in the case where the commit process is performed in the distributed transaction system where there is no update in the coordinator (No. 2). In FIG. 27, the same reference numerals are attached to the same components comprised by the distributed transaction system depicted in FIG. 23.

FIG. 27 illustrates one example of the system state in the case where a general participant downs and a general participant has failed to commit.

In FIG. 27, although a commit request packet 1712 is transmitted from the coordinator (database management device 1) to a general participant (database management device 3) and the general participant receives the packet 1712, the system downs before the general participant outputs a commit log to the log storage device of the log group 31.

In this case, since the coordinator (database management device 1) cannot receive a "commit completion response" packet from the general participant (database management device 3), the coordinator determines that the general participant has failed in its commit process. Then, the coordinator obtains the identifiers (G31 and G32) of all the updated log groups of the general participant from the participant list 150 and a commit request packet 1711 in which those identifiers G31 and G32 to a representative participant (database management device 2).

Upon receipt of the commit request packet 1711, the representative participant (database management device 2) obtains the list of log groups that have failed to commit (G31 and G32) from the packet 1711. Then, the representative participant temporarily stores the list (G31 and G32) in its main storage device as a commit re-transmission list 180-2. Then, the representative participant refers to the updated log group list 130-2 of the representative participant. In this example, since only the identifier G21 of the global representative log group is registered in the list 130-2, the representative participant outputs/records the commit re-transmission list 180-2 stored in the main storage device to/on the log storage device of the log group 21 being a global representative log group as a commit re-transmission list 240-21. Then, the representative participant performs the transaction commit process of the global representative log group (log group 21). Then, the representative participant outputs/records a commit log 230-21 to/on the log storage device of the global representative log group (log group 21). Then, the representative participant deletes the all the updated log group list of all the general participants 1020 in the main storage device and transmits a commit response packet 1761 being a "commit completion response" to the coordinator. The coordinator receives the commit response packet 1761.

{Process of a General Participant in the Case where the Coordinator Downs when there is no Update in the Coordinator}

Figure 28:
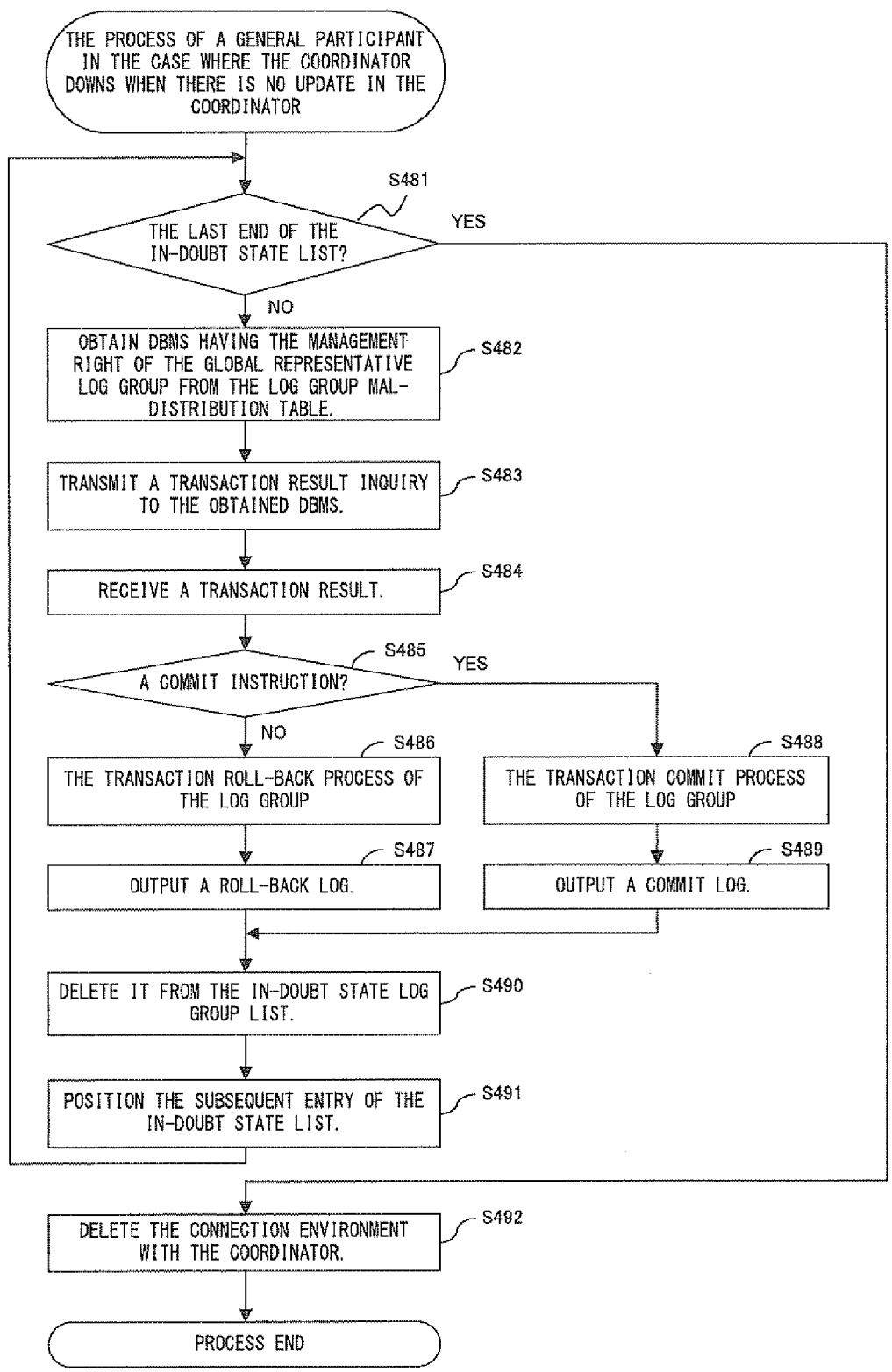
FIG. 28 is a flowchart showing the process of a general participant in the case where the coordinator downs in the distributed transaction when there is no update in the coordinator.

FIG. 28 is a flowchart showing the process of a general participant in the case where the coordinator downs in the distributed transaction when there is no update in the coordinator.

When the coordinator downs in the two-phase commit of a distribution transaction in the case where there is no update in the coordinator, in order to solve the in-doubt state of an updated log group in the in-doubt state, a general participant must inquire about its transaction state (transaction result) of the representative participant and receive a commit or roll back instruction to from the representative participant.

The process of the flowchart depicted in FIG. 28 is described below.

A general participant determines whether the current entry of the in-doubt state list is its last end (step S481). If it is its last end (YES in Sep S481), the process advances to step S492. If it is not its last end (NO in step S481), the process advances to step S482.

In step S482, the general participant refers to the log group mal-distribution table and obtains the DBMS of a database management device having the management right of the global representative log group. Specifically, the general participant obtains the identifier of the global representative log group from the global representative log group list and DBMS corresponding to the identifier from the log group mal-distribution table. In this case, the DBMS is the DBMS of the representative participant (see FIG. 26).

The general participant transmits an inquiry about a transaction result to a database management device having the obtained DBMS (representative participant) (step S483). Then, the general participant receives a transaction result from the database management device (representative participant) (step S484) and determines whether the request of the representative participant is a commit instruction, from the received contents (step S485).

In step S485 it is determined that it is a commit instruction (YES in step S485), the general participant performs the transaction commit process of a log group (currently processed log group) registered in the current entry of the in-doubt state list (step S488) and outputs a commit log to the log storage device of the currently processed (step S489). Then, the process advances to step S490.

However, if in step S485 it is determined that the voting result is roll-back, that is, a roll-back instruction (NO in step S485), the general participant performs the roll-back of the currently processed log group (step S486) and outputs the roll-back to the log storage device of the currently processed log group (step S487). Then, the process advances to step S490.

In step S490, the general participant deletes the log group (currently processed log group) registered in the current entry of the in-doubt state list. Then, the general participant positions the current entry of the in-doubt state list in a subsequent entry (step S491) and the process returns to step S481.

Thus, the processes in steps S481 through S491 are repeated until in step S481 it is determined that the current entry of the in-doubt state list is its last end, Thus, as to each roll-back registered in the in-doubt state list, the general participant receives the voting result of the two-phase commit and performs the commit or roll-back process of each roll-back according to the voting result. Then, if a commit process is performed, a commit log is outputted to the log storage device of each log group and if a roll-back process is performed, a roll-back log is outputted to the log storage device of each log group.

In step S492, the general participant releases the connection environment with the coordinator and the process of this flowchart is terminated.

{Process of a Representative Participant in the Case where the Coordinator Downs when there is no Update in the Coordinator}

Figure 29:
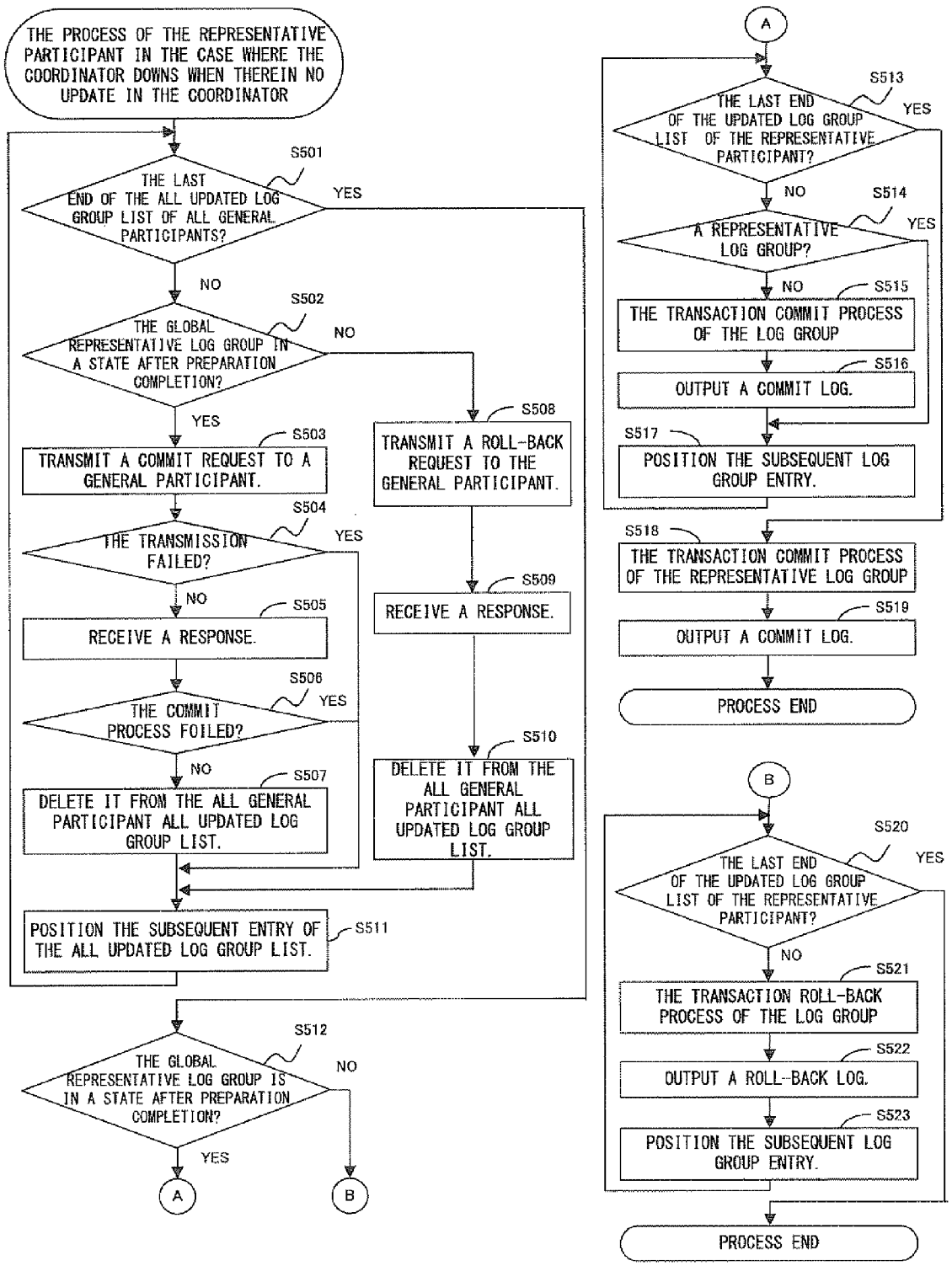
FIG. 29 is a flowchart showing the process of a representative participant in the case where the coordinator downs in the distributed transaction when there is no update in the coordinator.

FIG. 29 is a flowchart showing the process of a representative participant in the case where the coordinator downs in the distributed transaction when there is no update in the coordinator.

When the coordinator downs in the two-phase commit of a distribution transaction in the case where there is no update in the coordinator, a representative participant must transmit a "commit request" or a "roll-back request" to a general participant instead of the coordinator. The representative participant must also apply a "commit request" or a "roll-back request" to log groups managed by its own device. If a "preparation completion log" is recorded on the log storage device of the global representative log group, the representative participant determines a "commit" and if no preparation completion log is recorded, the representative participant determines a "roll-back".

The flowchart depicted in FIG. 29 is described below.

The representative participant determines whether the current entry of all the log group list of all the general participant is its last end (step S501). If it is determined that it is its last end (YES in step S501), the process advances to step S512. If it is determined that it is not its last end (NO in step S501), the process advances to step S502.

In step S502, the representative participant checks whether a preparation completion log is recorded in the log storage device of the global representative log group and determines whether the global representative log group is in a "state after preparation completion". In this case, if a preparation completion log is recorded, the representative participant determines that the global representative log group is in a state after preparation completion.

In step S502, if it is determined that the global representative log group is the state after preparation completion (YES in step S502), the process advances to step S503. If it is determined that the global representative log group is not the state after preparation completion (NO in step S502), the process advances to step S508.

In step S503, the representative participant transmits a "commit request (commit request packet)" in which currently processed log groups (log groups registered in the current entry of the all the updated log group list of all the general participants) are set, to a general participant. Then, the representative participant determines whether the transmission has failed (step S504). If it is determined that the transmission has failed (YES in step S504), the process advances to step S511. If it is determined that the transmission has succeeded (NO in step S504), the process advances to step S505. In this case, although the representative participant must obtain the communication address of the general participant when transmitting a commit request to the general participant in step S503, the communication address is obtained by referring to the log group mal-distribution table. Specifically, by obtaining the DBMS of an database management device having the management right of a log group that instructs to commit, a communication address corresponding to the DBMS is obtained. This is described later. This also applies to the transmitting process of a "roll-back request" to the general participant in step S508.

In step S505, the representative participant receives a response (commit response packet) from the general participant to which the commit request is transmitted. Then, the representative participant checks information (its process result) included in the response and determines whether the general participant has failed in the commit of the specified log group (step S506).

If the representative participant determines where the general participant has failed in the commit of the specified log group (YES in step S506), the process advances to step S511. If the representative participant determines where the general participant has succeeded in the commit of the specified log group (NO in step S506), the process advances to step S511.

In step S507, the representative participant deletes log groups that have failed in the commit (log groups registered in the current entry of the all the updated log group list of all the general participants) from the all the updated log group list of all the general participants. Then, process advances to step S511.

In step S508, the representative participant transmits a "roll-back request (roll-back request packet)" specifying a currently processed log group to the general participant. Then, the representative participant receives a response to the roll-back request from the general participant (step S509) and deletes the currently processed log group from the all the updated log group list of all the general participants (step S510). Then, the process advances to step S511.

In step S511, the representative participant positions the current entry of the all the updated log group list of all the general participants in a subsequent entry and the process returns to step S501.

Thus, the processes in steps S501 through S511 are repeated until it is determined that the current entry of the all the updated log group list of all the general participants is its last end. Thus, as to all the log groups registered in the all the updated log group list of all the general participants of the representative participant, a "commit" or "roll-back" instruction is determined and a "commit request" or "roll-back request" is transmitted to a general participant having the management right of each log group. Then, if a general participant that receives the commit request has succeeded in committing the specified log group, the log group is deleted from the all the updated log group list of all the general participants. This is because as to the log group its commit is completed and its in-doubt state has been solved. When receiving a response from a general participant that has received the roll-back request too, a log group specified in the roll-back request is deleted from the all the updated log group list of all the general participants.

In step S512, the representative participant determines whether the global representative log group is in a "state after preparation completion" by the same process as in step S502. Then, if it is determined that it is in a state after preparation completion (YES in step S512), the process advances to step S513. If it is determined that it is not in a state after preparation completion (NO in step S512), the process advances to step S520.

In step S513, the representative participant determines whether the current entry of the updated log group of the representative participant is its last end. If it is determined that it is its last end (YES in step S513), the process advances to step S518. If it is determined that it is not its last end (NO in step S513), the process advances to step S514.

In step S514, the representative participant determines whether a log group registered in the current entry of the updated log group is a representative log group (local representative log group or global representative log group). If it is determined that it is a representative log group (YES in step S514), the process advances to step S517. If it is determined that it is not a representative log group (NO in step S514), the process advances to step S515.

In step S515, the representative participant performs the transaction commit process of a log group (currently processed log group) registered in the current entry of the updated log group. Then, the representative participant outputs a commit log to the log storage device of the currently processed log group (step S515) and the process advances to step S517.

In step S517, the representative participant positions the current entry of the updated log group of the representative participant and the process returns to step S513. Thus, the processes in steps S512 through 517 are repeated until in step S513 it is determined that the current entry of the updated log group of the representative participant is its last end. Thus, a transaction process and the output of a commit log are applied to log groups (updated log groups) other than the representative log group registered in the updated log group of the representative participant. Thus, these log groups are committed, that is, their in-doubt states are solved.

In step S518, the representative participant performs the transaction commit process of the representative log group. Then, the representative participant outputs a commit log to the log storage device of the representative log group (step S519) and the process of this flowchart is terminated.

Thus, if the global representative log group is in a state after preparation completion, the commit of the representative log group is completed. Thus, the commit of all the updated log groups of the representative participant are completed.

In step S520, the representative participant determines whether the current entry of the updated log group list of the representative participant is its last end. If it is determined that it is its last end (YES in step S520), the process of this flowchart is terminated. If it is determined that it is not its last end (NO in step S520), the representative participant performs transaction commit process of a log group (currently processed log group) registered in the current entry of the updated log group (step S521) and outputs a roll-back log to the log storage device of the currently processed log group (step S522) and positions the current entry of the updated log group list of the representative participant in a subsequent entry. Then, the process returns to step S520.

Thus, the processers in steps S520 through S523 are repeated until in step S520 it is determined that the current entry of the updated log group list of the representative participant is its last end. Thus, if the global representative log group is not in a state after preparation completion, a roll-back process and the output of a roll-back log are applied to an updated log group whose management right is owned by the representative participant and the roll-back of all the updated log groups is completed.

{System State in the case where the coordinator Downs when there is no Update in the Coordinator}

FIG. 30 illustrates the system state in the case where the coordinator downs when there is no update in the coordinator. In FIG. 30, the same reference numerals are attached to the same components provided for the distributed transaction system depicted in FIG. 26.

FIG. 30 illustrates the operation of a representative participant and a general participant in the case where the coordinator downs when the distributed transaction system is in the state depicted in FIG. 23, or in the state where a transaction preparation process is completed. In the system state depicted in FIG. 23, the updated log groups 31 and 32 of a general participant (database management device 3) are in its in-doubt state.

In the system state depicted in FIG. 23, a representative participant (database management device 2) and a general participant (database management device 3) perform the processes depicted in the flowcharts of FIGS. 28 and 29, respectively.

Next, the operation of the system in the case where the representative participant (database management device 2) performs the process depicted in the flowchart of FIG. 29 when the coordinator (database management device 1) downs after the system state depicted in FIG. 23 is described with reference to FIG. 30.

Firstly, the representative participant (database management device 2) checks whether a preparation completion log 220-21 is recorded on the log storage device of a global representative log group 21. Then, the representative participant refers to the all the updated log group list of all the general participants 1020 and transmits commit requests (commit request packets) 2001 and 2002 to the general participant (database management device 3). The identifier G31 of the log group 31 and the identifier G32 of the log group 32 are set in the commit requests 2001 and 2002, respectively.

Upon receipt of the commit requests 2001 and 2002 from the representative participant, the coordinator performs the process depicted in the flowchart of FIG. 14. Then, after completing the transaction commit process and the output of a commit log as to the log groups 31 and 32, the coordinator transmits commit responses (commit response packets) 2051 and 2052 being commit completion to the representative participant (step S159 in FIG. 14).

After confirming that a preparation completion log 220-21 is recorded on the log storage device of a global representative log group 21, the representative participant refers to the updated log group list 130-21 of the representative participant and performs the transaction commit process of the global representative log group 21 and outputs/records a commit log 230-21 to/on the log storage device of the global representative log group 21.

[Process in the Case where a Database Management Device Downs]

FIG. 31 is a flowchart showing the operation of the other database management devices in the case where the cluster management device detects the down of a certain database management device in the system.

When detecting the down of a certain database management device in the system, a cluster management device notifies the other database management devices in the system of the down of the down database management device.

Thus, the database management devices other than the down database management device perform the process depicted in the flowchart of FIG. 31.

The flowchart depicted in FIG. 31 is described below.

The other database management device (hereinafter the database management devices other than the down database management device are called the other database management devices) receives a "DBMS down notice" from the cluster management device (step S701).

The other database management device refers to the log group mal-distribution table and a management right priority definition file (see FIG. 1) and specifies log groups whose management rights its own device should take over from among log groups managed by the down database management device (step S702).

In this specification process, firstly the other database management device refers to the log group mal-distribution table and specifies log groups managed by the down database management device. Then, the other database management device refers to the management right priority definition file and determines whether its own device should take over the specified log groups. As described above, priority is attached to database management devices having the management right of each log group. Therefore, a database management device positioned second to the down database management device takes over the management rights of log groups, managed by the down database management device.

The database management device that has taken over the management rights of the log groups generates a transaction restoration process of each log group whose management right it has taken over (step S703). The other database management device updates the log group mal-distribution table in its main storage device (step S704) and the process of this flowchart is terminated.

The log group mal-distribution table can be updated on the basis of the management right priority definition file. Specifically, it is OK if in the management right priority definition file, the DBMS i of the down database management device is deleted and their priority is moved up.

{System Configuration After Restoration in the Case where a Certain Database Management Device Downs}

Figure 32:
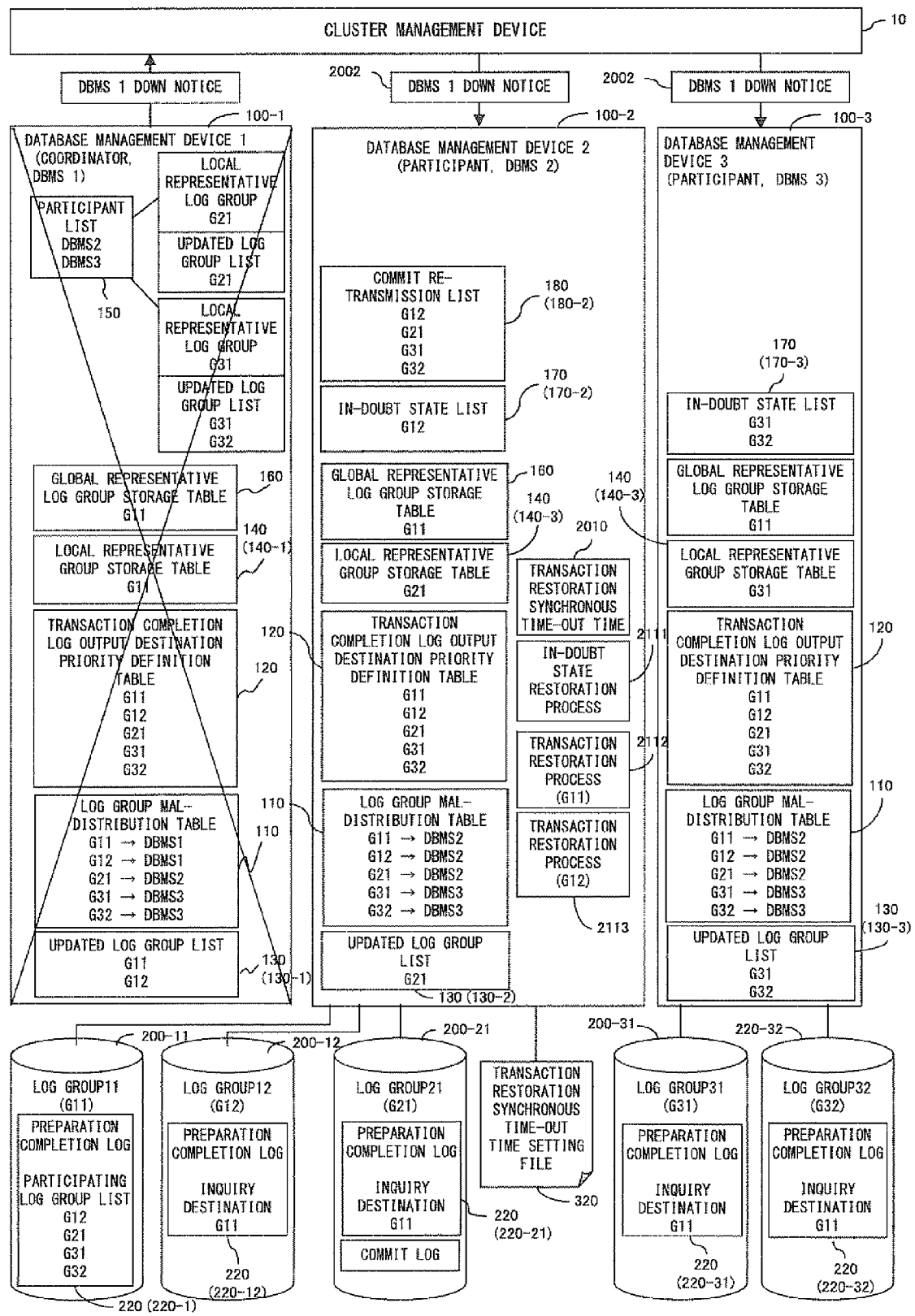
FIG. 32 is a system configuration diagram showing the system restoration process in the case where the coordinator downs in a distributed transaction system comprising the coordinator, a first participant and a second participant.

FIG. 32 is a system configuration diagram showing the system restoration process in the case where the coordinator downs in a distributed transaction system comprising the coordinator (database management device 1), the first participant (database management device 2) and the second participant (database management device 3). The system state depicted in FIG. 32 is similar to that depicted in FIG. 20 and the same reference numerals are attached to the same components depicted in FIG. 20.

In the distributed transaction system depicted in FIG. 32, when detecting the down of the database management device 1 (the coordinator), a cluster management device 10 transmits a down notice 2002 in which the device name "DBMS 1" of the database management device 1 is set to the database management devices 2 (the first participant) and 3 (the second participant).

Upon receipt of the down notice 2002, the database management device 2 performs the process of the flowchart depicted in FIG. 31. Then, the database management device 2 refers to the management right priority definition file 300 depicted in FIG. 1 and takes over the management rights of the log groups 11 and 12 managed by the database management device 1. The database management device 2 also generates/activates the first and second transaction restoration processes 2112 and 2113, respectively, in its main storage device. An in-doubt state restoration process 2111 is an eternal daemon process.

The first transaction restoration process 2112 (hereinafter called transaction restoration process 2112) restores the transaction of the log group 11. The second transaction restoration process 2113 (hereinafter called transaction restoration process 2113) restores the transaction of the log group 12. The in-doubt state restoration process 2111 solves a transaction that the transaction restoration processes 2112 and 2113 cannot promptly restore and asynchronously receives an in-doubt restore request from those restoration processes 2112 and 2113.

A transaction restoration synchronous time time 2010 is a time-out time used in the transaction restoration process 2113 and is set by a user. The transaction restoration process 2113 restores the log group 12 that outputs a preparation completion log but outputs neither a commit log nor a roll-back log up to a commit state and then waits for the restoration process of the global representative log group in which the preparation completion log is set until a time set in the transaction restoration synchronous time time 2010. If it is time-outed, the transaction restoration process 2113 sets the data of the log group 12 in its in-doubt state.

A transaction restoration synchronous time-out time setting file 320 is a file in which the transaction restoration synchronous time time 2010 is set and is stored in the external storage device, which is not depicted in FIG. 32, of each database management device. The database management device 2 reds out the transaction restoration synchronous time-out time setting file 320 from the external storage device and stores the time set init in the main storage device as a transaction restoration synchronous time time 2010.

{Transaction Restoration Process of a Global Representative Log Group}

Figure 33:
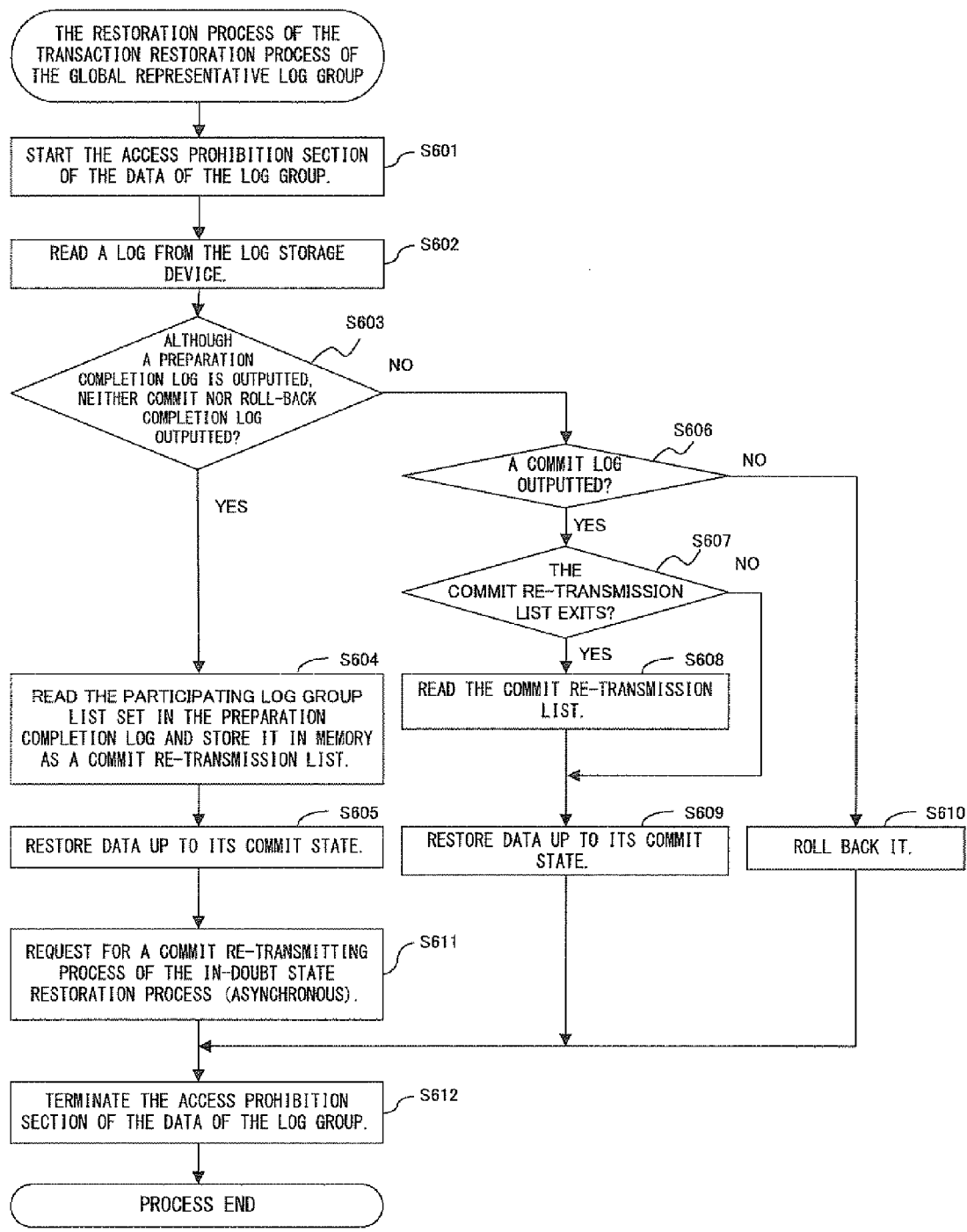
FIG. 33 is a flowchart showing the transaction restoration process of the global representative log group.

FIG. 33 is a flowchart showing the transaction restoration process (corresponding to the transaction restoration process depicted in FIG. 32) of a global representative log group.

The transaction restoration process of a global representative log group starts the access prohibition section (access prohibition period) of the data of the log group (global representative log group) (step S601). Then, a log is read in from the log storage device of the global representative log group (step S602). Then, although as to the global representative log group, a preparation completion log is outputted, it is determined whether a commit or roll-back completion log is not outputted (step S603).

In step S603, it is determined that only a preparation completion log is outputted (YES in step S603), the transaction restoration process of the global representative log group reads in a "participating log group list" set in the preparation completion log and stores it in its main storage device as a commit re-transmission list (step S604). Then, the transaction restoration process of the global representative log group restores the data of the global representative log group up to its "commit state" (step S605) and requests the in-doubt state restoration process (corresponding to the in-doubt state restoration process 2111 depicted in FIG. 32) of a commit re-transmitting process (step S611). The commit re-transmitting process is performed asynchronous with this process. Then, the process advances to step S612.

If in step S603 it is determined that a preparation completion log and a commit or a roll-back completion log are outputted (NO in step S603), the transaction restoration process of the global representative log group determines that a commit log is outputted (step S606). Then, if a commit log is outputted (YES in step S606), the transaction restoration process of the global representative log group determines whether there is a commit re-transmission list in the preparation completion log (step S607). Then, if there is a commit re-transmission list (YES in step S607), the process advances to step S608. If there is no commit re-transmission list (NO in step S607), the process advances to step S609.

In step S608, the transaction restoration process of the global representative log group reads the commit re-transmission list in the main storage device. Then, the transaction restoration process of the global representative log group restores the data of the global representative log group up to a "commit state" (step S609) and the process advances to step S612.

If in step S606 it is determined that a roll-back log is outputted (NO in step S606), the transaction restoration process of the global representative log group rolls back the global representative log group (step S610) and the process advances to step S612.

In step S612, the transaction restoration process of the global representative log group terminates the access prohibition section (access prohibition period) of the data of the log group (global representative log group). Then, the process of this flowchart is terminated.

Thus, the transaction restoration process of the global representative log group restores the transaction of the global representative log group that has taken over their management rights from the down database management device. During this restoration process, access to the data of the global representative log group is prohibited. Then, if only preparation completion log is outputted (recorded) in the log storage device of the global representative log group or a preparation completion log and a commit log are outputted, the transaction restoration process of the global representative log group generates a commit re-transmission list in the main storage device and restores the data of the global representative log group up to a "commit state". Then, the transaction restoration process of the global representative log group request the in-doubt state restoration process to transmit a "commit request" to the log groups registered in the commit re-transmission list and releases the prohibition of access to the data of the global representative log group. If a preparation completion log a roll-back log are outputted (recorded) in the log storage device of the global representative log group, the transaction restoration process of the global representative log group rolls back the data of the global representative log group and releases the prohibition of access to the data of the global representative log group.

If a log group other than the global representative log group exists in the same database management device (DBMS) as the global representative log group, as to a promptly solvable, the transaction restoration process of the global representative log group also performs it by its process and as to a promptly unsolvable transaction, it requests the in-doubt state restoration process to perform it to enable the re-start of the update process by application of all the other log groups in the system.

{Transaction Restoration Process of a Log Group other than the Global Representative Log Group}

Figure 34:
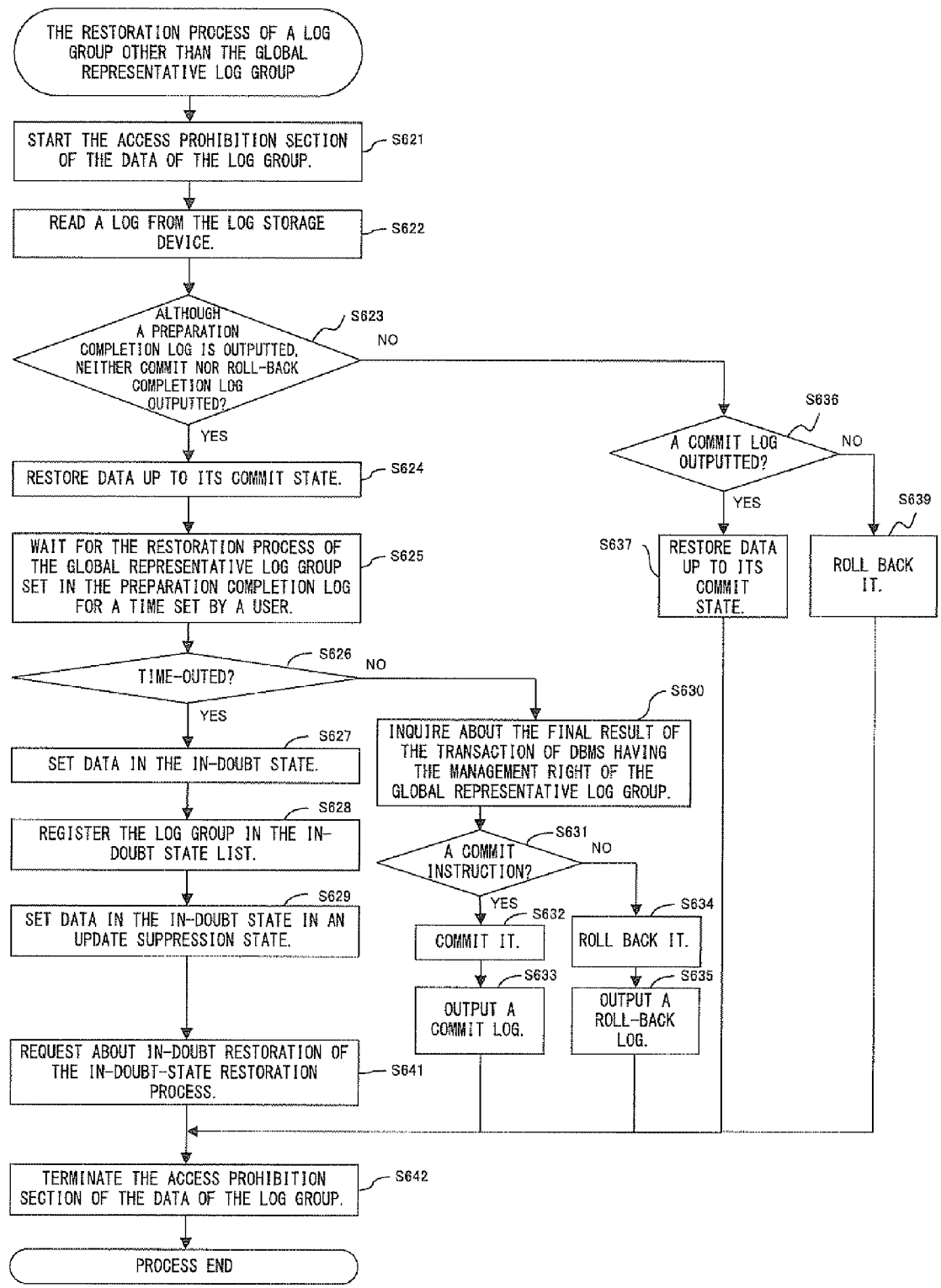
FIG. 34 is a flowchart showing the transaction restoration process of a log group other than the global representative log group.

FIG. 34 is a flowchart showing the transaction restoration process of a log group other than the global representative log group.

The transaction restoration process of a log group other than the global representative log group (corresponding to the transaction restoration process 2113 depicted in FIG. 32) starts the access prohibition section (access prohibition period) of the data of the log group (log group whose transaction restoration process its own process takes charge of) (step S621) and reads in a log from the log storage device of the log group (step S622). Then, the transaction restoration process of a log group other than the global representative log group determines whether only a preparation completion log is outputted in the log group (step S623).

If in step S623 it is determined that only a preparation completion log is outputted (YES in step S623), the transaction restoration process of a log group other than the global representative log group (hereinafter called the transaction restoration process of a log group, for convenience' sake) restores the data of the log group up to its commit state (step S624) and waits for the restoration process of the global representative log group set in the preparation completion log for a time set by a user (corresponding to the transaction restoration time time 2010 depicted in FIG. 32) (step S625). Then, the transaction restoration process of a log group determines whether it is time-outed, specifically, the restoration process of the global representative log group is not completed within the time set by the user (step S626). If it is time-outed (YES in step S626), the process advances to step S627. If it is not time-outed (NO in step S626), the process advances to step S630.

In step S627, the transaction restoration process of a log group sets the data (updates data) of the log group in its "in-doubt state". Then, the transaction restoration process of a log group registers the log group in the in-doubt state list of the main storage device (step S628) and puts the data (updated data) set in the in-doubt state in a update suppression state (step S629). Then, the transaction restoration process of a log group request the in-doubt state restoration process (corresponding to the in-doubt state restoration process 2111 depicted in FIG. 32) to restore the in-doubt state (step S641). The in-doubt state restoration request process is performed asynchronous with this process. Then, the process advances to step S642.

In step S630, the transaction restoration process of a log group inquires about the final result of the transaction of DBMS (database management device) having the management right of the global representative log group. Then, the transaction restoration process of a log group determines whether a response to the inquiry is a "commit instruction" (step S631). If it is determined that it is a commit instruction (YES in step S631), the transaction restoration process of a log group commits the log group (step S632) and outputs a commit log to the log storage device of the log group (step S633). Then, the process advances to step S642.

If in step S631 it is determined that it is a roll-back instruction (NO in step S631), the transaction restoration process of a log group rolls back the log group and outputs a roll-back log to the log storage device of the log group (step S635). Then, the process advances to step S642.

If in step S623 it is determined that a preparation completion log and another log other than it are outputted (NO in step in S623), the transaction restoration process of a log group determines whether a commit log is outputted (step S636). Then, it is determined that a commit log is outputted (YES in step S636), the transaction restoration process of a log group restores the data of the log group up to its "commit state" (step S637) and the process advances to step S642.

If in step S636 it is determined that a roll-back log is outputted (NO in step in S636), the transaction restoration process of a log group rolls back the log group (step S639) and the process advances to step S642.

In step S642, the transaction restoration process of a log group terminates the access prohibition section of the data of the log group. Then, the process of this flowchart is terminated.

Thus, like the transaction restoration process of the global representative log group, as to a promptly solvable, the transaction restoration process of a log group other than the global representative log group performs it by its process and as to a promptly unsolvable transaction, it requests the in-doubt state restoration process to perform it to enable the re-start of the update process by application of all the other log groups in the system.

The process for suppressing the update of only data in an in-doubt state (steps S627 through S629) takes much process time and much access time in the input/output to/from a data storage device according to the amount of data of transaction and random access frequency to the data storage device. Therefore, in order to shorten the process time of this process, it is preferable that the transaction restoration process of the global representative log group in step S625 to succeed (not time-outed), in other words, the process for suppressing the update of only data in an in-doubt state (steps S627 through S629) is not performed. In this process, by enabling a user to set the time-out time, a waiting time until the transaction restoration process of the global representative log group is terminated is increased. By avoiding a process time for suppressing the update of only data in the in-doubt state, the user can select either shortening the process time of this process or shortening a time until access to all the log groups is permitted.

{In-Doubt State Restoration Process}

Figure 35:
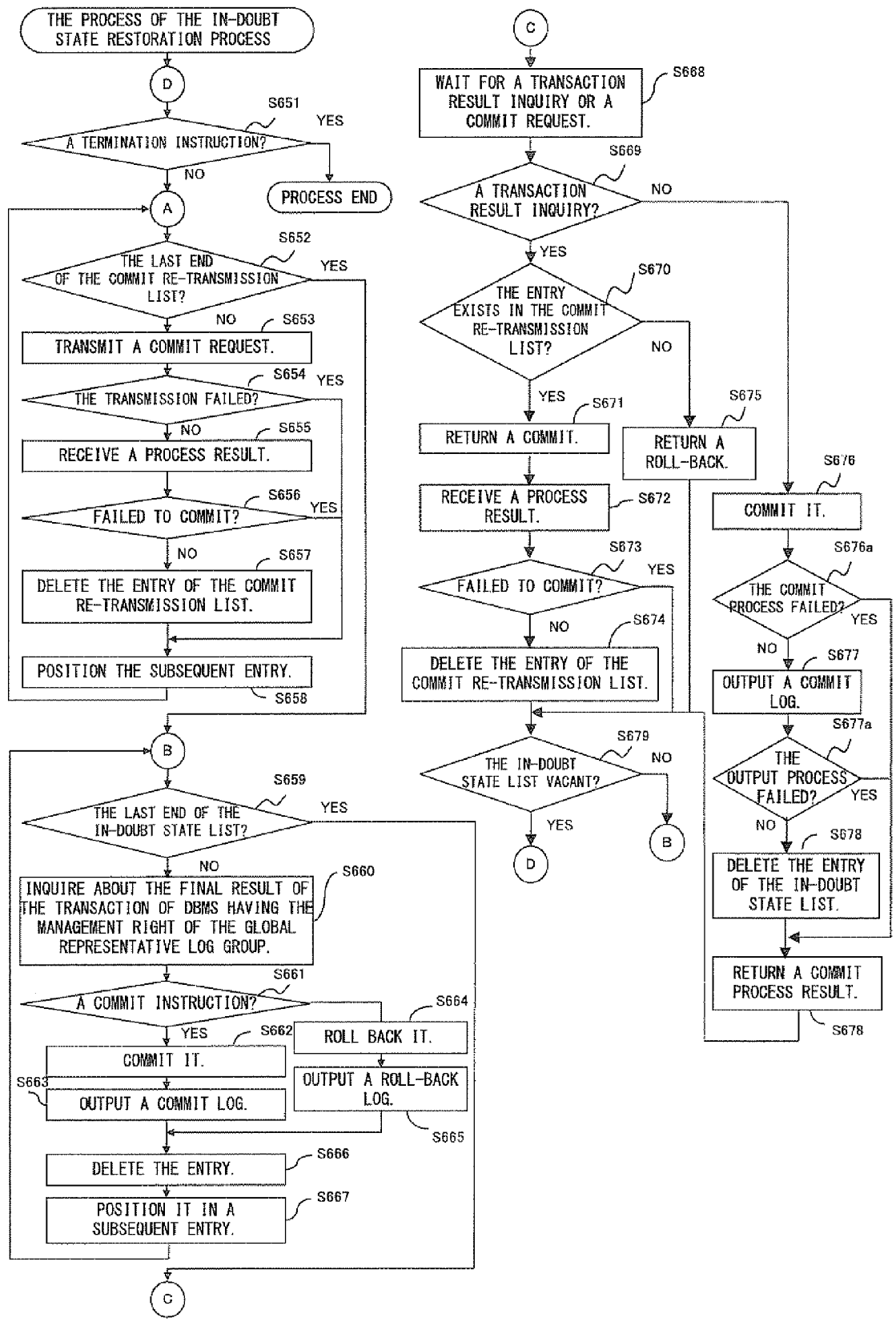
FIG. 35 is a flowchart showing the in-doubt state restoration process.

FIG. 35 is a flowchart showing the in-doubt state restoration process.

Firstly, the in-doubt state restoration process determines whether it is a termination instruction (step S651). If it is determined that it is a termination instruction (YES in step S651), the process of this flowchart is terminated. If it is determined that it is no termination instruction (NO in step S651), the in-doubt state restoration process determines whether the current entry of the commit re-transmission list is its last end or there is no commit re-transmission list (step S652). If it is determined that the current entry of the commit re-transmission list is its last end or there is no commit re-transmission list (YES in step S652), the process advances to step S659. If it is determined that the current entry of the commit re-transmission list is not its last end (NO in step S652), the process advances to step S653.

In step S653, the in-doubt state restoration process transmits a request to commit a log group registered in the current entry of the commit re-transmission list to a database management device (DBMS) having the management right of the log group. Then, the in-doubt state restoration process determines whether the transmission process of the commit request has failed (step S654). If it is determined that it has failed (YES in step S654), the process advances to step S658. If it is determined that it has succeeded (NO in step S654), the process advances to step S655.

Upon receipt of a response (response packet) to the commit request (step S655), the in-doubt state restoration process refers to a "process result" set in the response packet and determines whether the log group has failed to commit (step S656). If it is determined that the commit has succeeded (NO in step S656), the process advances to step S657 and deletes the current entry of the commit re-transmission list (step S657). If it is determined that the commit has failed (YES in step S656), the process advances to step S658.

In step S657, the in-doubt state restoration process positions the current entry of the commit re-transmission list in a subsequent entry and the process returns to step S652.

Thus, the processes in steps S652 through S658 are repeated until in step S652 the current entry of the commit re-transmission list becomes its last end. Thus, as to all the log groups registered in the commit re-transmission list, a commit request is transmitted database management devices having their management rights. Then, as to log groups that has succeeded in the commit, their entries are deleted from the commit re-transmission list. As to log groups that has failed to commit, their entries are left as they are.

In step S659, the in-doubt state restoration process determines whether the current entry of the in-doubt state list is its last end. If it is determined that it is its last end (YES in step S659), the process advances to step S668. If it is determined that it is not its last end (NO in step S659), the process advances to step S660.

In step S660, the in-doubt state restoration process inquires about the final result of the transaction of a database management device (DBMS) having the management right of the global representative log group. Upon receipt of a response to the inquiry from the database management device, the in-doubt state restoration process determines whether the response is a commit instruction (step S661). If it is determined that it is a commit instruction (YES in step S661), the in-doubt state restoration process commits a log group registered in the current entry of the in-doubt state list (step S662) and outputs a commit log to the log storage device of the log group (step S663). Then, the process advances to step S666.

If in step S661 it is determined that the response is a roll-back instruction (NO in step S661), the in-doubt state restoration process rolls back the log group registered in the current entry of the in-doubt state list (step S664) and outputs a roll-back log to the log storage device of the log group (step S665). Then, the process advances to step S666.

In step S666, the in-doubt state restoration process deletes the current entry. Then, the in-doubt state restoration process positions the current entry of the in-doubt state list in a subsequent entry (step S667) and the process returns to step S659.

Thus, the processes in steps S659 through S667 are repeated until the current entry of the in-doubt state list becomes its last end. Thus, a process (commit or roll-back) is applied to all the log groups registered in the in-doubt state list according to the final result of the transaction and a commit log or a roll-back log is outputted to the log storage device of each log group. A log group to which a commit or a roll-back is applied is deleted from the in-doubt state list.

In step S668, the in-doubt state restoration process waits for an "inquiry about a transaction result (transaction result inquiry" or a "commit request". The inquiry about a transaction result and the commit request include the following (1) through (6).

(1) A transaction result inquiry from a participant that has detected the down of the coordinator by a notice from the cluster management device, in the in-doubt state
(2) A commit request from the coordinator that has detected the failure of the commit process due to the down of a participant
(3) A transaction result inquiry from the transaction restoration process of another database management device (DBMS)
(4) A commit request from the transaction restoration process of another database management device (DBMS)

(5) A transaction result inquiry from the in-doubt state restoration process of another database management device (DBMS)
(6) A commit request from the in-doubt state restoration process of another database management device (DBMS)

If in step S669 it is determined that it is a transaction result inquiry (YES in step S669), the process advances to step S670. If in step S669 it is determined that it is a transaction result inquiry (YES in step S669), the process advances to step S670. If it is determined that it is a commit inquiry (NO in step S669), the process advances to step S676.

In step S670, the in-doubt state restoration process determines whether there is an entry (the entry) in which a log group set in the transaction result inquiry packet (hereinafter called a specified log group) is registered, in the commit re-transmission list (step S670). If there is the entry (YES in step S670), the process advances to step S671. If there is not the entry (NO in step S670), the process advances to step S675.

In step S671, the in-doubt state restoration process returns a "commit (commit instruction)" to a database management device (DBMS) that has transmitted the transaction result inquiry. Upon receipt of a response in which "the commit process result" is set, from the database management device (step S672), the in-doubt state restoration process checks the process result and determines whether the database management device has failed to commit the specified log group (step S673). If it is determined that it has succeeded in the commit (NO in step S673), the in-doubt state restoration process deletes an entry in which the specified log group is registered, from the commit re-transmission list (step S674) and the process advances to step S679. If it is determined that it has failed to commit it (YES in step S673), the process advances to step S679.

In step S675, the in-doubt state restoration process returns a "roll-back (roll-back instruction)" to the database management device (DBMS) that has transmitted the transaction result inquiry and the process advances to step S679.

In step S676, the in-doubt state restoration process commits a log group whose commit is requested. Then, the in-doubt state restoration process determines whether the commit process has failed (step S676*a*). If it has succeeded (NO in step S676*a*), the process advances to step S677. If it has failed (YES in step S676*a*), the process advances to step S678.

In step S677, the in-doubt state restoration process outputs a commit log to the log storage device of the log group. Then, it determines whether the output process has failed (step S677*a*). If it has succeeded (NO in step S677*a*), the process advances to step S678. If it has failed (YES in step S676*a*), the process advances to step S678*a*.

In step S678, the in-doubt state restoration process deletes an entry in which the log group is registered, from the in-doubt state list. Then, the in-doubt state restoration process returns a commit process result (step S678*a*) and the process advances to step S679.

In step S679, the in-doubt state restoration process determines whether the in-doubt state list is vacant. If the in-doubt state list is "vacant" (YES in step S679), the process advances to step S651. If the in-doubt state list is not "vacant" (NO in step S679), the process advances to step S659.

As described above, the in-doubt state restoration process is requested for a "commit re-transmitting process" by the restoration process of the global representative log group and is requested for the "restoration of an in-doubt state" by the restoration process of a log group other than the global representative log group. The restoration process of the global representative log group is generated and activated every time the management right of the global representative log group moves to another database management device (DBMS). The restoration process of a log group other than the global representative log group is generated and activated every time the management right of a log group other than the global representative log group moves to another database management device (DBMS). Therefore, the in-doubt state restoration process always remains in the system, repeats the processes in steps S648 through S679 and always monitors the states of the commit re-transmission list and the in-doubt state list until in step S648 it is determined that there is a termination instruction while being automatically performed in the background. The in-doubt state restoration process always responds to a "transaction result inquiry" and a "commit request" from a participant, the coordinator and another database management device (DBMS).

The summary of the operations of the in-doubt state restoration process 2111, transaction restoration process (transaction restoration process of the global representative log group) 2112 and transaction restoration process (transaction restoration process of a log group other than the global representative log group) 2113 is described below.

The transaction restoration process 2112 reads in the preparation completion log 220-11 from the log storage device of the global representative log group 11 and stores a participant log group lists (G12, G21, G31 and G32) set in it, in its main storage device as a commit re-transmission list 180-2. Then, the transaction restoration process 2112 restores the global representative log group 11 up to its commit state and requests for a "commit re-transmitting process" of the in-doubt state restoration process 2111.

The transaction restoration process 2113 reads in the preparation completion log 220-12 from the log storage device of the global representative log group 12 and restores the log group up to its commit state. Then, the transaction restoration process 2113 waits for the restoration process of the global representative log group 11 whose identifier G11 is set in the preparation completion log 220-12 for a time set in the transaction restoration synchronous time time 2010. Then, if the restoration process of the global representative log group 11 is completed within the set time, the transaction restoration process 2113 inquires about the final result of the transaction of a database management device having the management right of the global representative log group 11 (database management device 2 in this case).

Upon receipt of the transaction result inquiry, the in-doubt state restoration process 2111 returns a 2commit instruction" or a "roll-back instruction" to the transaction restoration process 2113. If the transaction restoration process 2113 receives a "commit instruction" from the in-doubt state restoration process 2111, the transaction restoration process 2113 commits the log group 12 and outputs/records a "commit log, which is not depicted in FIG. 35" to/on the log storage device of the log group 12. If the transaction restoration process 2113 receives a "roll-back instruction" from the in-doubt state restoration process 2111, the transaction restoration process 2113 rolls back the log group 12 and outputs/records a "roll-back log, which is not depicted in FIG. 35" to/on the log storage device of the log group 12.

Then, the in-doubt state restoration process 2111 refers to the commit re-transmission list 180-2 and transmits a "commit request" to a database management device (DBMS) having the management rights of the log groups 12, 21, 31 and 32. The commit requests of the log groups 12 and 21 are transmitted to the database management device 2 and the commit requests of the log groups 31 and 32 are transmitted to the database management device 3.

When determining that the identifier G12 of the log group 12 is registered in the in-doubt state list 170-2, the in-doubt state restoration process 2111 inquires about the final result of the transaction of a database management device having the management right of the representative log group 11(database management device 2 in this case). If the transaction restoration process 2113 receives a "commit instruction" from the database management device 2, the in-doubt state restoration process 2111 commits the log group 12 and outputs and records a "commit log, which is not depicted in FIG. 35" to/on the log storage device of the log group 12. If the transaction restoration process 2113 receives a "roll-back instruction", the transaction restoration process 2113 rolls back the log group 12 and outputs and records a "roll-back log, which is not depicted in FIG. 35" to/on the log storage device of the log group 12.

Then, the in-doubt state restoration process 2111 receives the transaction result inquiry of the log group 12 from the database management device 2 and the transaction result inquiries of the log groups 31 and 32 from the database management device 3. Then, the in-doubt state restoration process 2111 refers to the commit re-transmission list 180 and as to a log group whose identifier Gik is registered in the commit re-transmission list 180-2, returns a "commit (commit instruction" to a database management device (DBMS) having the management right of the log group. As to a log group whose identifier Gik is not registered in the commit re-transmission list 180-2, the in-doubt state restoration process 2111 returns a "roll-back (roll-back instruction" to a database management device (DBMS) having the management right of the log group. Then, as to a log group that has received a "commit process success" response, the in-doubt state restoration process 2111 does not delete the identifier Gik of the log group in the commit re-transmission list 180-2.

According to the present embodiment, since a list of identifiers of log groups managed by a database management device being the participant of a distributed transaction (participating log group list) is stored in a preparation completion log (the first preparation completion log) outputted to the log storage device of a log group representing log groups managed by a database management device being the coordinator (global representative log group) in the two-phase commit of the distributed transaction in which a plurality of log groups participate and the identifier of the global representative log group is stored in a preparation completion log (the second preparation completion log) outputted to the log storage device managed by a database management device being a participant in the two-phase commit, the coordinator and a participant can communicate with each other even when the management right of a log group moves to another database management device during the in-doubt state period of two-phase commit. Therefore, a participant can transmit an inquiry about a transaction result to the coordinator and the coordinator can return the transaction result in response to the inquiry about the transaction result from the participant. Therefore, even when the management right of a log group moves to another database management device during the in-doubt period of two-phase commit, the log group in the in-doubt state can be released from the in-doubt state.

The present embodiment has the effect of restoring the distributed transaction even when the management right of a log group managed by a certain database management device moves to another database management device while carrying out such two-phase commit protocol as to update a plurality of log groups.

Although in the above-described referred embodiments, the case where a transaction result is "commit" is mainly described, even when a transaction result is "roll-back" the present invention can be implemented in almost the same way as in the case of commit. Although as a configuration example of the distributed transaction system, a system provided with three database management devices are described, the present invention is also applicable a distributed transaction system provided with four or more database management devices.

All examples and conditional language recited herein are intended for pedagogical purpose to aid the reader in understanding the invention and the concepts contributed by the inventor to furthering the art, and are to be construed as being without limitation to such specifically recited example and conditions, nor does the organization of such examples in the specification relate to a showing of the superiority and inferiority of the invention. Although the embodiment of the present invention have been described in detail, it should be understood that the various changes, substitutions, and alternations could be made hereto without departing from the spirit and scope of the invention.

What is claimed is:

1. A distributed transaction system, comprising:
  a plurality of log groups each having a unique identifier assigned thereto, a package of a data storage device storing data and a log storage device storing a log of the data;
  a first table provided in each of said log groups and having registered therein information about a database management device having the management right of each of the log groups;
  a first preparation completion log which is output to a log storage device of a global representative log group representing log groups managed by a database management device which is a coordinator in a two-phase commit of a distributed transaction in which the plurality of log groups participate, the first preparation completion log storing a list of identifiers of log groups managed by a database management device which is a participant of the distributed transaction;
  a second preparation completion log which is output to a log storage device of a log group managed by a database management device which is a participant in the two-phase commit, the second preparation completion log storing an identifier of the global representative log group;
  wherein in response to the management right of the global representative log group moving to another database management device during an in-doubt state period of the two-phase commit, the first table is rewritten to reflect moving of the management right of the global representative log group;
  in response to the management right of a log group other than the global representative log group moving to another database management device during the in-doubt state period of the two-phase commit, the first table is rewritten to reflect moving of the management right of a log group other than the global representative log group;
  a participant in an in-doubt state refers to an identifier of the global representative log group stored in the second preparation completion log and the first table and inquires about a transaction result of a database management device having a management right of the global representative log group; and
  the coordinator refers to a list of identifiers log groups stored in the first preparation completion log and the first table and returns a transaction result to a participant in response to receiving an inquiry about the transaction result from the participant in the in-doubt state.

2. The distributed transaction system according to claim 1, wherein the coordinator transmits a commit request notice in which an identifier stored in the first preparation completion log and a commit instruction or a roll-back instruction are set to a participant that manages a log group having the identifier stored in the first preparation completion log and requests the participant to commit or roll back the log group; and stores a commit re-transmission list which is a list of identifiers of all updated log groups managed by the participant when a participant that has received the commit request notice fails to commit the log group, and wherein the participant that has received the commit request refers to the first table and transmits, to the coordinator, a process result response to the request to commit or roll back the log group to the coordinator when receiving a notice of the commit or rollback request from the coordinator.

3. The distributed transaction system according to claim 1, wherein in a preparation process in case that the coordinator updates data of the log group managed by the coordinator in a distributed transaction, the coordinator transmits, to a participant, a request notice of a preparation process to which an identifier of the global representative log group is set;

when a success response of the preparation process is received from the participant to which the request notice of the preparation process has been transmitted, obtains, from the success response of the preparation process, an identifier of a log group updated by the participant to which the request notice of the preparation process has been transmitted, relating the obtained identifier to the participant and stores the obtained identifier; and applies a transaction preparation process to a log group other than the global representative log group and outputs, to a log storage device of the log group other than the global representative log group, a preparation completion log in which an identifier of the global representative log group is set, and wherein a recipient participant that has received the request notice of the preparation process from the coordinator, obtains an identifier of the global representative log group from the request notice of the preparation process;

performs the preparation process of a log group managed by the request notice recipient participant and outputs, to a log storage device of a log group managed by the request notice recipient participant, a preparation completion log in which an identifier of the extracted global representative log group is set; and registers, to an in-doubt state list, an identifier of a log group that has succeeded in the preparation process and transmits all log group identifiers whose preparation have succeeded to the coordinator when succeeding in a process of outputting the preparation completion log to the log storage device of a log group managed by the request notice recipient participant.

4. The distributed transaction system according to claim 3, wherein in a commit process of two-phase commit after completion of the preparation process, the coordinator transmits a commit request to a participant;

outputs identifiers of all updated log groups managed by a participant that has transmitted the commit request to a log storage device of the global representative log group when determining that a commit of the participant fails;

performs a commit process of an updated log group other than the global representative log group;

outputs a commit log to a log storage device of the updated log group when the commit process of the updated log group succeeds;

outputs identifiers of the updated log group to a log storage device of the global representative log group that fails in the commit process;

performs a commit process of the global representative log group; and outputs a commit log of the global representative log group to a log storage device of the global representative log group; and the recipient participant applies a commit process to all updated log groups managed by the recipient participant when the commit request from the coordinator is received;

deletes, from the in-doubt state list, an identifier of an updated log group that has succeed in a commit and transmitting a commit completion response to the coordinator; and transmits a commit failure response of an updated log group that has failed to commit to the coordinator.

5. The distributed transaction system according to claim 3, wherein in case that the coordinator goes down, the recipient participant transmits a transaction result inquiry notice to a participant having a management right of the global representative log group when an identifier of an updated log group is registered in the in-doubt state list; and receives a response to the transaction result inquiry, performs a commit process of the updated log group of which identifier is registered in the in-doubt state list and outputs a commit log to a log storage device of the updated log group of which identifier is registered in the in-doubt state list if the response is a commit instruction and performs a roll-back process of an updated log group registered in the in-doubt state list and outputs a roll-back log to a log storage device of the updated log group of which identifier is registered in the in-doubt state list.

6. The distributed transaction system according to claim 1, wherein in a preparation process of two-phase commit in the case where the coordinator does not update data of a log group managed by the coordinator in a distributed transaction, the coordinator determines a representative participant from among participants;

determines the global representative log group from among log groups managed by the representative participant;

sets an identifier of the global representative log group in a preparation request notice when transmitting the preparation request notice to a general participant which is a participant other than the representative participant; and sets identifiers of all log groups managed by the general participant in a preparation process request notice when transmitting the preparation request notice to the representative participant; and the general participant obtains an identifier of the global representative log group from the preparation request notice when receiving the preparation request notice from the coordinator;

performs a preparation process of a log group managed by the general participant and, when the preparation process succeeds, outputs to a log storage device of a log group managed by the general participant, a preparation completion log in which the obtained identifier of the global representative log group is set; and registers, to an in-doubt state list, an identifier of a log group that has succeeded in the preparation process when succeeding in a process of outputting the preparation completion log in the log storage device; and the representative participant obtains identifiers of all log groups of all general participants from the preparation request notice when receiving the notice from the coordinator, and stores the identifiers of all of general participants to the log storage device of the global representative log group;

performs a preparation process of a log group other than the global representative log group managed by the representative participant and, when the preparation process succeeds, outputs, to a log storage device of the log group other than the global representative log group, a preparation completion log in which the identifier of the global representative log group is set;

performs a preparation process of the global representative log group, outputs, to a log storage device of the global representative log group, a preparation completion log in which the obtained identifiers of the log group other than a global representative log group to a log storage device of the global representative log group when the preparation process of the global representative log group succeeds, and transmits identifiers of all log groups that have succeeded in preparing to the coordinator; and transmits a response notifying a result of the preparation process of the global representative log group to the coordinator.

7. The distributed transaction system according to claim 6, wherein in a commit process of two-phase commit after completion of both the preparation process performed by the general participant and the preparation process performed by the representative participant, the coordinator transmits a commit request notice to the general participant;

determines whether the general participant has failed to complete a commit process applied by receiving the commit request notice; and transmits, to the representative participant, a commit request notice in which identifiers of all updated log groups of all general participants that have failed to complete the commit process are set, and the general participant applies a commit process to all updated log groups managed by the general participant when receiving the commit request notice from the coordinator;

deletes an identifier of an updated log group that has succeeded in completing the commit process from the in-doubt state list and transmitting, to the coordinator, a commit completion response related to the updated log group that has succeeded in completing the commit process; and transmits, to the coordinator, a commit failure response related to an updated log group that has failed to complete the commit process; and the representative participant obtains all identifiers set in a commit request notice when receiving the commit request notice which is transmitted from the coordinator to the representative participant;

outputs all the obtained identifiers to a log storage device of the global representative log group;

applies a commit process to all updated log groups of its own device and stores a list of identifiers of an updated log group that has failed to commit in a log storage device of the global representative log group as a commit re-transmission list;

performs a commit process of the global representative log group and outputs its commit log to a log storage device of the global representative log group; and transmits a commit completion response to the coordinator.

8. The distributed transaction system according to claim 6, wherein when the coordinator goes down, the general participant transmits a transaction result inquiry notice to a participant having a management right of the global representative log group when an identifier of an updated log group is registered in the in-doubt state list; and receives a response to the transaction result inquiry from the coordinator, applies a commit process to the updated log group of which identifier is registered in the in-doubt state list and outputs a commit log to a log storage device of the updated log group of which identifier is registered in the in-doubt state list if the response is a commit instruction, and applies a roll-back process to an updated log group registered in the in-doubt state list and outputs a roll-back log to a log storage device of the updated log group of which identifier is registered in the in-doubt state list if the response is a roll-back instruction.

9. The distributed transaction system according to claim 6, wherein when the coordinator goes down, the representative participant transmits a commit request to a general participant having a management right of an updated log group when the global representative log group is in a state after a preparation completion log;

transmits a roll-back request to a general participant having a management right of the updated log group when the global representative log group is not in a state after a preparation completion log;

performs a commit process of an updated log group of the representative participant and outputs a commit log to a log storage device of the updated log group of the representative participant when the global representative log group is in a state after a preparation completion log; and performs a roll-back process of the updated log group of the representative participant and outputs a roll-back log to a log storage device of the updated log group of the representative participant when the global representative log group is not in a state after a preparation completion log.

10. The distributed transaction system according to claim 3, wherein a database management device that has obtained a management right of a log group other than the global representative log group, determines whether only a preparation completion log is stored in a log storage device of a log group that has obtained the management right and registers the log group in the in-doubt state list if the preparation completion log is stored;

obtains the global representative log group from the preparation completion log and transmits a transaction result inquiry to a database management device having a management right of the global representative log group;

receives a response to the transaction result inquiry from the database management device having a management right of the global representative log group, applies a commit process to a log group that has obtained the management right and outputs a commit log to a log storage device of the log group if the response is a commit instruction and applies a roll-back process to a log group that has obtained the management right and outputs a roll-back log to a log storage device of the log group if the response is a roll-back instruction; and deletes the log group that has obtained the management right from the in-doubt state list.

11. The distributed transaction system according to claim 6, wherein a database management device that has obtained a management right of a log group other than the global representative log group, determines whether only a preparation completion log is stored in a log storage device of the log group that has obtained the management right and registers the log group in the in-doubt state list if only the preparation completion log is stored;

obtains the global representative log group from the preparation completion log and transmits a transaction result inquiry to a database management device having a management of the global representative log group;

receives a response to the transaction result inquiry from the database management device having a management of the global representative log group, applies a commit process to the log group that has obtained the management right and outputs a commit log to a log storage device of the log group if the response is a commit instruction and applies a roll-back process to the log group that has obtained the management right and outputs a roll-backlog to a log storage device of the log group if the response is a roll-back instruction; and deletes the log group that has obtained the management right from the in-doubt state list.

12. The distributed transaction system according to claim 3, wherein a database management device that has obtained a management right of the global representative log group, if a commit re-transmission list is stored in a log storage device of the global representative log group, reads the commit re-transmission list from the log storage device of the global representative log group and stores the commit re-transmission list;

if no commit re-transmission list is stored and a preparation completion log is stored in the log storage device of the global representative log group, obtains identifiers set in the stored preparation completion log and stores a list of the obtained identifiers as the commit re-transmission list; and deletes the list of identifiers included in the stored commit re-transmission list from the in-doubt state list.

13. The distributed transaction system according to claim 6, wherein a database management device that has obtained a management right of the global representative log group, if a commit re-transmission list is stored in a log storage device of the global representative log group, reads the commit re-transmission list from the log storage device of the global representative log group and stores the commit re-transmission list;

if no commit re-transmission list is stored and a preparation completion log is stored in the log storage device of the global representative log group, obtains identifiers set in the stored preparation completion log and stores a list of the obtained identifiers as the commit re-transmission list; and deletes the list of identifiers included in the stored commit re-transmission list from the in-doubt state list.

14. The distributed transaction system according to claim 1, wherein each database management device, receives a notice that another database management device has downed;

refers to the first table and obtaining an identifier of a log group managed by the down database management device;

specifies a log group taken over by its own device from among log groups managed by the down database management device on the basis of the obtained identifier of the log group, which is managed by the down database management device, and on the basis of priority among data storage devices having a management right of the log group managed by the down database management device; and restores the log group managed by the down database management device when taking over a management right of a log group managed by the down database management device.

15. The distributed transaction system according to claim 1, wherein a database management device being the coordinator comprises a list in which identification information of a database management device being a participant.

* * * * *